US011908468B2

(12) United States Patent
Krishnan et al.

(10) Patent No.: US 11,908,468 B2
(45) Date of Patent: Feb. 20, 2024

(54) DIALOG MANAGEMENT FOR MULTIPLE USERS

(71) Applicant: Amazon Technologies, Inc., Seattle, WA (US)

(72) Inventors: Prakash Krishnan, Santa Clara, CA (US); Arindam Mandal, Redwood City, CA (US); Siddhartha Reddy Jonnalagadda, Bothell, WA (US); Nikko Strom, Kirkland, WA (US); Ariya Rastrow, Seattle, WA (US); Ying Shi, Beijing (CN); David Chi-Wai Tang, Palo Alto, CA (US); Nishtha Gupta, San Jose, CA (US); Aaron Challenner, Cambridge, MA (US); Bonan Zheng, Los Angeles, CA (US); Angeliki Metallinou, Mountain View, CA (US); Vincent Auvray, San Jose, CA (US); Minmin Shen, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 17/112,520

(22) Filed: Dec. 4, 2020

(65) Prior Publication Data

US 2022/0093101 A1   Mar. 24, 2022

Related U.S. Application Data

(60) Provisional application No. 63/081,012, filed on Sep. 21, 2020.

(51) Int. Cl.
*G10L 25/78* (2013.01)
*G10L 15/22* (2006.01)
(Continued)

(52) U.S. Cl.
CPC .............. *G10L 15/22* (2013.01); *G06F 3/167* (2013.01); *G06F 18/24* (2023.01); *G06V 10/40* (2022.01);
(Continued)

(58) Field of Classification Search
None
See application file for complete search history.

(56) References Cited

U.S. PATENT DOCUMENTS 5,818,439 A * 10/1998 Nagasaka ............. G06F 16/739
725/38
6,484,189 B1 * 11/2002 Gerlach, Jr. ........... G11B 27/34
715/810

(Continued)

FOREIGN PATENT DOCUMENTS

JP    2011227236 A    11/2011
WO    2019077012 A1    4/2019
(Continued)

OTHER PUBLICATIONS

Invitation to Pay Additional Fees And, Where Applicable, Protest Fee dated Dec. 10, 2021 for International Patent Application No. PCT/US2021/050645.

(Continued)

*Primary Examiner* — Jakieda R Jackson
(74) *Attorney, Agent, or Firm* — Pierce Atwood LLP

(57) ABSTRACT

A system that is capable of resolving anaphora using timing data received by a local device. A local device outputs audio representing a list of entries. The audio may represent synthesized speech of the list of entries. A user can interrupt the device to select an entry in the list, such as by saying "that one." The local device can determine an offset time representing the time between when audio playback began and when the user interrupted. The local device sends the (Continued)

offset time and audio data representing the utterance to a speech processing system which can then use the offset time and stored data to identify which entry on the list was most recently output by the local device when the user interrupted. The system can then resolve anaphora to match that entry and can perform additional processing based on the referred to item.

20 Claims, 29 Drawing Sheets

(51) Int. Cl.
  *G10L 15/24*   (2013.01)
  *G10L 15/08*   (2006.01)
  *G10L 15/06*   (2013.01)
  *G06V 40/20*   (2022.01)
  *G06F 3/16*   (2006.01)
  *G10L 13/08*   (2013.01)
  *G10L 15/20*   (2006.01)
  *G06V 40/10*   (2022.01)
  *G06V 10/40*   (2022.01)
  *G10L 15/02*   (2006.01)
  *G06F 18/24*   (2023.01)

(52) U.S. Cl.
  CPC ............. *G06V 40/10* (2022.01); *G06V 40/20* (2022.01); *G10L 13/08* (2013.01); *G10L 15/02* (2013.01); *G10L 15/063* (2013.01); *G10L 15/08* (2013.01); *G10L 15/20* (2013.01); *G10L 15/222* (2013.01); *G10L 15/24* (2013.01); *G10L 2015/0635* (2013.01); *G10L 2015/088* (2013.01); *G10L 2015/223* (2013.01); *G10L 2015/227* (2013.01)

(56) References Cited

U.S. PATENT DOCUMENTS

| | | | | |
|---|---|---|---|---|
| 6,724,864 | B1* | 4/2004 | Denenberg | G10L 13/00 379/88.16 |
| 7,117,442 | B1* | 10/2006 | Kemble | G06F 16/9038 707/E17.141 |
| 9,368,105 | B1 | 6/2016 | Freed et al. | |
| 10,320,353 | B1 | 6/2019 | Wahlberg et al. | |
| 10,366,692 | B1* | 7/2019 | Adams | G10L 15/26 |
| 10,573,312 | B1* | 2/2020 | Thomson | G10L 15/22 |
| 10,594,757 | B1* | 3/2020 | Shevchenko | G06F 40/35 |
| 10,705,794 | B2* | 7/2020 | Gruber | G10L 15/22 |
| 10,979,331 | B2* | 4/2021 | Alsina | H04L 67/01 |
| 11,175,880 | B2* | 11/2021 | Liu | G10L 15/22 |
| 2002/0184373 | A1 | 12/2002 | Maes | |
| 2004/0098253 | A1 | 5/2004 | Balentine et al. | |
| 2004/0152054 | A1* | 8/2004 | Gleissner | G09B 19/06 434/156 |
| 2004/0218768 | A1 | 11/2004 | Zhurin et al. | |
| 2004/0228463 | A1* | 11/2004 | Sauvage | H04M 3/56 379/202.01 |
| 2005/0246173 | A1* | 11/2005 | Creamer | G10L 15/22 704/E15.04 |
| 2009/0254342 | A1* | 10/2009 | Buck | G10L 25/78 704/E15.039 |
| 2009/0326949 | A1* | 12/2009 | Douthitt | H04L 67/568 707/999.001 |
| 2013/0021459 | A1 | 1/2013 | Vasilieff et al. | |
| 2014/0244267 | A1* | 8/2014 | Levi | G10L 15/22 704/275 |
| 2015/0134334 | A1* | 5/2015 | Sachidanandam | G06F 3/0482 704/251 |
| 2016/0210116 | A1 | 7/2016 | Kim et al. | |
| 2016/0378747 | A1* | 12/2016 | Orr | G10L 15/26 704/9 |
| 2017/0062010 | A1* | 3/2017 | Pappu | G11B 27/031 |
| 2018/0040046 | A1 | 2/2018 | Gotoh et al. | |
| 2018/0133900 | A1* | 5/2018 | Breazeal | B25J 19/026 |
| 2018/0181566 | A1* | 6/2018 | Lee | H04N 21/4147 |
| 2018/0338177 | A1* | 11/2018 | Graham | H04N 21/47217 |
| 2018/0365898 | A1* | 12/2018 | Costa | G02B 27/0172 |
| 2019/0066672 | A1* | 2/2019 | Wood | H04L 67/1014 |
| 2019/0198008 | A1 | 6/2019 | Guo et al. | |
| 2020/0162536 | A1* | 5/2020 | Vincent | H04L 65/611 |
| 2020/0175961 | A1* | 6/2020 | Thomson | G10L 15/28 |
| 2020/0213680 | A1* | 7/2020 | Ingel | G10L 13/00 |
| 2020/0312332 | A1 | 10/2020 | Nishikawa et al. | |
| 2020/0333875 | A1 | 10/2020 | Bansal et al. | |
| 2021/0056963 | A1* | 2/2021 | Lee | G10L 15/26 |
| 2021/0104242 | A1 | 4/2021 | Hashimoto et al. | |
| 2021/0110821 | A1 | 4/2021 | Lim et al. | |
| 2021/0118440 | A1* | 4/2021 | Peng | G06F 9/485 |
| 2021/0174797 | A1* | 6/2021 | Choi | G10L 15/22 |
| 2022/0021914 | A1* | 1/2022 | Lintz | H04N 21/23424 |

FOREIGN PATENT DOCUMENTS

| | | | |
|---|---|---|---|
| WO | 2019138651 | A1 | 7/2019 |
| WO | 2021188266 | A1 | 9/2021 |

OTHER PUBLICATIONS

International Search Report and Written Opinion dated Mar. 9, 2022 for International Patent Application No. PCT/US2021/050645.

U.S. Non-Final Office Action dated Oct. 26, 2022 in U.S. Appl. No. 17/112,227, filed Dec. 4, 2020.

International Preliminary Report on Patentability dated Mar. 30, 2023 for International Patent Application No. PCT/US2021/050645.

Non-Final Office Action dated Mar. 30, 2023 for U.S. Appl. No. 17/112,512.

Oleg Akhtiamov, et al. 2017. Speech and Text Analysis for Multimodal Addressee Detection in Human-Human-Computer Interaction. In Interspeech 2017, 5 pages, https://www.isca-speech.org/archive_v0/Interspeech_2017/pdfs/0501.

Oleg Akhtiamov, et al. 2017. Are you Addressing Me: Multimodal Addressee Detection in Human-Human-Computer Conversations. In Speech and Computer, SPECOM 2017, Lecture Notes in Computer Science, vol. 10458, pp. 152-161, Springer, Cham. Retrieved from https://doi.org/10.1007/978-3-319-66429-3_14.

Francois Chollet. 2017. Xception: Deep Learning with Depthwise Separable Convolutions. In 2017 IEEE Conference on Computer Vision and Pattern Recognition (CVPR), pp. 1800-1807, Retrieved from https://arxiv.org/abs/1610.02357.

Gourav Datta, et al. 2022. ASD-transformer. Efficient active speaker detection using self and multimodal transformers. In ICASSP 2022-2022 IEEE International Conference on Acoustics, Speech and Signal Processing (ICASSP), pp. 4568-4571, Retrieved from https://www.amazon.science/publications/asd-transformer-efficient-active-speaker-detection-using-self-and-multimodal-transformers.

Jiankang Deng, et al. 2020. RetinaFace: Single-Shot Multi-Level Face Localisation in the Wild. In 2020 IEEE/CVF Conference on Computer Vision and Pattern Recognition (CVPR), pp. 5202-5211, Retrieved from https://openaccess.thecvf.com/content_CVPR_2020/papers/Deng_RetinaFace_Single-Shot_Multi-Level_Face_Localisation_in_the_Wild_CVPR_2020_paper.pdf.

Mihail Eric, et al. 2020. MultiWOZ 2.1: A Consolidated Multi-Domain Dialogue Dataset with State Corrections and State Tracking Baselines. In Proceedings of the Twelfth Language Resources and Evaluation Conference, pp. 422-428, Retrieved from https://aclanthology.org/2020.lrec-1.53.

Lifeng Fan, et al. 2019. Understanding Human Gaze Communication by Spatio-Temporal Graph Reasoning. In IEEE International Conference on Computer Vision (ICCV), pp. 5724-5733, Retrieved from https://arxiv.org/abs/1909.02144v1.

Vineet Garg, et al. 2022. Device-Directed Speech Detection: Regularization via Distillation for Weakly-Supervised Models. In Interspeech 2022, pp. 1258-1262, https://www.isca-speech.org/archive/pdfs/interspeech_2022/garg22_interspeech.

(56) References Cited

OTHER PUBLICATIONS

Kellen Gillespie, et al. 2020. Improving Device Directedness Classification Of Utterances With Semantic Lexical Features. In IEEE ICASSP 2020 Virtual Conference May 2020, pp. 7859-7863, Retrieved from https://arxiv.org/abs/2010.01949v1.

Kristen Grauman, et al. 2022. Ego4D: Around the World in 3,000 Hours of Egocentric Video. In Proceedings of the IEEE/CVF Conference on Computer Vision and Pattern Recognition (CVPR), 2022, pp. 18995-19012, Retrieved from https://arxiv.org/abs/2110.07058v3.

Jianzhu Guo, et al. 2020. Towards Fast, Accurate and Stable 3D Dense Face Alignment. In Computer Vision—ECCV 2020. ECCV 2020. Lecture Notes in Computer Science, vol. 12364, pp. 152-168 pages, Retrieved from https://www.ecva.net/papers/eccv_2020/papers_ECCV/papers/123640154.pdf.

Che-Wei Huang, et al. 2019. A Study for Improving Device-Directed Speech Detection toward Frictionless Human-Machine Interaction. In Interspeech 2019, pp. 3342-3346, Retrieved from https://www.isca-speech.org/archive/pdfs/interspeech_2019/huang19i_interspeech.pdf.

Kazunori Komatani, et al. 2021. Multimodal Dialogue Data Collection and Analysis of Annotation Disagreement. In Increasing Naturalness and Flexibility in Spoken Dialogue Interaction, Lecture Notes in Electrical Engineering vol. 714, pp. 201-213, Springer. Retrieved from https://doi.org/10.1007/978-981-15-9323-9_17.

Alina Kuznetsova, et al. 2020. The Open Images Dataset V4: Unified image classification, object detection, and visual relationship detection as scale. In International Journal of Computer Vision, vol. 128, pp. 1956-1981, Retrieved from https://arxiv.org/abs/1811.00982v2.

Thao Le Minh, et al. 2018. Deep Learning Based Multi-modal Addressee Recognition in Visual Scenes with Utterances. In Proceedings of the Twenty-Seventh International Joint Conference on Artificial Intelligence (IJCAI-18), pp. 1546-1553, https://www.ijcai.org/proceedings/2018/0214.pdf.

Sri Harish Mallidi, et al. 2018. Device-directed Utterance Detection. In Interspeech 2018, pp. 1225-1228, Retrieved from https://arxiv.org/abs/1808.02504.

Joseph Roth, et al. 2020. Ava Active Speaker. An Audio-Visual Dataset for Active Speaker Detection. In ICASSP 2020-2020 IEEE International Conference on Acoustics, Speech and Signal Processing (ICASSP), pp. 4492-4496, Retrieved from https://arxiv.org/abs/1901.01342v2.

Mark Sandler, et al. 2018. MobileNetV2: Inverted Residuals and Linear Bottlenecks. In 2018 IEEE/CVF Conference on Computer Vision and Pattern Recognition (CVPR), pp. 4510-4520. Retrieved from https://arxiv.org/abs/1801.04381v4.

Kalin Stefanov, et al. 2016. A Multi-party Multi-modal Dataset for Focus of Visual Attention in Human-human and Human-robot Interaction. In Proceedings of the Tenth International Conference on Language Resources and Evaluation (LREC'16), pp. 4440-4444, Retrieved from https://aclanthology.org/L16-1703.

Timothy Tsai, et al. 2015. Multimodal addressee detection in multiparty dialogue systems. In 2015 IEEE International Conference on Acoustics, Speech and Signal Processing (ICASSP), pp. 2314-2318, Retrieved from https://www.microsoft.com/en-us/research/wp-content/uploads/2016/02/addressee_conf.pdf.

Xiangyu Zhu, et al. 2016. Face Alignment Across Large Poses: A 3D Solution. In 2016 IEEE Conference on Computer Vision and Pattern Recognition (CVPR), pp. 146-155, Retrieved from https://arxiv.org/abs/1511.07212v1.

\* cited by examiner

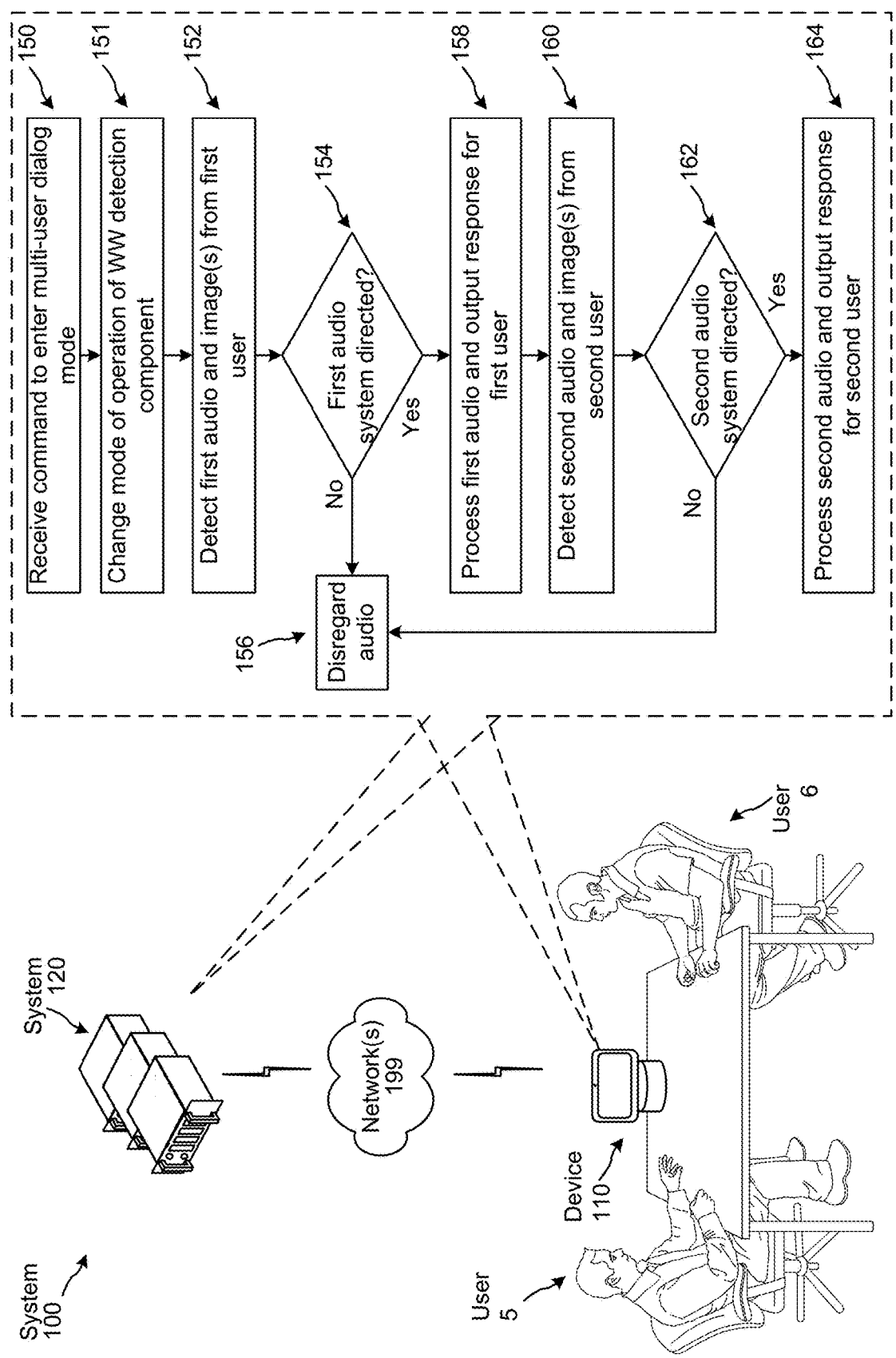

FIG. 1B
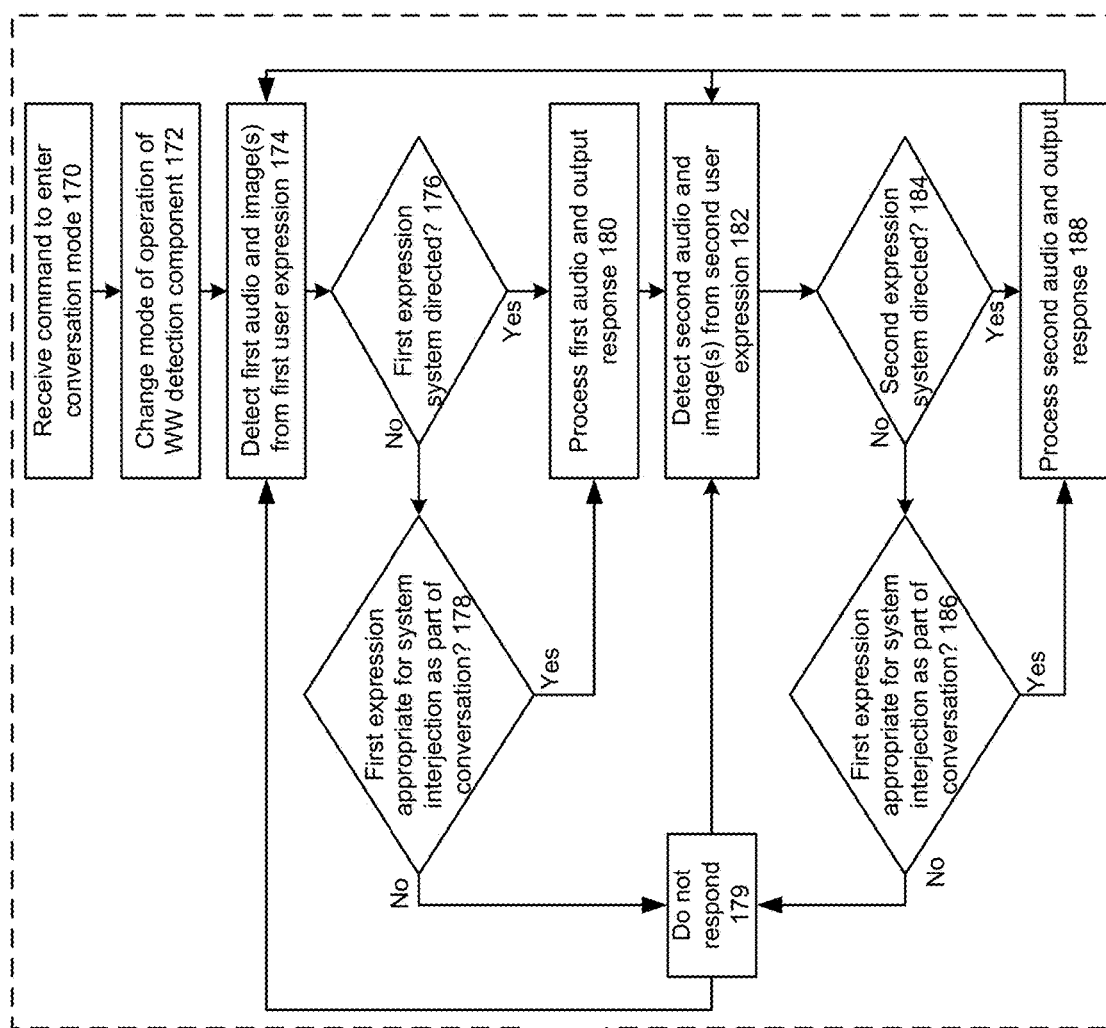
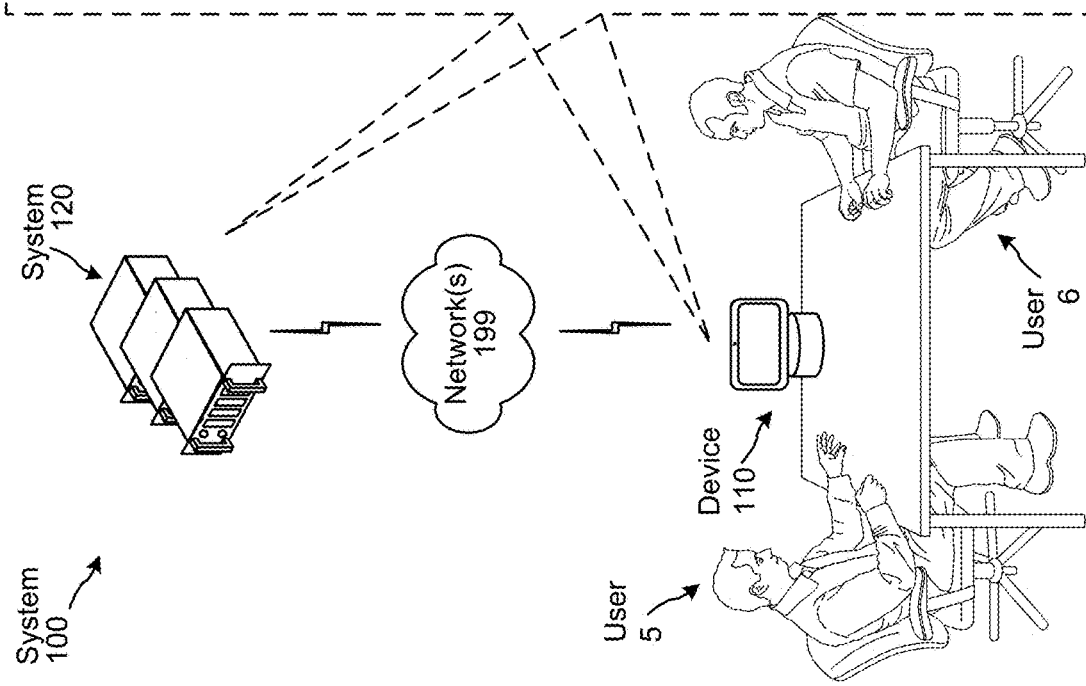

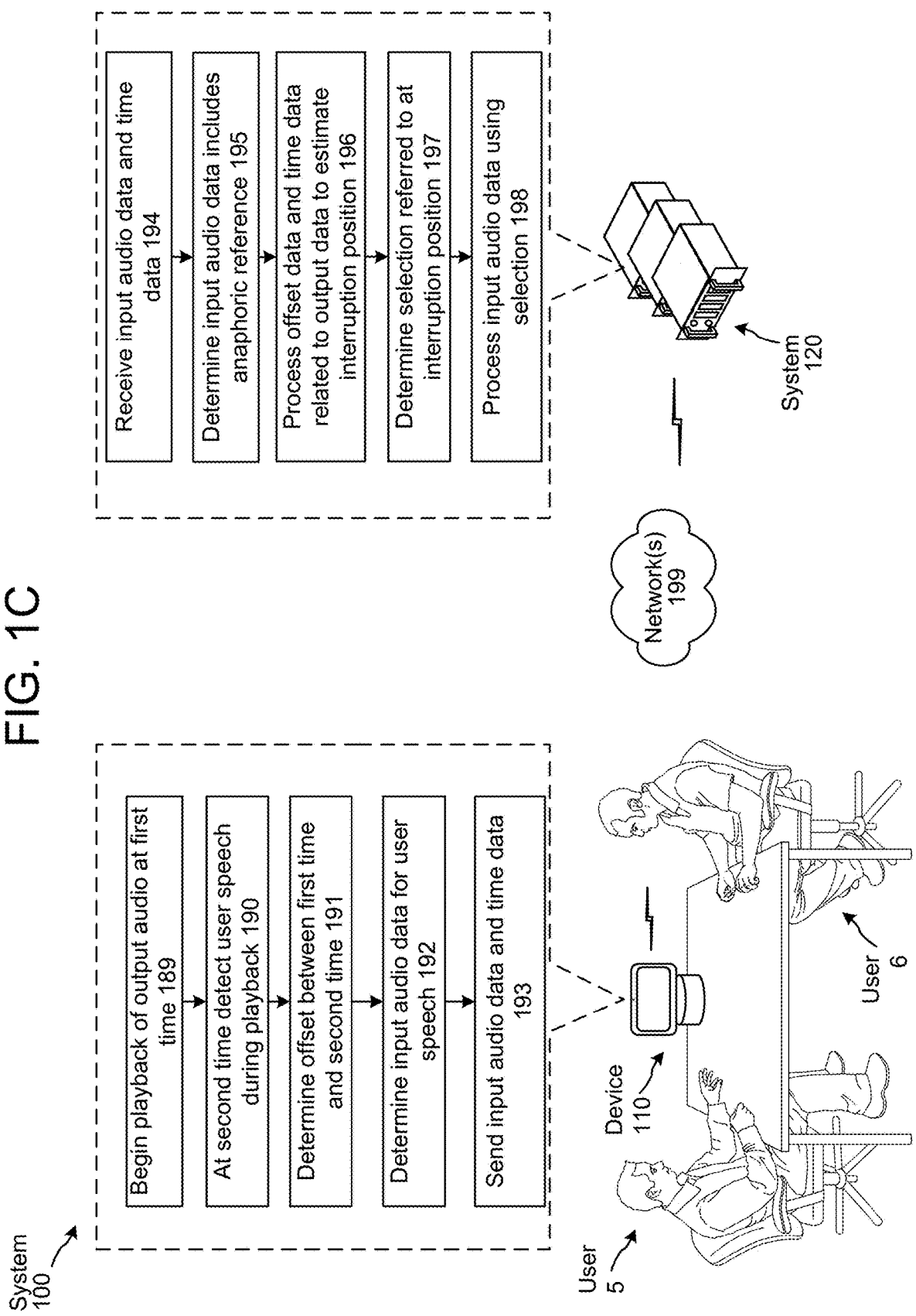

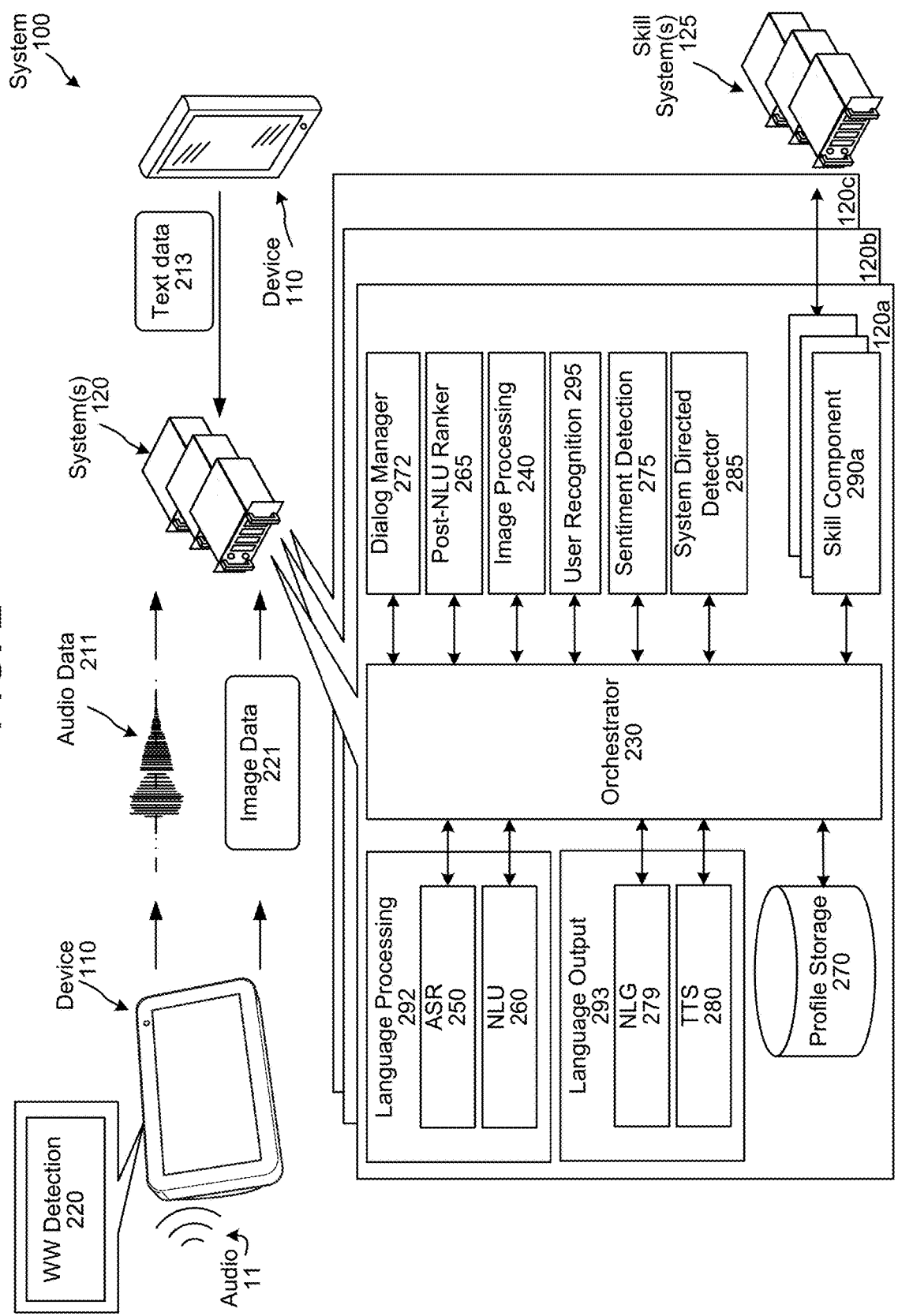

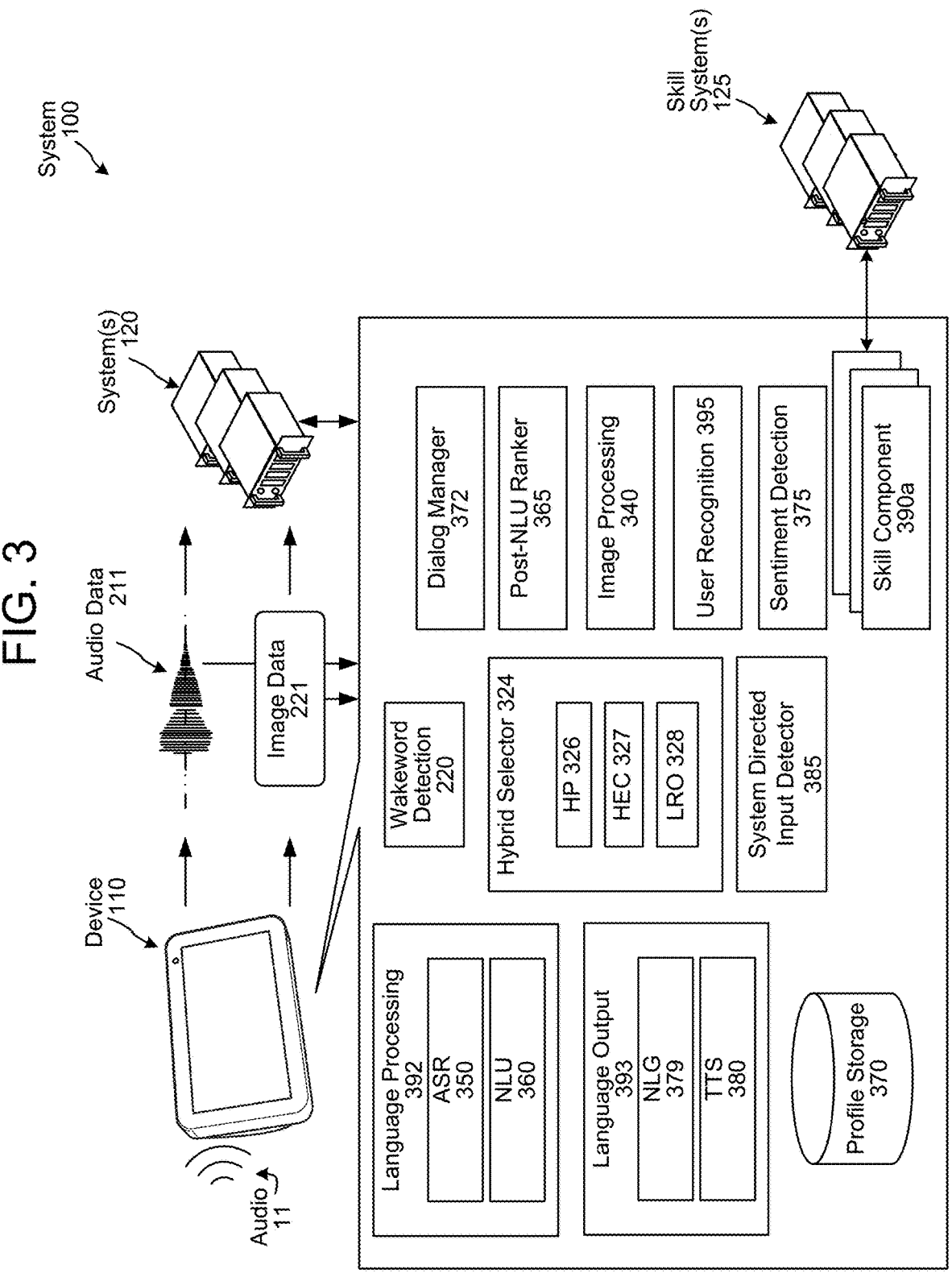

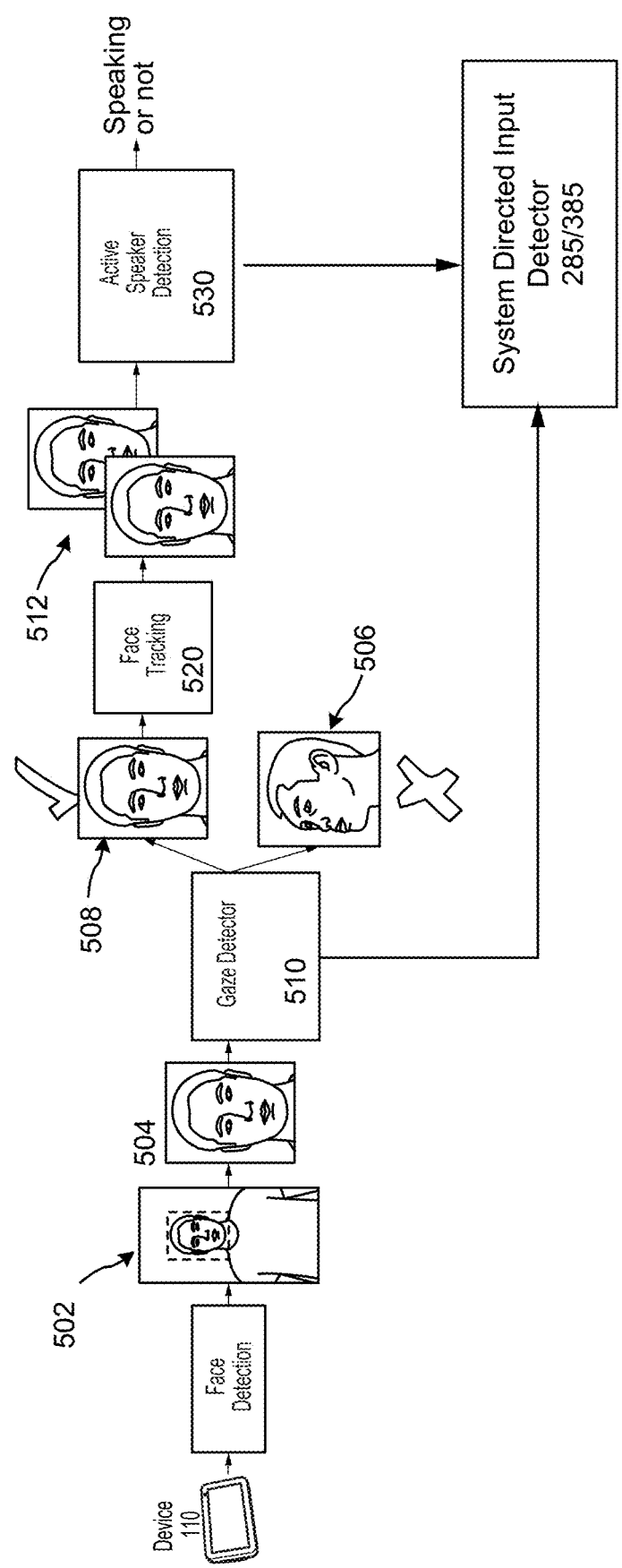

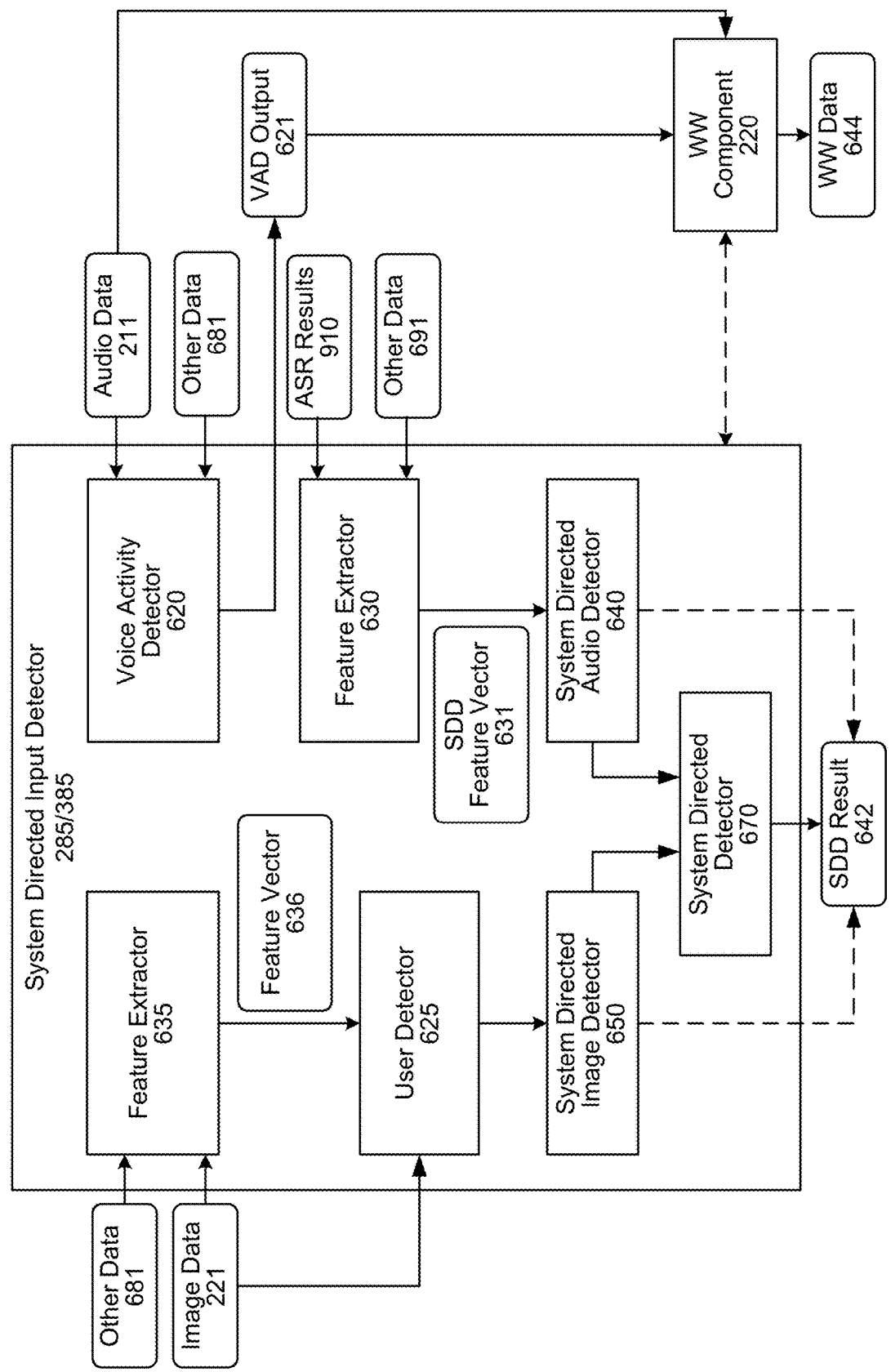

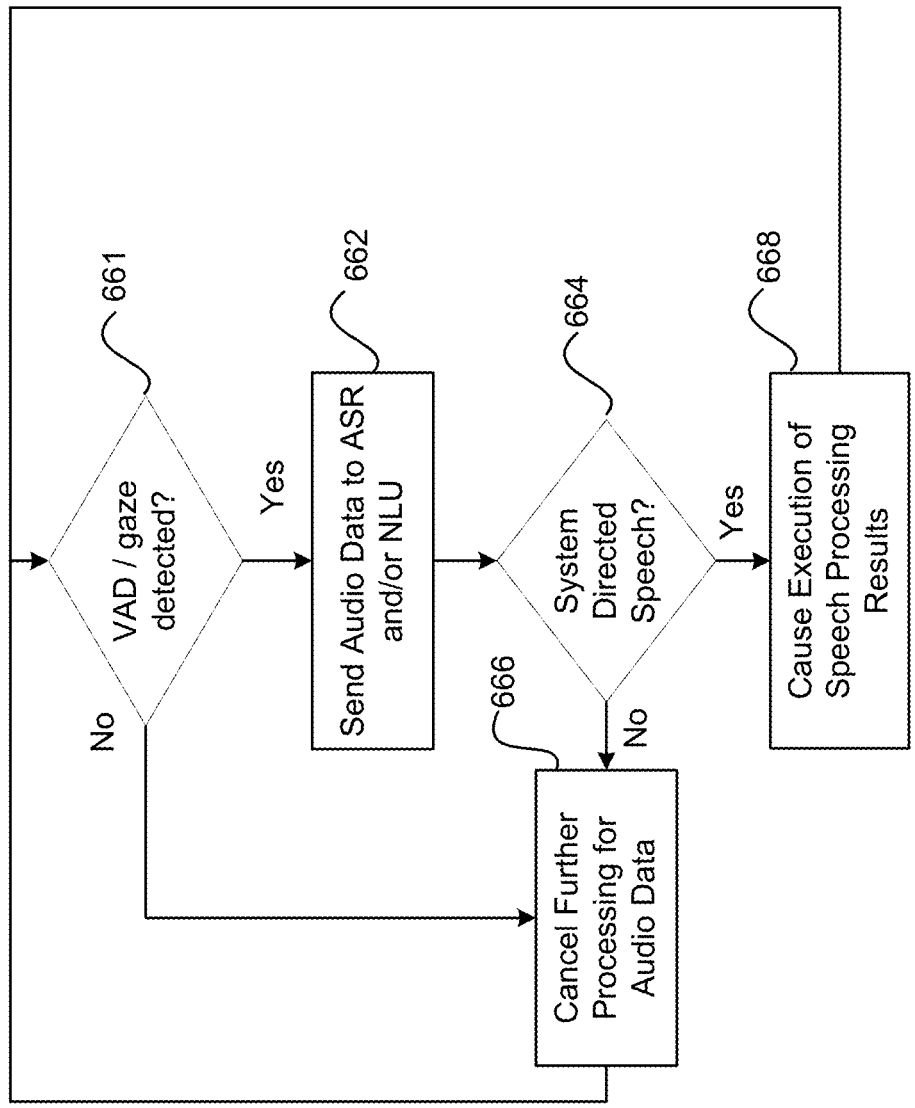

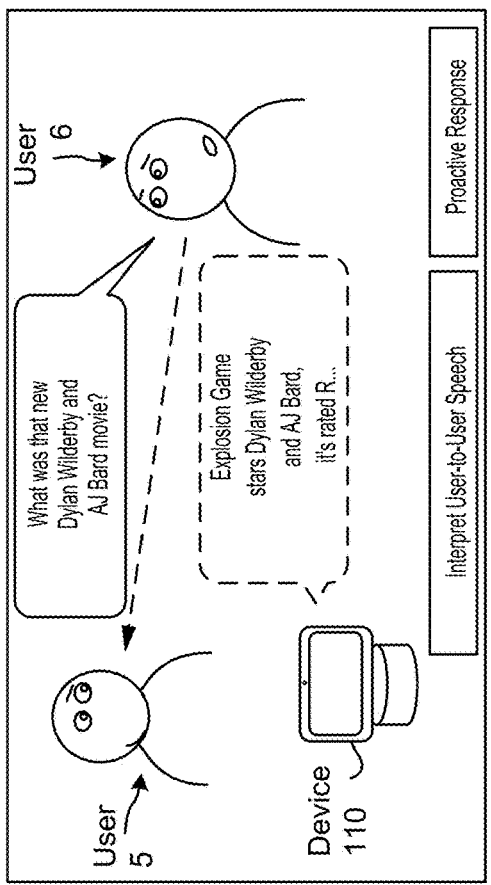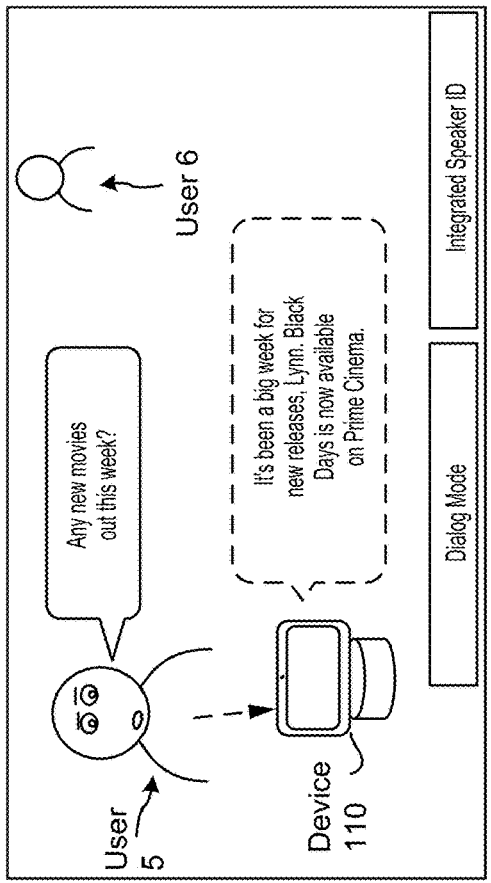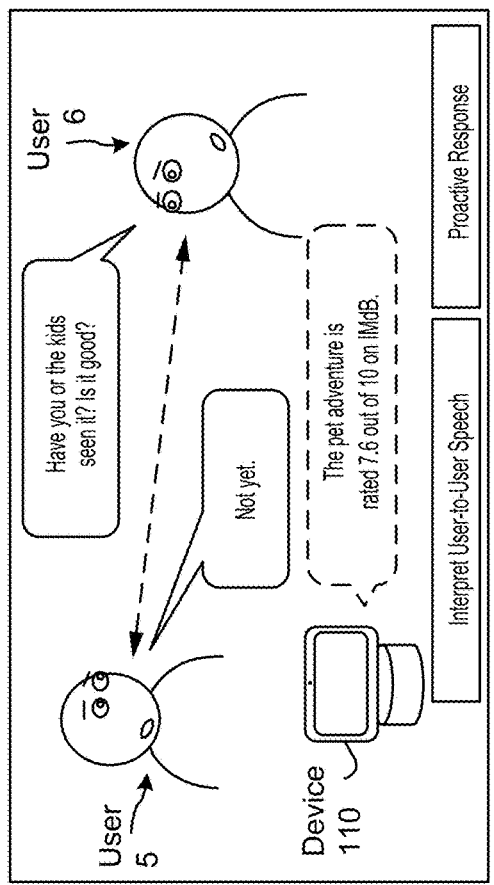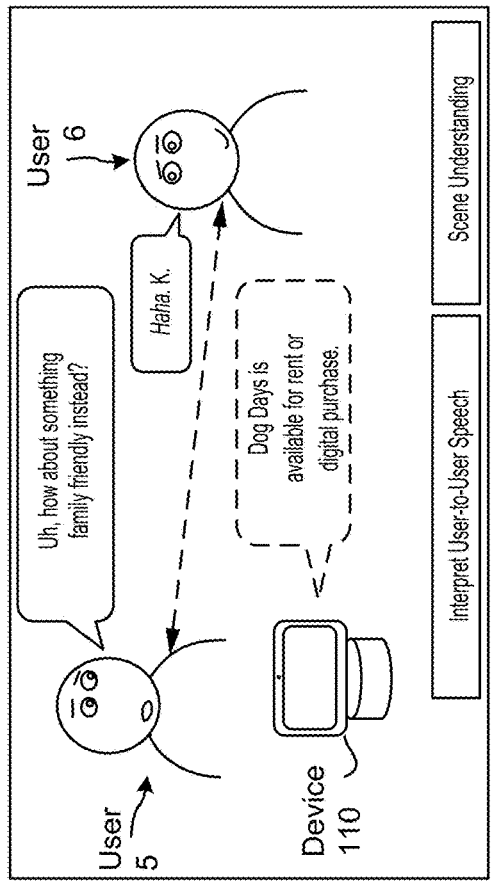

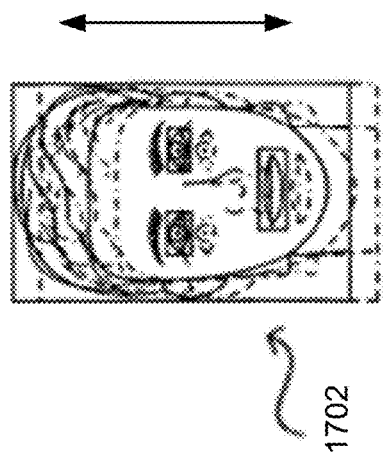
FIG. 17A
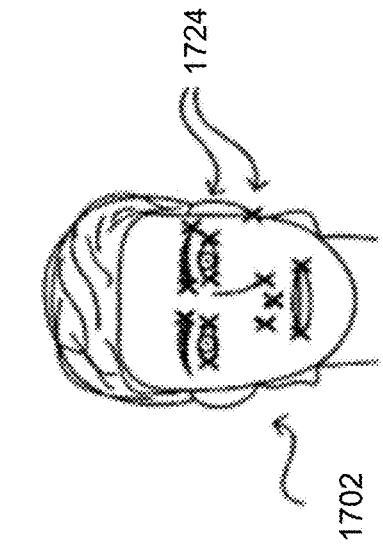
FIG. 17B
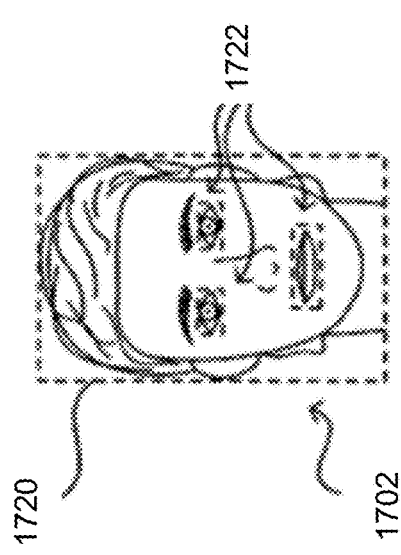
FIG. 17C
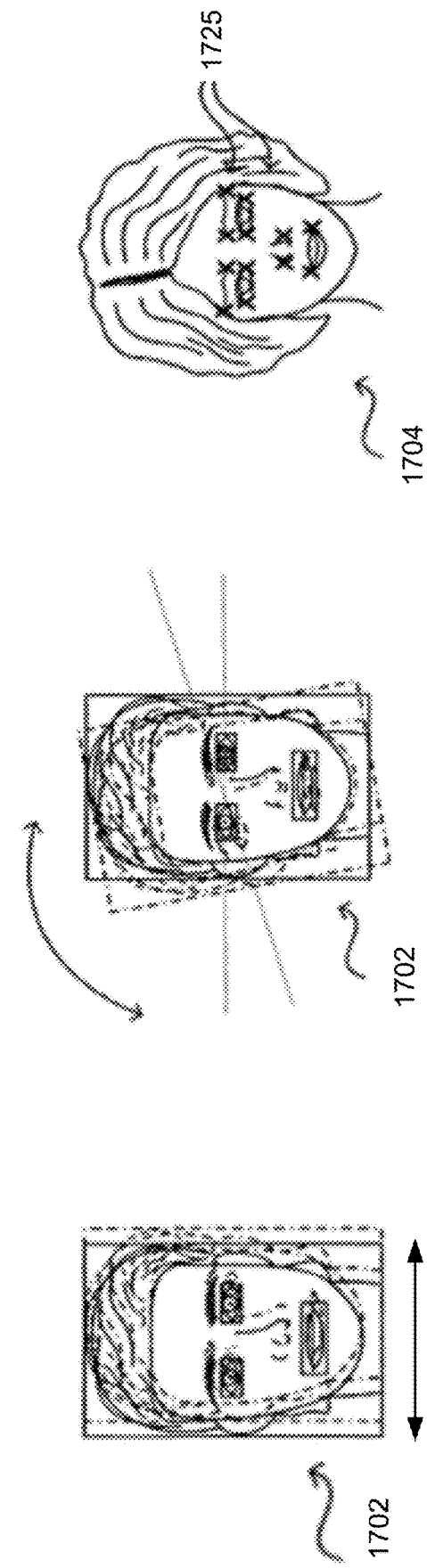
FIG. 17D
FIG. 17E
FIG. 17F

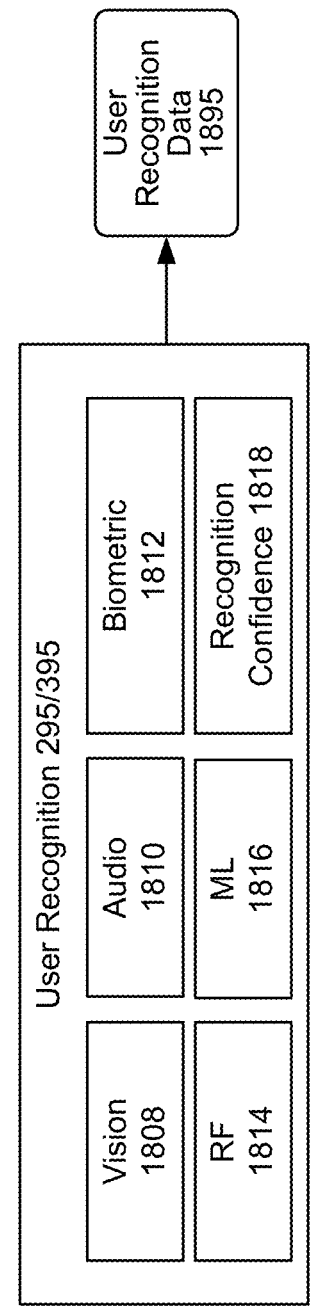

DIALOG MANAGEMENT FOR MULTIPLE USERS

CROSS-REFERENCE TO RELATED APPLICATION DATA

This application claims the benefit of and priority to U.S. Provisional Patent Application No. 63/081,012, filed Sep. 21, 2020, and entitled "Dialog Management for Multiple Users," in the names of Prakash Krishnan, et al. The above provisional application is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a virtual assistant system for managing and coordinating a natural language dialog involving multiple users, according to embodiments of the present disclosure.

FIG. 1B is a conceptual diagram illustrating a virtual assistant system for determining when to interject during a natural language dialog involving multiple users, according to embodiments of the present disclosure.

FIG. 1C is a conceptual diagram illustrating a virtual assistant system for resolving a contextual reference using timing information, according to embodiments of the present disclosure.

FIG. 2 is a conceptual diagram of components of the system, according to embodiments of the present disclosure.

FIG. 3 is a conceptual diagram illustrating components that may be included in a device, according to embodiments of the present disclosure.

FIG. 5 illustrates techniques for using image data to determine whether an input is system directed, according to embodiments of the present disclosure.

FIG. 6A is a conceptual diagrams of components of a system to detect if input audio data includes system directed speech, according to embodiments of the present disclosure.

FIG. 6B is a conceptual diagram illustrating a system operating to detect if input audio data includes system directed speech, according to embodiments of the present disclosure.

FIGS. 15A-15H illustrate interactions with a virtual assistant system for managing and coordinating a natural language dialog involving multiple users, according to embodiments of the present disclosure.

FIGS. 17A-17F illustrate examples of tracking a user's face in image data in accordance various embodiments.

FIG. 18 is a schematic diagram of an illustrative architecture in which sensor data is combined to recognize one or more users according to embodiments of the present disclosure.

DETAILED DESCRIPTION

Figure 4A:
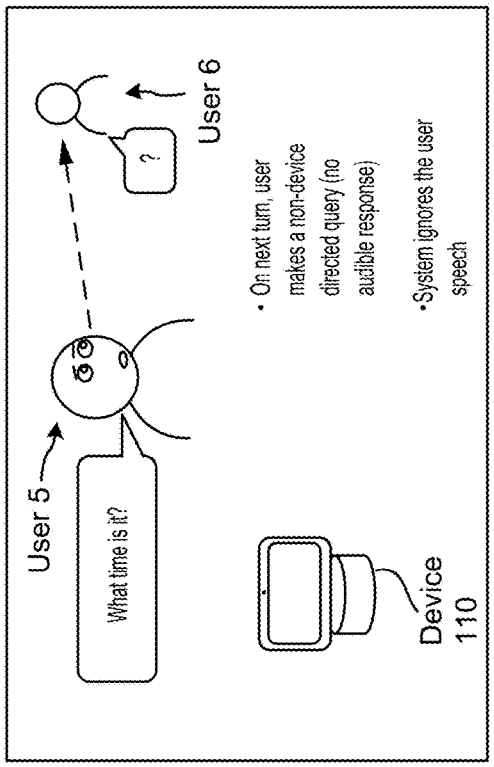
FIGS. 4A-4C illustrate interactions with a virtual assistant system configured to use image data to determine whether an input is system directed, according to embodiments of the present disclosure.

The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

To improve dialog processing, a system may be configured with a multi-user dialog (MUD) mode that allows the system to participate in a dialog with multiple users. As part of this mode (or operating in a normal mode using multi-user dialog components/operations) the system may be configured to identify when a user is speaking to the system and respond accordingly. The system may also be configured to identify when a user is speaking with another user and determine that such user-to-user speech does not require system action and so the system can ignore such speech. The system may also be configured to identify when a user is speaking with another user and determine when such user-to-user speech is relevant to the system such that it is appropriate for the system to interject or respond to the user-to-user speech with information that is relevant to the user, as if the system were a participant in a conversation. This may involve a conversation mode that may be part of or independent from the MUD mode. The system may also be configured to maintain a natural pace during a conversation and to insert conversational cues (such as "uh huh," "mm," or the like) to indicate to the user that the system is maintaining a connection with the user(s) for purposes in participating in the dialog. The system may use models configured to make such determinations based on audio data, image data showing the user(s) and other information. The system may also be configured to discontinue a multi-user dialog mode upon indication by the user, timeout, or other condition.

The system may use computer vision (CV) techniques operating on image data (for example in a multi-user scenario) to determine whether a particular input (for example speech or a gesture) is device directed. The system may thus use image data to determine when a user is speaking to the system or to another user. The system may start conversing with one person, and switch to a second person when the second person gives a visual indication that they are about to talk to the system. Such a visual indication may include, for example, raising a hand, turning to look from another user to look at a device 110, or the like. To make such determinations the system may use face detection techniques to detect a human face represented in image data (for example using object detection component 1630 as discussed below). The system may use a classifier or other model configured to determine whether a face is looking at a device 110 (for example using object tracking component 1660 as discussed below). The system may also be configured to track a face in image data to understand which faces in the video are belonging to the same person and where they may be located in image data and/or relative to a device 110 (for example using user recognition component 295 and/or object tracking component 1660 as discussed below). The system may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement). The system may use components such as user recognition component 295, object tracking component 1660, and/or other components to perform such operations. To determine whether speech or another input is system directed, the system may use the above information as well as techniques described below in reference to system directed input detector 285/385 and FIGS. 6A and 6B.

Beamforming and/or other audio processing techniques may also be used to determine a voice's direction/distance relative to the device 110. Such audio processing techniques, in combination with image processing techniques may be used (along with user identification techniques or operations such as those discussed below) may be used to match a voice to a face and track a user's voice/face in an environment of the device 110 whether a user appears in image data (e.g., in the field of view of a camera 2218 of a device 110) or whether a user moves out of image data but is still detectable by the system 100 through audio data of the user's voice (or other data).

The system may also be configured to discern user-to-user speech and determine when it is appropriate for the system to interject and participate in such a conversation and when it is appropriate for the system to allow the users to converse without interjecting/participating. This may involve a conversation mode that may be part of or independent from the MUD mode. The system may be configured to provide personalized responses and proactively participate in a conversation, even when the system is not directly addressed. The system may determine (in natural turn taking mode) when users are talking to each other, determine whether these are simply sidebar conversations or if they are relevant to the ongoing conversation with the system (for example relevant to the subject of a system-involved dialog), and may proactively interject with helpful information that is personalized and directed to the user addressed by the system. Such operations may allow the system to function as an equal participant in a multi-party conversation. To allow for such operations the system may be configured for discourse understanding as part of natural language understanding (NLU) and dialog management as described below, for example in reference to NLU component 260, dialog manager 272, and conversation analyzer 1120.

The system may also be configured to allow a natural pace during a conversation. The system may include component(s) to allow the system to "backchannel" during gaps in a conversation/dialog and to process breaks and turns within a conversation. For example, the system may be configured to encourage a user to continue speaking by insertion of turn holding cues such as uh, mm, or utterances that are pragmatically and syntactically incomplete followed by a silence. This allows the system to not interrupt a user's flow of the thought and gives the user sufficient time to respond. A classifier or other model may be configured to take into account turn holding cues as part of a spoken interaction between the system and a user. Such a classifier may be included in (and such operations may be managed by) one or more system components, for example dialog manager 272, language output component 293, or other component(s). The system may be configured to input audio data, image data, and other data to consider acoustic cues, prosody and other intonation classifications, as well as computer-vision features discussed herein. For example, if there is a silence that is classified as a pause, the system may returns an empty TTS response and continue to "listen." After an extended silence, the system may return uh huh, ok, hmm, right, yeah, etc. to encourage a user to continue talking. Such backchannel expressions the system's attention to the user without interruption of the user. For example when a user is adding elements to a list, the system may insert a backchannel indication in a gap after an utterance with the anticipation that more elements might get added by the user. This gives the customer more time while being reminded that the system is waiting and so encourages more participation from them or other parties in the conversation. The system may be trained to recognize such conversational components using simulated and model utterances which are syntactically and pragmatically incomplete. The system may also be trained using simulated syntactic incompleteness with utterances including pauses randomly included at the end of phrases within the utterance. The system may also be trained using simulated pragmatic incompleteness with utterances including pauses before all entities that are requested to be updated are provided.

The system may also be configured to determine time information related to a user selecting a portion of output audio, such as from a list of choices, (e.g., "that one") and to use the time information to resolve an anaphoric reference, thus allowing the system to properly determine a choice (such as an entity, action, or the like) referred to by a user during audio playback by a device 110 of the system 100.

FIG. 1A is a conceptual diagram illustrating a virtual assistant system 100 for natural language processing to handle a multi-user dialog, according to embodiments of the present disclosure. As shown in FIG. 1A, the virtual assistant system 100 may include a voice-enabled device 110 local to a user 5, a natural language command processing system 120 (abbreviated "system 120"), and one or more skill support systems 125 (shown in FIG. 2) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may process audio following detection of a wakeword. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data 213 corresponding to a natural language input originating from the user 5, and send the text data to the system 120. The device 110 may also receive output data from the system 120, and generate a synthesized speech output. The device 110 may include a camera for capturing image and/or video data for processing by the system 120. Examples of various devices 110 are further illustrated in FIG. 24. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110. System 120 may also include some combination thereof, for example where certain components/operations are performed via a home server(s) and others are performed via a geographically remote server(s).

As shown in FIG. 1A, a system 100, through device 110/remote system 120 may receive (150) a command to enter a multi-user dialog mode. This may include a spoken utterance with a standard wakeword such as "Alexa, enter multi-user dialog mode," a spoken utterance with a custom wakeword such as "Group," which may invoke the multi-user dialog mode, pressing of a virtual or physical button the device 110, turning on the multi-user dialog mode in a companion application running on a phone/tablet of a user, or the like.

As ongoing participation in a dialog with the system may lead to an undesired user experience if each user utterance needs to be prefaced with a wakeword, activation of multi-user dialog mode may cause the system to change a mode of operation of the device, for example changing (151) a mode of operation of a wakeword component 220 (further discussed below). For example, the multi-user dialog mode may allow all audio captured by the device 110 to be processed (at least minimally) by the system to determine if audio is system directed, without requiring the wakeword to be spoken. In this manner, it may be easier for users to engage in a dialog with the system without repeatedly having to say the wakeword in order to have the system process their utterances. Thus, in one configuration activation of multi-user dialog mode may result in the system 120 instructing device 110 (or device 110 recognizing on its own) to temporarily change the operation of the wakeword component 220 or some other component to allow all captured audio to be processed by the system (for example, at a minimum to perform sufficient processing to determine if such audio was system-directed, as explained below). In one embodiment the wakeword component 220 may be disabled while multi-user dialog mode is active, thus allowing the system to process all audio in the multi-user dialog mode. Thus, all audio data is sent to another component (such as system directed input detector 285/385) to determine if the input corresponding to the audio data is system directed. This may also involve some preliminary processing by language component 292/392 before making a determination whether an input is system directed. In another embodiment, all audio data may still be sent for processing (for example by system directed input detector 285/385) to determine if the input corresponding to the audio data is system directed, however the wakeword component 220 may still be active for purposes of detecting a wakeword, an indication of which may be provided by the wakeword component 220 to the system directed input detector 285/385 to assist in determining whether an input is system directed. In this manner if a user did speak the wakeword during the dialog (e.g., "Alexa, I want the pepperoni pizza") the system may still recognize the wakeword for purposes of determining a system directed input, but may not necessary start a new dialog or assume an entirely new process for processing the utterance as a result of the wakeword being detected. In another embodiment a sensitivity or threshold used by the wakeword component 220 may be adjusted. Alternatively/in addition, the wakeword component 220 may not necessarily be disabled and may still be configured to detect the wakeword (which would still trigger certain system actions in response to detecting the wakeword) but detection of the wakeword may not necessarily be a predicate to the system performing certain operations on incoming audio data (such as determining if such audio was system-directed, as explained below).

With wakeword detection temporarily disabled, the system may then operate in a manner that can detect inputs from multiple users, identify a user that provided an input (for example identifying a user's face and/or voice using user recognition component 295 discussed below), and distinguish between audio intended from one user to another or spoken by one user and intended for the system. For example using techniques described below in reference to system directed input detector 285/385 and FIGS. 6A and 6B. Such system directed detection may assist the system in ensuring that it only processes audio, gestures, etc. directed to the system, as opposed to those directed to other users (or other intended recipients such as pets, other objects, other device(s), etc.). It may also allow the system to discern which user expressions are intended for other users as part of a conversation and whether such expressions are appropriate to trigger a system interjection as part of the conversation as discussed below.

The system detects (152) first audio and image data reflecting speech/image(s) of the first user, user 5. The system determines (154) if the first audio is directed to the system. For example, if the user spoke the audio while looking at the device 110, the system may determine that the first audio is directed to the system. If, however, the user spoke the audio while looking at user 6, the system may determine that the first audio is not directed to the system. The system may also analyze the content of the speech to determine whether it is system directed. Further details of determining whether the first audio is system directed are discussed below, for example in reference to system directed input detector 285/385 and FIGS. 6A and 6B. To protect user privacy, the determination of whether audio is system directed may be performed by components of device 110 (or by components of a home server 120 or the like) to prevent image data/audio data that are not system directed from leaving a user's device.

If the first audio is not system directed (154:No), for example if user 5 is speaking with user 6, the system may disregard (156) the first audio and cease processing with regard to the first audio. If the first audio is system directed (154:Yes), for example if user 5 is talking to device 110, the system may process (158) the first audio and determine some output data (for example using language processing components/dialog manager/skills as discussed herein) to respond to the first user. The system may user a user identifier or user profile information corresponding to the first user to customize the response for the first user. For example, providing personalized recommendations, responding in a preferred voice, etc.

The system may also detect (160) second audio and image data reflecting speech/image(s) of the second user, user 6. The system determines (162) if the second audio is directed to the system. For example, if the user spoke the audio while looking at the device 110, the system may determine that the second audio is directed to the system. If, however, the user spoke the audio while looking at user 5, the system may determine that the second audio is not directed to the system. The system may also analyze the content of the speech to determine whether it is system directed. Further details of determining whether the first audio is system directed are discussed below, for example in reference to system directed input detector 285/385 and FIGS. 6A and 6B. To protect user privacy, the determination of whether audio is system directed may be performed by components of device 110 (or by components of a home server 120 or the like) to prevent image data/audio data that are not system directed from leaving a user's device.

If the second audio is not system directed (162:No), for example if user 6 is speaking with user 5, the system may disregard (156) the second audio and cease processing with regard to the second audio. If the second audio is system directed (162:Yes), for example if user 6 is talking to device 110, the system may process (164) the second audio and determine some output data (for example using language processing components/dialog manager/skills as discussed herein) to respond to the second user. The system may user a user identifier or user profile information corresponding to the second user to customize the response for second first user. For example, providing personalized recommendations, responding in a preferred voice, etc.

The system may be configured to discontinue a multi-user dialog mode upon indication by the user, timeout, or other condition. For example, if a user speaks "end group mode" the system may discontinue the multi-user dialog mode. In another example, if the system detects no speech for a certain period of time (e.g., 30 seconds), the system may discontinue the multi-user dialog mode. In another example, if the user touches a certain button on a screen of a device 110 or on the device 110 itself, the system may discontinue the multi-user dialog mode. In another example, the system may receive an input from a companion device to discontinue the multi-user dialog mode.

FIG. 1B is a conceptual diagram illustrating a virtual assistant system 100 to act as a conversation participant, according to embodiments of the present disclosure. As shown in FIG. 1B, a system 100, through device 110/remote system 120 may receive (170) a command to enter a conversation mode. This may include a spoken utterance with a standard wakeword such as "Alexa, enter conversation mode," or "join my conversation," a spoken utterance with a custom wakeword such as "Conversation," which may invoke the conversation mode, pressing of a virtual or physical button the device 110, turning on the multi-user dialog mode in a companion application running on a phone/tablet of a user, or the like. Although FIG. 1B and other examples below illustrate an ongoing conversation between the system and two users, the techniques described herein may apply for any other number of users.

As ongoing participation in a conversation with the system and one or more user(s) may lead to an undesired user experience if each user utterance needs to be prefaced with a wakeword, activation of conversation mode may cause the system to change a mode of operation of the device, for example changing (172) a mode of operation of a wakeword component 220 (further discussed below). For example, the conversation mode may allow all audio captured by the device 110 to be processed (at least minimally) by the system to determine if directed user expression (which may include audio, a gesture, etc.) should be processed by the system for purposes of participating in the conversation, without requiring the wakeword to be spoken.

The system detects (174) first audio and image data reflecting speech/image(s) of a first user expression made by the first user 5. The first user expression may include speech, a gesture (such as a movement, facial expression, etc.) or the like. The system determines (176) if the first user expression is directed to the system. If the first user expression is not system directed (176:No), for example if user 5 is speaking with user 6, the system may check to see whether the first expression is appropriate processable by the system for the system to interject a response as part of the conversation. For example, the system may process a variety of inputs related to the conversation and first user expression using a conversation analyzer 1120, as further discussed below. If the first user expression should not lead to a system interjection (178:No) the system may determine not to respond (179) to the first audio. The system may also cease processing with regard to the first audio or may continue processing the first audio for purposes of updating the system's dialog data to reflect the most updated status of the conversation between the two users, even if the system itself does not respond. The system may then continue the process from step 174 or step 182 depending on which user performs an expression next. If the first expression is system directed (176:Yes), for example if user 5 is talking to device 110, or if the first user expression should lead to a system interjection (178:Yes), the system may process (180) the first audio and determine some output data (for example using language processing components/dialog manager/skills as discussed herein) to respond to the first user. In responding the system may consider not only the first audio but also any information relative to the conversation/dialog, such as dialog data that may contextualize or otherwise inform how the system should respond to the first audio. The system may user a user identifier or user profile information corresponding to the first user to customize the response for the first user. For example, providing personalized recommendations, responding in a preferred voice, etc.

The system may also detect (182) second audio and image data reflecting speech/image(s) of a second expression made by the second user 6. The second user expression may include speech, a gesture (such as a movement, facial expression, etc.) or the like. The system determines (184) if the second expression is directed to the system. For example, if the user spoke the audio while looking at the device 110, the system may determine that the second expression is directed to the system. If, however, the user spoke the audio while looking at user 5, the system may determine that the second audio is not directed to the system. The system may also analyze the content of the speech to determine whether it is system directed. Further details of determining whether the second audio is system directed are discussed below, for example in reference to system directed input detector 285/385 and FIGS. 6A and 6B. To protect user privacy, the determination of whether audio is system directed may be performed by components of device 110 (or by components of a home server 120 or the like) to prevent image data/audio data that are not system directed from leaving a user's device.

If the second user expression is not system directed (184:No), for example if user 6 is speaking with user 5, the system may check to see whether the second expression is appropriate processable by the system for the system to interject a response as part of the conversation. For example, the system may process a variety of inputs related to the conversation and second user expression using a conversation analyzer 1120, as further discussed below. If the second user expression should not lead to a system interjection (186:No) the system may not respond to (179) the second audio. The system may also cease processing with regard to the second audio or may continue processing the second audio for purposes of updating the system's dialog data to reflect the most updated status of the conversation between the two users, even if the system itself does not respond. The system may then continue the process from step 174 or step 182 depending on which user performs an expression next. If the second expression is system directed (184:Yes), for example if user 6 is talking to device 110, or if the second user expression should lead to a system interjection (186:Yes), the system may process (188) the second audio and determine some output data (for example using language processing components/dialog manager/skills as discussed herein) to respond to the second user. In responding the system may consider not only the second audio but also any information relative to the conversation/dialog, such as dialog data that may contextualize or otherwise inform how the system should respond to the second audio. The system may user a user identifier or user profile information corresponding to the second user to customize the response for second first user. For example, providing personalized recommendations, responding in a preferred voice, etc.

The system may be configured to discontinue a conversation mode upon indication by the user, timeout, or other condition. For example, if a user speaks "end conversation mode" the system may discontinue the conversation mode. In another example, if the system detects no speech for a certain period of time (e.g., 60 seconds), the system may discontinue the conversation mode. In another example, if the user touches a certain button on a screen of a device 110 or on the device 110 itself, the system may discontinue the conversation mode. In another example, the system may receive an input from a companion device to discontinue the conversation mode.

FIG. 1C illustrates how the system 100 may use time data to resolve anaphora/a contextual reference. As shown in FIG. 1C, a system 100, through device 110/remote system 120 may begin (189) playback of output audio at a first time. The output audio may correspond to a list of entries, for example a TTS output responsive to a previous user request that called for the system to output the list. For example, a user may have requested the system provide some information regarding potential recipes for dinner. The system 120 may determine a list of such entries, perform TTS to create output audio data corresponding to the list, send that output audio data to device 110, and the device 110 may begin (189) playback of the output audio corresponding to the list. In another example the list of entries may corresponding to a list of actions, for example if the user requested information about a particular movie, the list of actions may include selections such as "rent movie," "purchase movie," "play a trailer," "provide more information," or the like. At some point (e.g., at a second time) during the playback of the audio, the user may interrupt. The device 110 may detect (190) that the user speech occurred during the playback at that second time (e.g., when the user barged-in on the device's audio output). The device 110 may determine (191) time data, such as an offset between the first time and the second time, where the offset represents how long the audio for the list was playing prior to the user barging-in. The device 110 may also determine (192) input audio data representing the user speech. The device 110 may then send (193) the input audio data and the time data to the system 120.

The system 120 may receive (194) the input audio data and the time data. The system may determine (195) that the input audio data includes an anaphoric reference. For example "that one" or the like. The system may process (196) the offset time data and timing data related to the TTS representation of the list to estimate an interruption position in the list corresponding to the user's barge-in. The system may then determine (197) a selection of the list at the interruption position. The system may then process (198) the input audio data using the selection, e.g., perform speech processing with the selected entity resolved to be the entity referred to in the anaphoric reference. Further operations regarding the above may be found below in reference to FIGS. 13 and 14.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 2218 of the device 110 and may send image data 221 representing those image(s) to the system 120. The image data 221 may include raw image data or image data processed by the device 110 before sending to the system 120. The image data 221 may also include individual still images and/or a video feed of multiple images.

The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 220 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 290 of one or more systems 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 7.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 125, etc.) to execute the intent. For example, if the text data corresponds to "play the 5$^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora/a contextual reference such as "this song" or "my next appointment"— the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

The NLU component 260 may return NLU results data 985/925 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 985/925 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. Although illustrated as a separate component, the post-NLU ranker 265 may be incorporated within NLU 260 depending on system configuration. The local device 110 may also include its own post-NLU ranker 365, which may operate similarly to the post-NLU ranker 265. The NLU component 260, post-NLU ranker 265 and other components are described in greater detail below with regard to FIGS. 8 and 9.

A skill component may be software running on the system(s) 120 that is akin to a software application. That is, a skill component 290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

The system(s) 100 may include a dialog manager component 272 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on system configuration the dialog manager 272 may determine the appropriate system generated response to give to a particular utterance or user input of a turn. Or creation of the system generated response may be managed by another component of the system (e.g., the language output component 293, NLG 279, orchestrator 230, etc.) while the dialog manager 272 selects the appropriate responses. Alternatively, another component of the system(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager 272 may receive the ASR hypothesis/hypotheses (i.e., text data) and make a semantic interpretation of the phrase(s) or statement(s) represented therein. That is, the dialog manager 272 determines one or more meanings associated with the phrase(s) or statement(s) represented in the text data based on words represented in the text data. The dialog manager 272 determines a goal corresponding to an action that a user desires be performed as well as pieces of the text data that allow a device (e.g., the device 110, the system(s) 120, a skill 290, a skill system(s) 125, etc.) to execute the intent. If, for example, the text data corresponds to "what is the weather," the dialog manager 272 may determine that that the system(s) 120 is to output weather information associated with a geographic location of the device 110. In another example, if the text data corresponds to "turn off the lights," the dialog manager 272 may determine that the system(s) 120 is to turn off lights associated with the device(s) 110 or the user(s) 5.

The dialog manager 272 may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

The system 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 2110 discussed below). Alternatively or in addition, the TTS component 280 may receive text data from a skill 290 or other system component for output.

The NLG component 279 may include a trained model. The NLG component 279 generates text data 2110 from dialog data received by the dialog manager 272 such that the output text data 2110 has a natural feel and, in some embodiments, includes words and/or phrases specifically formatted for a requesting individual. The NLG may use templates to formulate responses. And/or the NLG system may include models trained from the various templates for forming the output text data 2110. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 211 representing the commands to the system(s) 120 for processing, after which the system(s) 120 may return output data that can cause the device 110 to engage its camera.

Upon receipt by the system(s) 120, the image data 221 may be sent to an orchestrator component 230. The orchestrator component 230 may send the image data 221 to an image processing component 240. The image processing component 240 can perform computer vision functions such as object recognition, modeling, reconstruction, etc. For example, the image processing component 240 may detect a person, face, etc. (which may then be identified using user recognition component 295). The image processing component 240 is described in greater detail below with regard to FIG. 16. The device may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The system(s) 120 may include a user recognition component 295 that recognizes one or more users using a variety of data, as described in greater detail below with regard to FIGS. 18-19. However, the disclosure is not limited thereto, and the device 110 may include a user recognition component 395 instead of and/or in addition to user recognition component 295 of the system(s) 120 without departing from the disclosure. User recognition component 395 operates similarly to user recognition component 295.

The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users assuming user permission and previous authorization. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may also be configured to determine (or assist another component in determining) that a particular voice matches a particular face for purposes of user identification and/or following a user in an environment if the user is not visible in image data).

Output of the user recognition component 295 may include a single user identifier corresponding to the most likely user that originated the user input. Alternatively, output of the user recognition component 295 may include an N-best list of user identifiers with respective scores indicating likelihoods of respective users originating the user input. The output of the user recognition component 295 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various data 271 (not illustrated separately) corresponding to a user/group of the profile. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like as described in greater detail below with regard to FIG. 20. The sentiment detection component 275 may be included in system(s) 120, as illustrated in FIG. 2, although the disclosure is not limited thereto and the sentiment detection component 275 may be included in other components without departing from the disclosure. For example the sentiment detection component 375 may be included in the device 110, as a separate component, etc. Sentiment detection component 375 may operate similarly to sentiment detection component 275. The system 120 may use the sentiment detection component 275 to, for example, customize a response for a user based on an indication that the user is happy or frustrated.

Although the components of FIG. 2 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIGS. 2 and 3, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may also include a system directed input detector 385. (The system 120 may also include a system directed input detector 285 which may operate in a manner similar to system directed input detector 385.) The system directed input detector 385 may be configured to determine whether an input to the system (for example speech, a gesture, etc.) is directed to the system or not directed to the system (for example directed to another user, etc.). The system directed input detector 385 may work in conjunction with the wakeword detector 220. If the system directed input detector 385 determines an input is directed to the system, the device 110 may "wake" and begin sending captured data for further processing (for example, processing audio data using the language processing 292/392, processing captured image data using image processing component 240/340 or the like). If data is being processed the device 110 may indicate such to the user, for example by activating or changing the color of an illuminated output (such as an LED ring), displaying an indicator on a display (such as a light bar across the display), outputting an audio indicator (such as a beep) or otherwise informing a user that input data is being processed. If the system directed input detector 385 determines an input is not directed to the system (such as a speech or gesture directed to another user) the device 110 may discard the data and take no further action for processing purposes. In this way the system 100 may prevent processing of data not directed to the system, thus protecting the users' privacy. As an indicator to the user, however, the system may output an audio, visual, or other indicator when the system directed input detector 385 is determining whether an input is potentially device directed. For example, the system may output an orange indicator while considering an input, and may output a green indicator if a system directed input is detected. Other such configurations are possible. Further details regarding the system directed input detector 385 are included below with regard to FIGS. 6A and 6B.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the system 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system 120 (which may operate similarly to skill components 290), a user recognition component 395 (configured to process in a similar manner to that discussed herein with respect to the user recognition component 295 of the system 120), profile storage 370 (configured to store similar profile data to that discussed herein with respect to the profile storage 270 of the system 120), or other components. In at least some embodiments, the profile storage 370 may only store profile data for a user or group of users specifically associated with the device 110. Similar to as described above with respect to skill component 290, a skill component 390 may communicate with a skill system(s) 125. The device 110 may also have its own language output component 393 which may include NLG component 379 and TTS component 380. Language output component 393 may operate similarly to language output component 293, NLG component 379 may operate similarly to NLG component 279 and TTS component 380 may operate similarly to TTS component 280.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the system 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

Figure 4B:
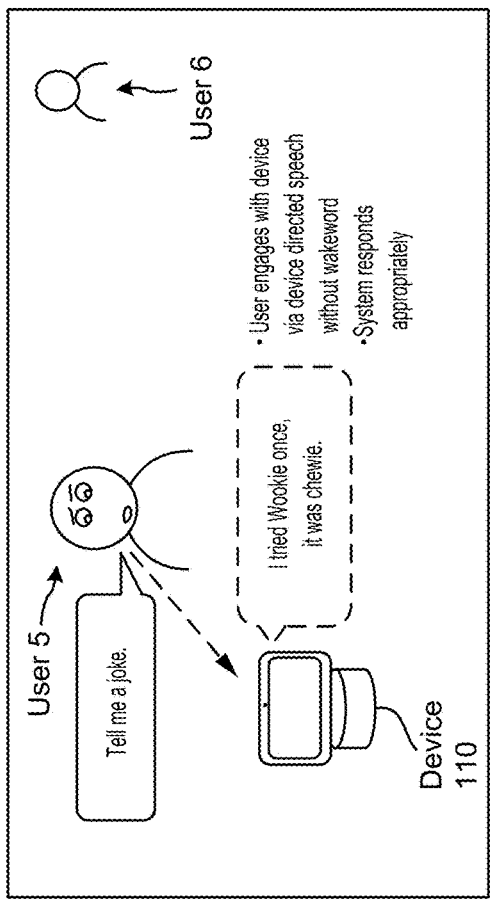
Figure 4C:
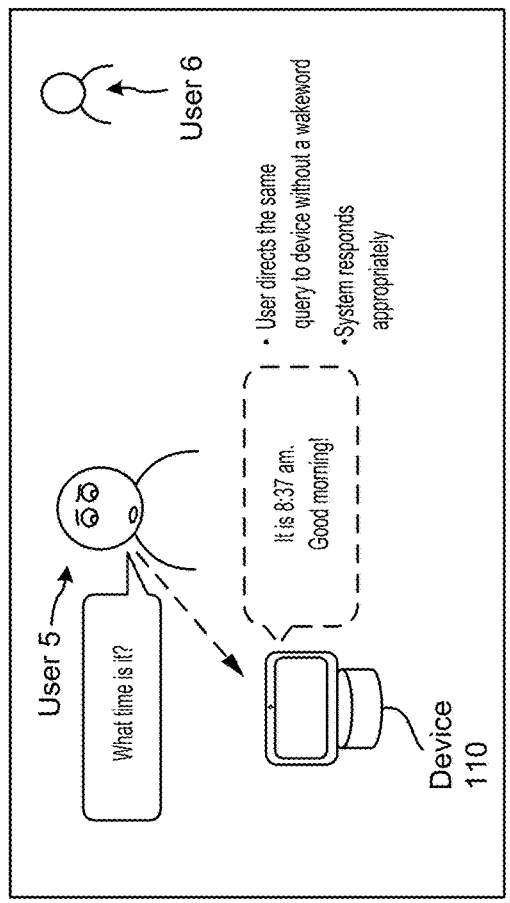

FIGS. 4A-4C illustrate interactions with a virtual assistant system configured to use image data to determine whether an input is system directed, according to embodiments of the present disclosure. As shown in FIG. 4A, a user 5 may speak an utterance to the device 110. The utterance may not necessarily include a wakeword but the system is able to determine that the speech is system directed as described above as the user 5 is gazing at the device. The system therefore processes the speech and determines an appropriate response. As shown in FIG. 4B, on a next turn, the user 5 may make a non-device directed query to user 6 (which user 6 may respond to in a manner that is not detected by device 110). As the user 5 is not looking at device 110, and is speaking away from the device, the system may determine that this particular utterance is not system directed and so the system may ignore the speech. As shown in FIG. 4C, the user 5 may then direct the same query to the device 110, also without a wakeword. Because the user is again looking at the device and speaking to the device as opposed to away from the device, the system directed input detector 385 determines that the user is speaking to the system and therefore processes the speech and determines an appropriate response. Although the display of device 110 may be shown in these figures, the users may be within a field of view of the device 110 (e.g., detectable by one or more cameras of device 110), allowing the system to capture image data related to the users. In another example, the system may use audio data or image data available from one or more other devices to capture information regarding the users. For example, a user may appear at one point within a field of view of a camera of the system (either a camera of device 110 or of another connected device of the system). At another point the user may move outside the field of view. The system may, assuming user permissions, track the user using data from another camera, and/or use audio data (for example using a beamforming component of the system) to determine a position or other information about a user for purposes of operations discussed herein.

For example, as shown in FIG. 5, device 110 may receive image data 211 from one or more camera(s) 2218 and may use a face detection algorithm (executed, for example, by object detection component 1630 as discussed below) to identify a face in image data, as shown by bounded face 502. The device 110 may then isolate the image data 504 of the face and process that image data using the system directed detector 385 a gaze detector 510 (for example as executed by object tracking component 1660 and/or user detector 625) to determine if the user's gaze is directed to the device or elsewhere. If the user is not looking at the device (e.g., as shown in image 506) then the system may determine that user's gaze is directed elsewhere and the appropriate component may output data accordingly. If the user is looking at the device (e.g., as shown in image 508) then the system may determine that user's gaze is directed at the device and may commence tracking the user's face using a face tracking component 520 (for example as part of object tracking component 1660). The system may then refer to a series of images 512 of the same face and process related image data by an active speaker detection component 530 (for example as part of user detector 625 discussed below) to determine if the face represented in image data 211/504/508 is speaking. Data output by the gaze detector 510 and active speaker detection component 530 may be sent to the system directed image detector 650 (discussed below) and/or system directed detector 670 (discussed below) to determine if an input is system directed.

The gaze detector 510 may thus output one or more scores or other data indicating user behavior or other data determined from the image data and pass that data to system directed input detector 385 to be used by one of its internal components (e.g., system directed image detector 650). For example, the user detector gaze detector 510 may pass a variety of score representing the image data. For example:

<Face 1: Gazing at Device [1:Yes]>
<Face 2: Gazing at Device [0:No]>
<Face 3: Gazing at Device [1:Yes]>
<Face 1: Speaking [1:Yes]>
<Face 2: Speaking [0:No]>
<Face 3: Speaking [0:No]>
<Face 1: User pointing at device [0.875]>

And/or the like. The scores may each be associated with time data (such as a timestamp, frame number, etc.) so the data from the gaze detector 510 (e.g., user detector 625)/system directed image detector 650 may be aligned with the data from the feature extractor 630/system directed audio detector 640 as those components operate as discussed below. Alignment may be performed using a device clock or other time data source. The system may also be configured to account for some drift in alignment depending on timing of data received from various components. Using timing information and other data the system may be configured to detect a change in gaze, along with the timing, severity, direction, etc. of same which may also be used as a signal to determine SDD result 642.

Configuration and operation of the system directed input detector 385 is illustrated in FIGS. 6A and 6B. As shown in FIG. 6A, the system directed input detector 385 may include a number of different components. First, the system directed input detector 385 may include a voice activity detector (VAD) 620. The VAD 620 may operate to detect whether the incoming audio data 211 includes speech or not. The VAD output 621 may be a binary indicator. Thus, if the incoming audio data 211 includes speech, the VAD 620 may output an indicator 621 that the audio data 211 does includes speech (e.g., a 1) and if the incoming audio data 211 does not includes speech, the VAD 620 may output an indicator 621 that the audio data 211 does not includes speech (e.g., a 0). The VAD output 621 may also be a score (e.g., a number between 0 and 1) corresponding to a likelihood that the audio data 211 includes speech. The VAD 620 may also perform start-point detection as well as end-point detection where the VAD 620 determines when speech starts in the audio data 211 and when it ends in the audio data 211. Thus the VAD output 621 may also include indicators of a speech start point and/or a speech endpoint for use by other components of the system. (For example, the start-point and end-points may demarcate the audio data 211 that is sent to the speech processing component 240.) The VAD output 621 may be associated with a same unique ID as the audio data 211 for purposes of tracking system processing across various components.

The VAD 620 may operate using a variety of VAD techniques, including those described above with regard to VAD operations performed by device 110. The VAD may be configured to be robust to background noise so as to accurately detect when audio data actually includes speech or not. The VAD 620 may operate on raw audio data 211 such as that sent by device 110 or may operate on feature vectors or other data representing the audio data 211. For example, the VAD 620 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 620 may also operate on other data 681 that may be useful in detecting voice activity in the audio data 211. For example, the other data 681 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 620 that speech was detected. If not, that may be an indicator to the VAD 620 that speech was not detected. (For example, a representation may be taken of voice data in the first input audio data which may then be compared to the second input audio data to see if the voices match. If they do (or do not) that information may be considered by the VAD 620.) The VAD 620 may also consider other data when determining if speech was detected. The VAD 620 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 620 may also consider data regarding a previous utterance which may indicate whether the further audio data received by the system is likely to include speech. Other VAD techniques may also be used.

If the VAD output 621 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 621 indicates that speech was detected, the system may make a determination as to whether the speech was or was not directed to the speech-processing system. Such a determination may be made by the system directed audio detector 640. The system directed audio detector 640 may include a trained model, such as a DNN, that operates on a feature vector which represent certain data that may be useful in determining whether or not speech is directed to the system. To create the feature vector operable by the system directed audio detector 640, a feature extractor 630 may be used. The feature extractor 630 may input ASR results 910 which include results from the processing of the audio data 211 by the speech recognition component 350. For privacy protection purposes, in certain configurations the ASR results 910 may be obtained from a language processing component 392/ASR component 350 located on device 110 or on a home remote component as opposed to a language processing component 292/ASR component 250 located on a cloud or other remote system 120 so that audio data 211 is not sent remote from the user's home unless the system directed input detector component 385 has determined that the input is system directed. Though this may be adjusted depending on user preferences/system configuration.

The ASR results 910 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 910 may include a trellis, which may include a raw search graph as scored during ASR decoding. The ASR results 910 may also include a lattice, which may be a trellis as scored that has been pruned to remove certain hypotheses that do not exceed a score threshold or number of hypotheses threshold. The ASR results 910 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 910 may also include corresponding respective scores (such as for a trellis, lattice, confusion network, individual hypothesis, N-best list, etc.)

The ASR results 910 (or other data 691) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 350 being less confident about its best hypothesis, which in turn may correlate to detected speech not being device directed. The entropy may be a feature included in other data 691 to be considered by the system directed audio detector 640.

The system may also determine and consider ASR decoding costs, which may include features from Viterbi decoding costs of the ASR. Such features may indicate how well the input acoustics and vocabulary match with the acoustic models 753 and language models 754. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 350 is less confident about the top hypothesis, which may correlate to detected speech not being device directed. Other such features or data from the ASR results 910 may also be used as other data 691.

The ASR results 910 may be represented in a system directed detector (SDD) feature vector 631 that can be used to determine whether speech was system-directed. The feature vector 631 may represent the ASR results 910 but may also represent audio data 211 (which may be input to feature extractor 630) or other information. Such ASR results may be helpful in determining if speech was system-directed. For example, if ASR results include a high scoring single hypothesis, that may indicate that the speech represented in the audio data 211 is directed at, and intended for, the device 110. If, however, ASR results do not include a single high scoring hypothesis, but rather many lower scoring hypotheses, that may indicate some confusion on the part of the speech recognition component 350 and may also indicate that the speech represented in the audio data 211 was not directed at, nor intended for, the device 110.

The ASR results 910 may include complete ASR results, for example ASR results corresponding to all speech between a startpoint and endpoint (such as a complete lattice, etc.). In this configuration the system may wait until all ASR processing for a certain input audio has been completed before operating the feature extractor 630 and system directed audio detector 640. Thus the system directed audio detector 640 may receive a feature vector 631 that includes all the representations of the audio data 211 created by the feature extractor 630. The system directed audio detector 640 may then operate a trained model (such as a DNN) on the feature vector 631 to determine a score corresponding to a likelihood that the audio data 211 includes a representation of system-directed speech. If the score is above a threshold, the system directed audio detector 640 may determine that the audio data 211 does include a representation of system-directed speech. The SDD result 642 may include an indicator of whether the audio data includes system-directed speech, a score, and/or some other data.

In one configuration the SDD result 642 may indicate if a user input/expression is directed at another user. For example, the system directed input detector 285/385 may process its various input data to determine that a first user is speaking to a second user. This may be indicated with one identifier corresponding to the speaking user and another identifier corresponding to the user to which the speaking user is addressing. User recognition component 295/395/user recognition data 1895 may be used for such purposes. In this manner the SDD result 642 may identify the source and target of a user expression. This data may be included, for example, in dialog data that may be used by dialog manager 272/372 so that the system may track the sources and targets of various expressions of a conversation/dialog.

The ASR results 910 may also include incomplete ASR results, for example ASR results corresponding to only some speech between a between a startpoint and endpoint (such as an incomplete lattice, etc.). In this configuration the feature extractor 630/system directed audio detector 640 may be configured to operate on incomplete ASR results 910 and thus the system directed audio detector 640 may be configured to output an SSD result 642 that provides an indication as to whether the portion of audio data processed (that corresponds to the incomplete ASR results) corresponds to system directed speech. The system may thus be configured to perform ASR at least partially in parallel with the system directed audio detector 640 to process ASR result data as it is ready and thus continually update an SDD result 642. Once the system directed input detector 385 has processed enough ASR results and/or the SDD result 642 exceeds a threshold, the system may determine that the audio data 211 includes system-directed speech. Similarly, once the system directed input detector 385 has processed enough ASR results and/or the SDD result 642 drops below another threshold, the system may determine that the audio data 211 does not include system-directed speech.

The SDD result 642 may be associated with a same unique ID as the audio data 211 and VAD output 621 for purposes of tracking system processing across various components.

The feature extractor 630 may also incorporate in a feature vector 631 representations of other data 691. Other data 691 may include, for example, word embeddings from words output by the speech recognition component 350 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 630 processing and representing a word embedding in a feature vector 631 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 691 may also include, for example, NLU output from the natural language 260 component may be considered. Thus, if natural language output data 985/925 indicates a high correlation between the audio data 211 and an out-of-domain indication (e.g., no intent classifier scores from ICs 864 or overall domain scores from recognizers 863 reach a certain confidence threshold), this may indicate that the audio data 211 does not include system-directed speech. Other data 691 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech. The other data 691 may also include an indication that a voice represented in audio data 211 is the same (or different) as the voice detected in previous input audio data corresponding to a previous utterance. The other data 691 may also include directionality data, for example using beamforming or other audio processing techniques to determine a direction/location of a source of detected speech and whether that source direction/location matches a speaking user. The other data 691 may also include data indicating that a direction of a user's speech is toward a device 110 or away from a device 110, which may indicate whether the speech was system directed or not.

Other data 691 may also include image data 221. For example, if image data is detected from one or more devices that are nearby to the device 110 (which may include the device 110 itself) that captured the audio data being processed using the system directed input detector (385), the image data may be processed to determine whether a user is facing an audio capture device for purposes of determining whether speech is system-directed as further explained below.

Other data 691 may also dialog history data. For example, the other data 691 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 691 may also include an indicator as to whether the audio data 211 was received as a result of a wake command or whether the audio data 211 was sent without the device 110 detecting a wake command (e.g., the device 110 being instructed by remote system 120 and/or determining to send the audio data without first detecting a wake command).

Other data 691 may also include information from the user profile 270.

Other data 691 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 691 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 691 may also include an indicator that indicates whether the audio data 211 includes a wakeword. For example, if a device 110 detects a wakeword prior to sending the audio data 211 to the remote system 120, the device 110 may send along an indicator that the device 110 detected a wakeword in the audio data 211. In another example, the remote system 120 may include another component that processes incoming audio data 211 to determine if it includes a wakeword. If it does, the component may create an indicator indicating that the audio data 211 includes a wakeword. The indicator may then be included in other data 691 to be incorporated in the feature vector 631 and/or otherwise considered by the system directed audio detector 640.

Other data 691 may also include device history data such as information about previous operations related to the device 110 that sent the audio data 211. For example, the other data 691 may include information about a previous utterance that was just executed, where the utterance originated with the same device 110 as a current utterance and the previous utterance was within a certain time window of the current utterance. Device history data may be stored in a manner associated with the device identifier (which may also be included in other data 691), which may also be used to track other information about the device, such as device hardware, capability, location, etc.

The other data 681 used by the VAD 620 may include similar data and/or different data from the other data 691 used by the feature extractor 630. The other data 681/691 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 640 and/or the VAD 620) may be based on the data from the previous utterance. For example, a score threshold (for the system directed audio detector 640 and/or the VAD 620) may be based on acoustic data from a previous utterance.

The feature extractor 630 may output a single feature vector 631 for one utterance/instance of input audio data 211. The feature vector 631 may consistently be a fixed length, or may be a variable length vector depending on the relevant data available for particular audio data 211. Thus, the system directed audio detector 640 may output a single SDD result 642 per utterance/instance of input audio data 211. The SDD result 642 may be a binary indicator. Thus, if the incoming audio data 211 includes system-directed speech, the system directed audio detector 640 may output an indicator 642 that the audio data 211 does includes system-directed speech (e.g., a 1) and if the incoming audio data 211 does not includes system-directed speech, the system directed audio detector 640 may output an indicator 642 that the audio data 211 does not system-directed includes speech (e.g., a 0). The SDD result 642 may also be a score (e.g., a number between 0 and 1) corresponding to a likelihood that the audio data 211 includes system-directed speech. Although not illustrated in FIG. 6A, the flow of data to and from the system directed input detector 385 may be managed by the orchestrator 230 or by one or more other components.

The trained model(s) of the system directed audio detector 640 may be trained on many different examples of SDD feature vectors that include both positive and negative training samples (e.g., samples that both represent system-directed speech and non-system directed speech) so that the DNN and/or other trained model of the system directed audio detector 640 may be capable of robustly detecting when speech is system-directed versus when speech is not system-directed.

A further input to the system directed input detector 385 may include output data from TTS component 280 to avoid synthesized speech output by the system being confused as system-directed speech spoken by a user. The output from the TTS component 280 may allow the system to ignore synthesized speech in its considerations of whether speech was system directed. The output from the TTS component 280 may also allow the system to determine whether a user captured utterance is responsive to the TTS output, thus improving system operation.

The system directed input detector 385 may also use echo return loss enhancement (ERLE) and/or acoustic echo cancellation (AEC) data to avoid processing of audio data generated by the system.

As shown in FIG. 6A, the system directed input detector 385 may simply use audio data to determine whether an input is system directed (for example, system directed audio detector 640 may output an SDD result 642). This may be true particularly when no image data is available (for example for a device without a camera). If image data 221 is available, however, the system may also be configured to use image data 221 to determine if an input is system directed. The image data 221 may include image data captured by device 110 and/or image data captured by other device(s) in the environment of device 110. The audio data 211, image data 221 and other data 681 may be timestamped or otherwise correlated so that the system directed input detector 385 may determine that the data being analyzed all relates to a same time window so as to ensure alignment of data considered with regard to whether a particular input is system directed. For example, the system directed input detector 385 may determine system directedness scores for every frame of audio data/every image of a video stream and may align and/or window them to determine a single overall score for a particular input that corresponds to a group of audio frames/images.

Image data 221 along with other data 681 may be received by feature extractor 635. The feature extractor may create one or more feature vectors 636 which may represent the image data 221/other data 681. In certain examples, other data 681 may include data from image processing component 340 which may include information about faces, gesture, etc. detected in the image data 221. For example, user recognition data 1895, motion data, proximity data, etc. For privacy protection purposes, in certain configurations any image processing/results thereof may be obtained from an image processing component 340 located on device 110 or on a home remote component as opposed to a image processing component 240 located on a cloud or other remote system 120 so that image data 221 is not sent remote from the user's home unless the system directed input detector component 385 has determined that the input is system directed. Though this may be adjusted depending on user preferences/system configuration.

The feature vector 636 may be passed to the user detector 625. The user detector 625 (which may use various components/operations of image processing component 340, user recognition component 295, etc.) may be configured to process image data 221 and/or feature vector 636 to determine information about the user's behavior which in turn may be used to determine if an input is system directed. For example, the user detector 625 may be configured to determine the user's position/behavior with respect to device 110/system 100. The user detector 625 may also be configured to determine whether a user's mouth is opening/closing in a manner that suggests the user is speaking. The user detector 625 may also be configured to determine whether a user is nodding or shaking his/her head. The user detector 625 may also be configured to determine whether a user's gaze is directed to the device 110, to another user, or to another object. For example, the use detector 625 may include, or be configured to use data from, a gaze detector 510. The user detector 625 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 625 may also be configured to determine a user's position/orientation such as facing another user, facing the device 110, whether their back is turned, etc. The user detector 625 may also be configured to determine relative positions of multiple users that appear in image data (and/or are speaking in audio data 211 which may also be considered by the user detector 625 along with feature vector 631), for example which users are closer to a device 110 and which are farther away. The user detector 625 (and/or other component) may also be configured to identify other objects represented in image data and determine whether objects are relevant to a dialog or system interaction (for example determining if a user is referring to an object through a movement or speech).

The user detector 625 may operate one or more models (e.g., one or more classifiers) to determine if certain situations are represented in the image data 221. For example the user detector 625 may employ a visual directedness classifier that may determine, for each face detected in the image data 221 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3d angle of the face and predict a directness score based on the 3d angle.

The user detector 625 (or other component(s) such as those in image processing 340) may be configured to track a face in image data to determine which faces represented may belong to a same person. The system may user IOU based tracker, a mean-shift based tracker, a particle filter based tracker or other technique.

The user detector 625 (or other component(s) such as those in user recognition component 295) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 650 may then determine, based on information from the user detector 625 as based on the image data whether an input relating to the image data is system directed. The system directed image detector 650 may also operate on other input data, for example image data including raw image data 221, image data including feature data 636 based on raw image data, other data 681, or other data. The determination by the system directed image detector 650 may result in a score indicating whether the input is system directed based on the image data. If no audio data is available, the indication may be output as SDD result 642. If audio data is available, the indication may be sent to system directed detector 670 which may consider information from both system directed audio detector 640 and system directed image detector 650. The system directed detector 670 may then process the data from both system directed audio detector 640 and system directed image detector 650 to come up with an overall determination as to whether an input was system directed, which may be output as SDD result 642. The system directed detector 670 may consider not only data output from system directed audio detector 640 and system directed image detector 650 but also other data/metadata corresponding to the input (for example, image data/feature data 636, audio data/feature data 631, image data 221, audio data 211, or the like discussed with regard to FIG. 6A. The system directed detector 670 may include one or more models which may analyze the various input data to make a determination regarding SDD result 642.

In one example the determination of the system directed detector 670 may be based on "AND" logic, for example determining an input is system directed only if affirmative data is received from both system directed audio detector 640 and system directed image detector 650. In another example the determination of the system directed detector 670 may be based on "OR" logic, for example determining an input is system directed if affirmative data is received from either system directed audio detector 640 or system directed image detector 650. In another example the data received from system directed audio detector 640 and system directed image detector 650 are weighted individually based on other information available to system directed detector 670 to determine to what extend audio and/or image data should impact the decision of whether an input is system directed.

The system directed input detector 385 may also receive information from a wakeword component 220. For example, an indication that a wakeword was detected (e.g., WW data 644) may be considered by the system directed input detector 385 (e.g., by system directed audio detector 640, system directed detector 670, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 292). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 211 or image data 221) sent to a remote system 120 that is outside a user's home or other direct control.

In multi-user dialog mode (MUD) the system may operate as follows to determine whether an input is system directed. The first turn of a MUD interaction begins, for example, with a wakeword triggered utterance to begin MUD mode. For example, "Alexa, begin multi-user dialog mode." The system 120 may then process that utterance using speech processing and determine an intent to enter the MUD mode. The system 120 may then direct the device 110 to enter into MUD mode, which may result in changing a mode of operation of the wakeword detection component 220 and may also involve a visual or other indicator to be output by the device 110 to indicate that MUD mode is on, such as a different color light ring or line (which may indicate to the user(s) that a wakeword is not necessary for the system to process an input). This may then also activate certain components of the image processing component 240 and/or system directed input detector 385 to perform computer vision (CV) processing to identify face(s) in image data, perform gaze detection, etc. Entering MUD mode may also configure the device to more easily detect if a user is speaking during TTS output by the device 110, thus more easily allowing a user to "interrupt" the system.

While MUD mode is active the system directed input detector 385 may process incoming image data 221, audio data 211 and other data 681 to determine if an input is system directed. If a system-directed input is detected, the system 120 may halt TTS output (or lower the volume of an ongoing TTS output) and may send the corresponding input/audio data may be processed by the system (for example by language processing 292/dialog manager 272, etc.) to determine how to process the input according to the ongoing dialog. The system may also process input data with user recognition component 295 to identify a user that is providing the input to the system (e.g., identify which user is speaking). The system may then customize its responses to the user, for example by identifying the user by name, considering the user's preferences to provide output data, etc. For example, if two users are engaged in a MUD dialog the system may say to one whose user profile data indicates a preference for pepperoni pizza "Jenn, for you I recommend the pepperoni pizza" but for another user whose user profile data indicates that the user is a vegetarian, the system may say "Dave, for you I recommend the vegetarian pizza." Upon conclusion of MUD mode, the device 110 may return to normal operation, for example by disabling a visual indicator of MUD mode, returning the wakeword component 220 to normal operation, etc.

One staged process for determining whether incoming audio data 211 includes system-directed speech (for example using system directed input detector 385) is illustrated in FIG. 6B. As shown, the system detects if there is voice activity in the detected audio data 211, for example using VAD 620. The system also detects if the user is looking at the device 110. If no voice activity is detected/the user is not looking at the device (661:No) the system may cancel (666) further processing for the audio data. For example the system may not perform additional processing (e.g., ASR and/or NLU processing) on the segment and may discard the segment of the incoming audio data. The system may then wait and determine whether there is voice activity detected in subsequent incoming audio data (e.g., loop and repeat step 661). If the voice activity/user gaze at the device is detected (661:Yes) the system may send (662) the audio data for ASR/NLU processing by the language processing components 392. The system then determines whether (664) detected speech is system-directed, for example using the feature extractor 6 and system directed audio detector 640. If the speech is not determined to be system-directed (664: No) (e.g. SDD result 642 indicates no system-directed speech), the system may cancel (666) further processing for the audio data. For example the system may not perform additional processing (e.g., ASR and/or NLU processing) on the segment and may discard the segment of the incoming audio data. The system may then wait and determine whether there is voice activity detected in subsequent incoming audio data (e.g., loop and repeat step 661). If the speech is determined to be system-directed (664:Yes) (e.g. SDD result 642 indicates system-directed speech), the system may cause (668) execution of speech processing results which may include continuing speech processing (e.g., NLU processing) if not already complete, sending speech processing results to further components such as a skill component 290/390 for further action, etc. The system may also update the system context to reflect actions taken by the system since detecting the audio data 211 and processing the various ASR and/or NLU results. The system may then wait and determine whether there is voice activity detected in subsequent incoming audio data (e.g., loop and repeat step 661).

The various components of 6A may also take a more nuanced analysis and may determine whether an input is system directed based on a combination of scores from different components and weighting those scores to ultimately make a determination of whether an input is system directed. For example, system directed image detector 650 may output data including a score to the system directed detector 670. Similarly, the system directed audio detector 640 may output data including a score to the system directed detector 670. The system directed detector 670 may weight and/or process the score(s), such as using a model or other component, to determine whether an input satisfies a threshold or other condition to determine that an input is system directed, and thereby indicate the results in SDD result 642.

Weighting of audio versus image data in determining the SDD result 642 may depend on a number of factors. For example, if image data quality is low, this may result in a lower weighting of image data and/or higher weighting of audio data. Similarly, if audio data quality is low, this may result in a lower weighting of audio data and/or higher weighting of image data. Models of system directed input detector 285/385, for example those used to weight data and/or determine SDD result 642, may be trained jointly to improve overall operation of the system directed input detector 285/385.

In addition to the WW component 220 informing decision-making processing of the system directed input detector 285, the system directed input detector 285 may also inform decision-making processing of the WW component 220. For example, the device 110 may be configured to "wake" after it is determined that the user is looking at the device (or a particular location on the device) for a certain threshold of time. In this scenario a gaze detector, for example operated by the user detector 625 and/or image processing component 240, may determine the user is looking at the device and may trigger the WW component 220 or other component to wake the device 110 for further processing of input data.

Figure 7:
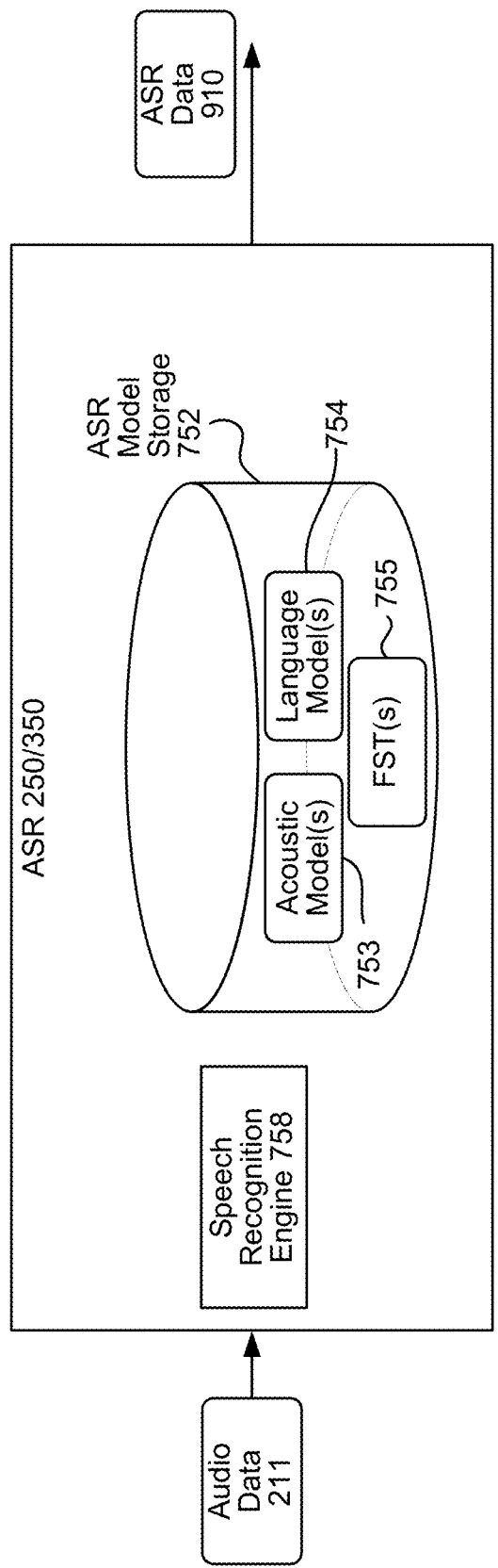
FIG. 7 is a conceptual diagram of an ASR component, according to embodiments of the present disclosure.

FIG. 7 is a conceptual diagram of an ASR component 250, according to embodiments of the present disclosure. The ASR component 250 may interpret a spoken natural language input based on the similarity between the spoken natural language input and pre-established language models 754 stored in an ASR model storage 752. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 755 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 758. The ASR component 250 receives audio data 211 (for example, received from a local device 110 having processed audio detected by a microphone by an acoustic front end (AFE) or other component). The speech recognition engine 758 compares the audio data 211 with acoustic models 753, language models 754, FST(s) 755, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 211 with reference to information stored in the ASR model storage 752. Feature vectors of the audio data 211 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 2B54, and FST(s) 755. For example, audio data 211 may be processed by one or more acoustic model(s) 753 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 910. The ASR data 910 can include one or more hypotheses. One or more of the hypotheses represented in the ASR data 910 may then be sent to further components (such as the NLU component 260) for further processing as discussed herein. The ASR data 910 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
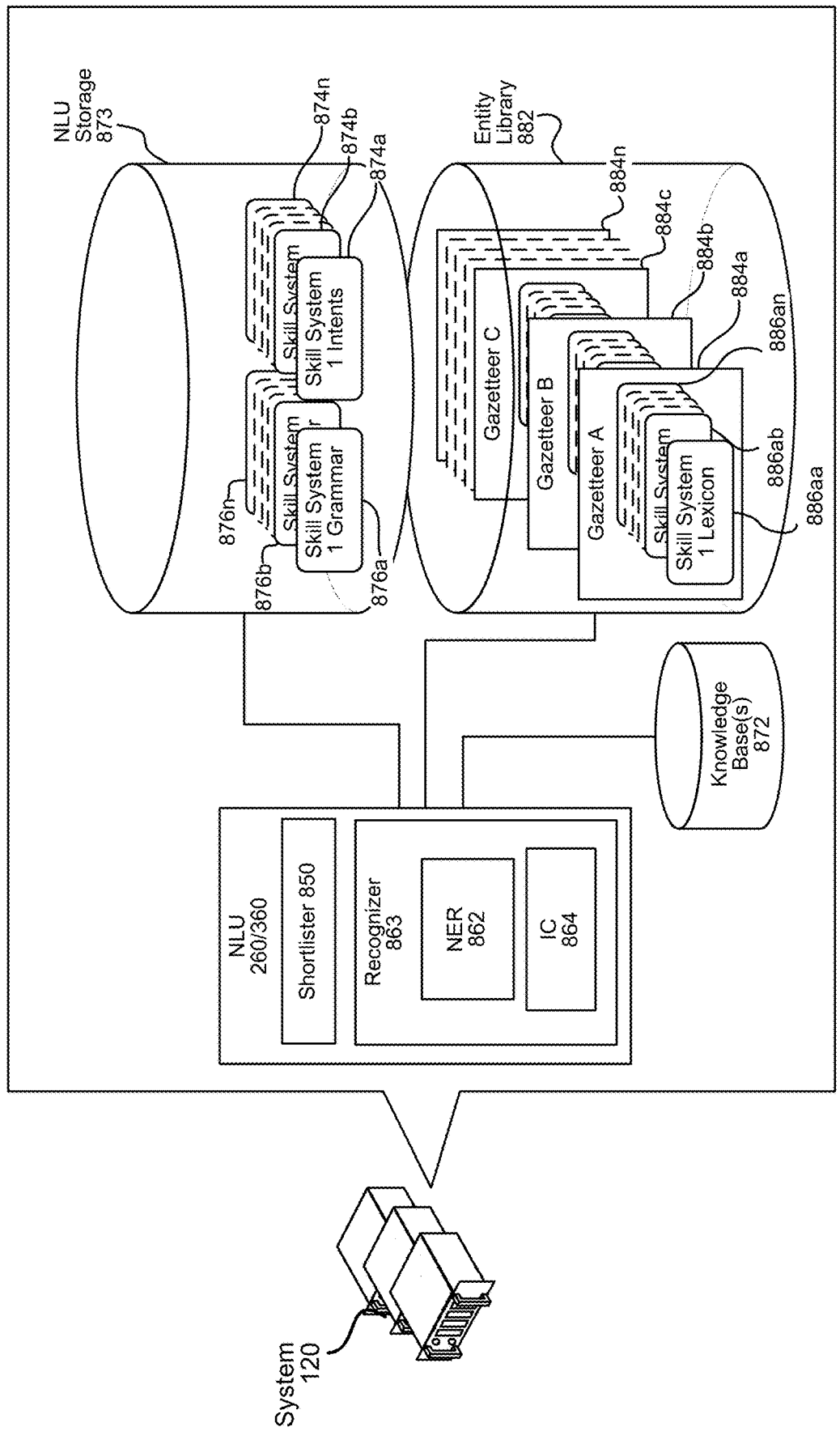
FIG. 8 is a conceptual diagram of how natural language processing is performed, according to embodiments of the present disclosure.
Figure 9:
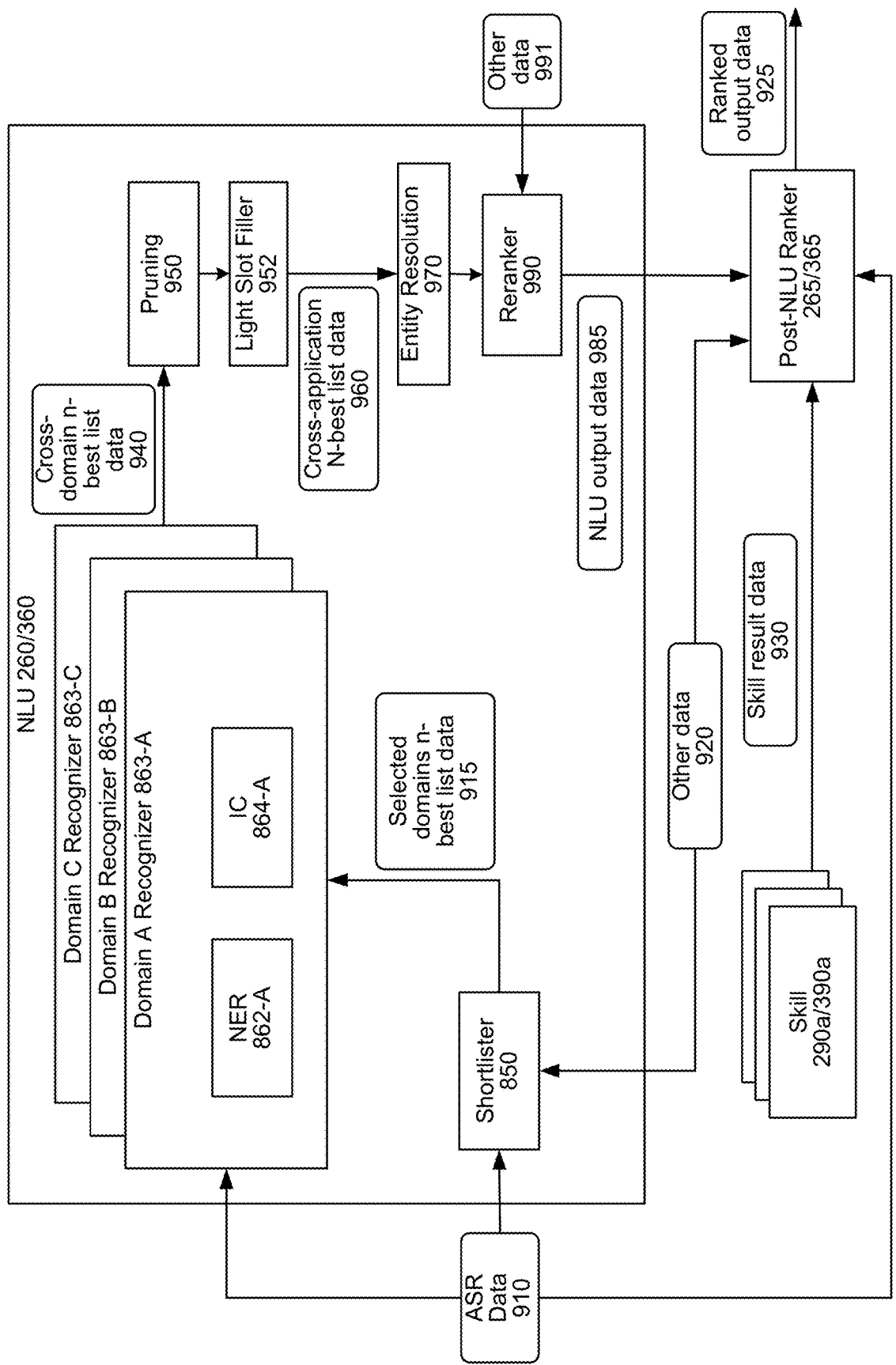
FIG. 9 is a conceptual diagram of how natural language processing is performed, according to embodiments of the present disclosure.

FIGS. 8 and 9 illustrates how the NLU component 260 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 850. The shortlister component 850 selects skills that may execute with respect to ASR output data 910 input to the NLU component 260 (e.g., applications that may execute with respect to the user input). The ASR output data 910 (which may also be referred to as ASR data 910) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 260 may process ASR output data 910 input thereto with respect to every skill of the system, either in parallel, in series, or using some combination thereof. By implementing a shortlister component 850, the NLU component 260 may process ASR output data 910 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 910 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 260 may include one or more recognizers 863. In at least some embodiments, a recognizer 863 may be associated with a skill system 125 (e.g., the recognizer may be configured to interpret text data to correspond to the skill system 125). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 910 is potentially associated with multiple domains, the recognizers 863 associated with the domains may process the ASR output data 910, while recognizers 863 not indicated in the shortlister component 850's output may not process the ASR output data 910. The "shortlisted" recognizers 863 may process the ASR output data 910 in parallel, in series, partially in parallel, etc. For example, if ASR output data 910 potentially relates to both a communications domain and a music domain, a recognizer associated with the communications domain may process the ASR output data 910 in parallel, or partially in parallel, with a recognizer associated with the music domain processing the ASR output data 910.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 260) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 910 output from the ASR component 250 or output from the device 110b (as illustrated in FIG. 9). The ASR component 250 may embed the ASR output data 910 into a form processable by a trained model(s) using sentence embedding techniques as known in the art. Sentence embedding results in the ASR output data 910 including text in a structure that enables the trained models of the shortlister component 950 to operate on the ASR output data 910. For example, an embedding of the ASR output data 910 may be a vector representation of the ASR output data 910.

The shortlister component 850 may make binary determinations (e.g., yes or no) regarding which domains relate to the ASR output data 910. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 910. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 910. In another example, instead of indicating every domain of the system, the n-best list data 915 may only indicate the domains that are likely to be able to execute the user input represented in the ASR output data 910. In yet another example, the shortlister component 850 may implement thresholding such that the n-best list data 915 may indicate no more than a maximum number of domains that may execute the user input represented in the ASR output data 910. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 910 by the shortlister component 850 relative to such domains) are included in the n-best list data 915.

The ASR output data 910 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 910.

As indicated above, the shortlister component 850 may implement thresholding such that an n-best list output therefrom may include no more than a threshold number of entries. If the ASR output data 910 includes more than one ASR hypothesis, the n-best list output by the shortlister component 850 may include no more than a threshold number of entries irrespective of the number of ASR hypotheses output by the ASR component 250. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 910, the shortlister component 850 may generate confidence scores representing likelihoods that domains relate to the ASR output data 910. If the shortlister component 850 implements a different trained model for each domain, the shortlister component 850 may generate a different confidence score for each individual domain trained model that is run. If the shortlister component 850 runs the models of every domain when ASR output data 910 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 910.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 910 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 910, for example as determined by the user recognition component 295.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 850 receives the ASR output data 910, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 910. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 910 (e.g., the shortlister component 850 determines a confidence score of zero for the domain).

The shortlister component 850 may send the ASR output data 910 to recognizers 863 associated with domains represented in the n-best list data 915. Alternatively, the shortlister component 850 may send the n-best list data 915 or some other indicator of the selected subset of domains to another component (such as the orchestrator component 230) which may in turn send the ASR output data 910 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 230 may send the ASR output data 910 to recognizers 863 associated with domains that the shortlister component 850 determines may execute the user input. If the shortlister component 850 generates an n-best list representing domains with associated confidence scores, the shortlister component 850/orchestrator component 230 may send the ASR output data 910 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 260 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata
[0.70] Intent: <PlayVideo> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 260 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 260 may include multiple entity resolution components 970 and each entity resolution component 970 may be specific to one or more domains.

The NLU component 260 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 850 may only process with respect to these latter domains. Results of these two NLU processing paths may be merged into NLU output data 985, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 265. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 930 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 930a generated from the first skill 290a's execution with respect to the first NLU hypothesis. The post-NLU ranker 265 also receives, from the second skill 290b, second results data 930b generated from the second skill 290b's execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 125 to locate the data to be output to a user. The result data 930 may also include an instruction. For example, if the user input corresponds to "turn on the light," the result data 930 may include an instruction causing the system to turn on a light associated with a profile of the device (110a/110b) and/or user.

The post-NLU ranker 265 may consider the first result data 930a and the second result data 930b to alter the first confidence score and the second confidence score of the first NLU hypothesis and the second NLU hypothesis, respectively. That is, the post-NLU ranker 265 may generate a third confidence score based on the first result data 930a and the first confidence score. The third confidence score may correspond to how likely the post-NLU ranker 265 determines the first skill will correctly respond to the user input. The post-NLU ranker 265 may also generate a fourth confidence score based on the second result data 930b and the second confidence score. One skilled in the art will appreciate that a first difference between the third confidence score and the fourth confidence score may be greater than a second difference between the first confidence score and the second confidence score. The post-NLU ranker 265 may also consider the other data 920 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 930 associated with the skill 290 with the highest altered confidence score to be the data output in response to the current user input. The post-NLU ranker 265 may also consider the ASR output data 910 to alter the NLU hypotheses confidence scores.

The orchestrator component 230 may, prior to sending the NLU results data 985 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 985, including NLU hypotheses paired with skills 290, to the post-NLU ranker 265. In response to ASR output data 910 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 985, to provide result data 930 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 930. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 930 indicating slots of a framework that the skill 290 further needs filled or entities that the skill 290 further needs resolved prior to the skill 290 being able to provided result data 930 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 930 provided by the skills 290 to alter the NLU processing confidence scores generated by the reranker 990. That is, the post-NLU ranker 265 uses the result data 930 provided by the queried skills 290 to create larger differences between the NLU processing confidence scores generated by the reranker 990. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 930 responsive to NLU hypotheses over skills 290 that provide result data 930 corresponding to an indication that further information is needed, as well as skills 290 that provide result data 930 indicating they can provide multiple responses to received NLU hypotheses. For example, the post-NLU ranker 265 may generate a first score for a first skill 290a that is greater than the first skill's NLU confidence score based on the first skill 290a providing result data 930a including a response to a NLU hypothesis. For further example, the post-NLU ranker 265 may generate a second score for a second skill 290b that is less than the second skill's NLU confidence score based on the second skill 290b providing result data 930b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 930c indicating the third skill 290c can provide multiple responses to a NLU hypothesis.

The post-NLU ranker 265 may consider other data 920 in determining scores. The other data 920 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 920 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 985, the post-NLU ranker 265 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 290. For example, if a user says "tell me a recipe for pasta sauce," a first skill 290a may provide the post-NLU ranker 265 with first result data 930a corresponding to a first recipe associated with a five star rating and a second skill 290b may provide the post-NLU ranker 265 with second result data 930b corresponding to a second recipe associated with a one star rating. In this situation, the post-NLU ranker 265 may increase the NLU processing confidence score associated with the first skill 290a based on the first skill 290a providing the first result data 930a associated with the five star rating and/or decrease the NLU processing confidence score associated with the second skill 290b based on the second skill 290b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 920 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oregon A second skill 290b may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290a and/or decrease the NLU processing confidence score associated with the second skill 290b. Likewise, if the device and/or user that originated the user input is located in Boston, Massachusetts, the post-NLU ranker 265 may increase the NLU processing confidence score associated with the second skill 290b and/or decrease the NLU processing confidence score associated with the first skill 290a.

The other data 920 may include information indicating a time of day. The system may be configured with skills 290 that operate with respect to certain times of day. For example, a user may provide a user input corresponding to "order me food." A first skill 290a may generate first result data 930a corresponding to breakfast. A second skill 290b may generate second result data 930b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 920 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 920 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 920 may include information indicating how long it took a skill 290 to provide result data 930 to the post-NLU ranker 265. When the post-NLU ranker 265 multiple skills 290 for result data 930, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 920 to increase and decrease NLU processing confidence scores associated with various skills 290 that the post-NLU ranker 265 has already requested result data from. Alternatively, the post-NLU ranker 265 may use the other data 920 to determine which skills 290 to request result data from. For example, the post-NLU ranker 265 may use the other data 920 to increase and/or decrease NLU processing confidence scores associated with skills 290 associated with the NLU results data 985 output by the NLU component 260. The post-NLU ranker 265 may select n-number of top scoring altered NLU processing confidence scores. The post-NLU ranker 265 may then request result data 930 from only the skills 290 associated with the selected n-number of NLU processing confidence scores.

As described, the post-NLU ranker 265 may request result data 930 from all skills 290 associated with the NLU results data 985 output by the NLU component 260. Alternatively, the system(s) 120 may prefer result data 930 from skills implemented entirely by the system(s) 120 rather than skills at least partially implemented by the skill system(s) 125. Therefore, in the first instance, the post-NLU ranker 265 may request result data 930 from only skills associated with the NLU results data 985 and entirely implemented by the system(s) 120. The post-NLU ranker 265 may only request result data 930 from skills associated with the NLU results data 985, and at least partially implemented by the skill system(s) 125, if none of the skills, wholly implemented by the system(s) 120, provide the post-NLU ranker 265 with result data 930 indicating either data response to the NLU results data 985, an indication that the skill can execute the user input, or an indication that further information is needed.

As indicated above, the post-NLU ranker 265 may request result data 930 from multiple skills 290. If one of the skills 290 provides result data 930 indicating a response to a NLU hypothesis and the other skills provide result data 930 indicating either they cannot execute or they need further information, the post-NLU ranker 265 may select the result data 930 including the response to the NLU hypothesis as the data to be output to the user. If more than one of the skills 290 provides result data 930 indicating responses to NLU hypotheses, the post-NLU ranker 265 may consider the other data 920 to generate altered NLU processing confidence scores, and select the result data 930 of the skill associated with the greatest score as the data to be output to the user.

A system that does not implement the post-NLU ranker 265 may select the highest scored NLU hypothesis in the NLU results data 985. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 985 to provide result data 930 to the post-NLU ranker 265 prior to the post-NLU ranker 265 ultimately determining the skill 290 to be invoked to respond to the user input. Some of the skills 290 may provide result data 930 indicating responses to NLU hypotheses while other skills 290 may providing result data 930 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 930, associated with the skill 290 associated with the highest score, for output to the user. Alternatively, the post-NLU ranker 265 may output ranked output data 925 indicating skills 290 and their respective post-NLU ranker rankings. Since the post-NLU ranker 265 receives result data 930, potentially corresponding to a response to the user input, from the skills 290 prior to post-NLU ranker 265 selecting one of the skills or outputting the ranked output data 925, little to no latency occurs from the time skills provide result data 930 and the time the system outputs responds to the user.

If the post-NLU ranker 265 selects result audio data to be output to a user and the system determines content should be output audibly, the post-NLU ranker 265 (or another component of the system(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system(s) 120) may cause the device 110*b* to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 930 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 930 indicating a response to the user input, the post-NLU ranker 265 (or another component of the system(s) 120, such as the orchestrator component 230) may simply cause content corresponding to the result data 930 to be output to the user. For example, the post-NLU ranker 265 may send the result data 930 to the orchestrator component 230. The orchestrator component 230 may cause the result data 930 to be sent to the device (110a/110b), which may output audio and/or display text corresponding to the result data 930. The orchestrator component 230 may send the result data 930 to the ASR component 250 to generate output text data and/or may send the result data 930 to the TTS component 280 to generate output audio data, depending on the situation.

The skill 290 associated with the highest post-NLU ranker score may provide the post-NLU ranker 265 with result data 930 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 930 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 930 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 930, the system may further engage a transactional skill 290 after the transactional skill 290 provides the post-NLU ranker 265 with result data 930 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 10:
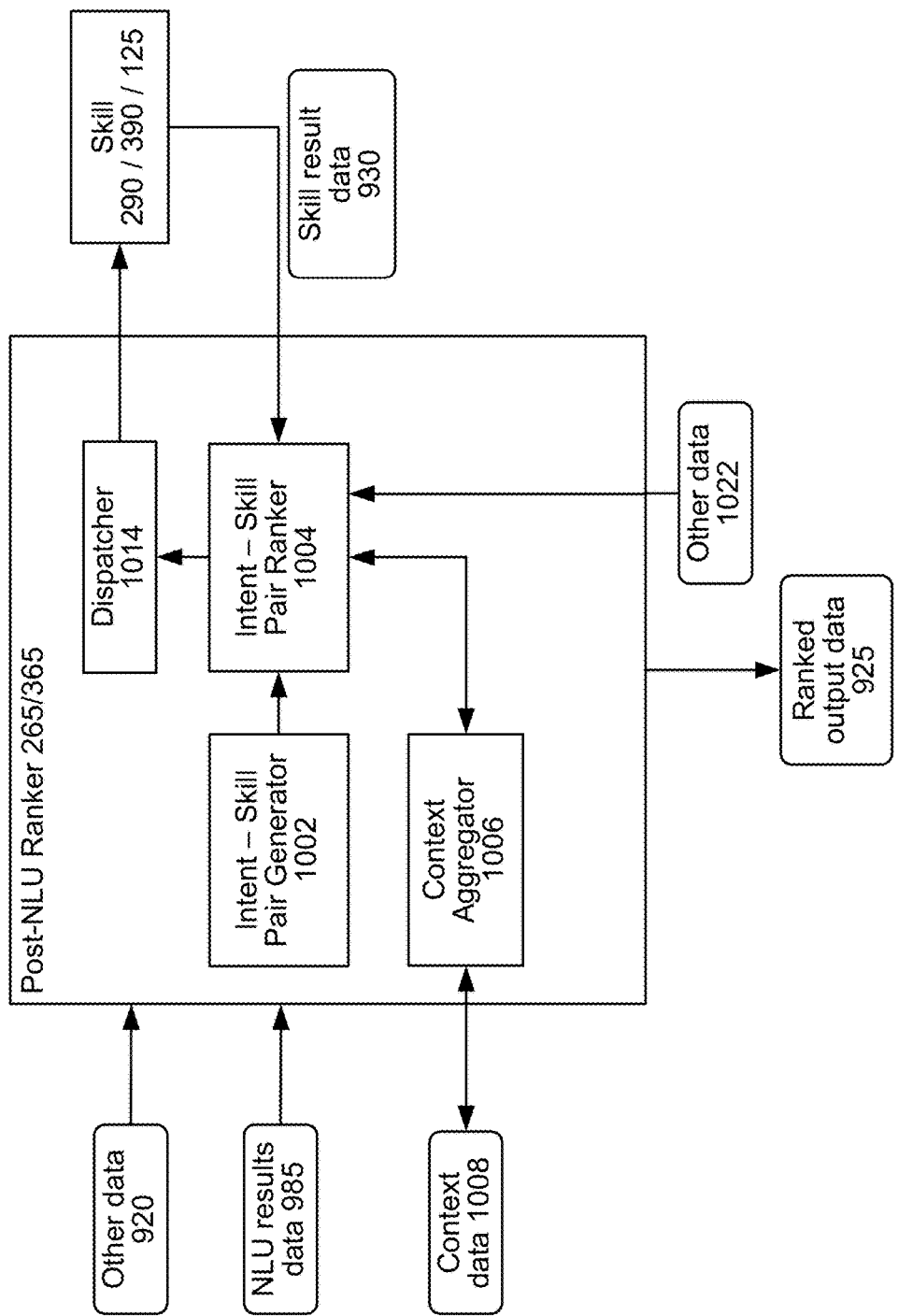
FIG. 10 is a conceptual diagram illustrating how a post-NLU ranker may process according to embodiments of the present disclosure.

FIG. 10 illustrates other configurations and operations of the post-NLU ranker 265. When the post-NLU ranker 265 receives NLU results data 985, the NLU results data 985 may be sent to an intent-skill pair generator 1002. The intent-skill pair generator 1002 may include information about what skills are capable of handling what intents. Such information may be context agnostic, and may thus indicate what skills are capable of handling what intents generally, without regard to the context associated with the user input. The intent-skill pair generator 1002 thus receives the NLU results data 985 and identifies what particular candidate skills may handle the intent for NLU hypothesis. For example, if a NLU hypothesis includes a particular intent, the intent-skill pair generator 1002 identifies each skill that may execute with respect to the intent. For further example, if the NLU results data 985 include multiple NLU hypotheses including multiple intents, the intent-skill pair generator 1002 associates each different NLU hypothesis with each skill that may execute with respect to the NLU hypothesis. As illustrated, the intent-skill pair generator 1002 may be implemented at part of the post-NLU ranker 265. However, one skill in the art will appreciate that the intent-skill pair generator 1002 may be implemented as part of the NLU component 260 or in another component without departing from the present disclosure. In such a case, the NLU results data 985 may include intent-skill pairs.

The post-NLU ranker 265 may also include an intent-skill pair ranker 1004. The intent-skill pair ranker 1004 ranks the intent-skill pairs generated by the intent-skill pair generator 1002 based on, for example, the number of filled slots of a NLU hypothesis, an NLU confidence score associated with a NLU hypothesis, context information output by a context aggregator 1006, and/or other data.

The post-NLU ranker 265 may include the context aggregator 1006. The context aggregator 1006 receives context data 1008 from various contextual sources. The context data 1008 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 1006 may aggregate the context data 1008 and put the context data 1008 in a form that can be processed by the intent-skill pair ranker 1004. Context data 1008 may include data obtained from the device 110 or from other services connected to the system(s) 120.

The context data 1008 may include skill availability data. Such information may indicate what skills are available and authorized to process the user input. For example, if the user has only enabled certain skills, the enabled skills may be noted in the skill availability data.

The context data 1008 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill(s) 290, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 1008 may be one portion of the data used by the intent-skill pair ranker 1004 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1008 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 1008 (and/or other data 1022) may include a metadata flag/indicator that represents whether the particular skill being executed is one that can handle a go-back (or other navigational) request.

The context data 1008 may also include user profile data. The user profile data may represent preferences and/or characteristics of the user that originated the current user input. Such data may be received from the profile storage 270.

The context data 1008 may also include location data. The location data may represent a location of the device 110 from which the user input was received.

The context data 1008 may also include anaphora/contextual reference data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1008 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 1008 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1008 may also include information regarding activity of other device(s) or components of the system. For example, while the user is speaking to a device 110, the device 110 (or another device) may be displaying information that the user is referring to. For example, if a device is displaying a list of ten items and the user says "buy the third one" the system may use information corresponding to the items being displayed (which may be included in 1008) to determine which item the user is referring to for purposes of taking further actions (e.g., adding the item to a user's shopping cart). This information may come from another device, a skill 290 sending data to the device, the user profile 270 or other information source. Similarly, the system may receive information regarding other output, for example music being played on a speaker, etc.

The context data 1008 may also include other context data not explicitly recited herein.

The intent-skill pair ranker 1004 may operate one or more trained models that are configured to process the NLU results data 985, skill result data 930, and other data 1022 in order to determine a single best skill for executing the current user input from the available pairs output by the intent-skill pair generator 1002. The intent-skill pair ranker 1004 may send queries to the skills and request a first skill and a second skill (for example the candidate skills identified by the pair generator 1002), to provide potential result data indicating whether the skill can handle the intent at the particular moment and if so, what the output data for the particular skill would be (e.g., data the skill would provide to a user if the skill were selected to execute the user input) based on the NLU results data 985. For example, the intent-skill pair ranker 1004 may send a first NLU hypothesis, associated with a first skill, to the first skill along with a request for the first skill to at least partially execute with respect to the first NLU hypothesis. The intent-skill pair ranker 1004 may also send a second NLU hypothesis, associated with the second skill, to the second skill along with a request for the second skill to at least partially execute with respect to the second NLU hypothesis. The intent-skill pair ranker 1004 receives, from the first skill, first result data 930a generated from the first skill's execution with respect to the first NLU hypothesis. The intent-skill pair ranker 1004 also receives, from the second skill, second results data 930b generated from the second skill's execution with respect to the second NLU hypothesis. Based on the first results data 930a, a first NLU confidence score associated with the first NLU hypothesis, the second results data 930b, a second NLU confidence score associated with the second NLU hypothesis, and other data 1022 (e.g., context data, user profile data, etc.), the intent-skill pair ranker 1004 determines the best skill for executing the current user input. The intent-skill pair ranker 1004 sends an indication of the best skill to a dispatcher component 1014.

The dispatcher 1014 may then send the selected skill the information needed to execute the user input, including an indication of the intent, the appropriate context data 1008 (such as device identifier, user identifier, or the like), slot data, utterance identifier, dialog identifier, or any other information needed.

One or more models implemented by components of the orchestrator component 230, post-NLU ranker 265, shortlister 850, or other component may be trained and operated according to various machine learning techniques.

Figure 11A:
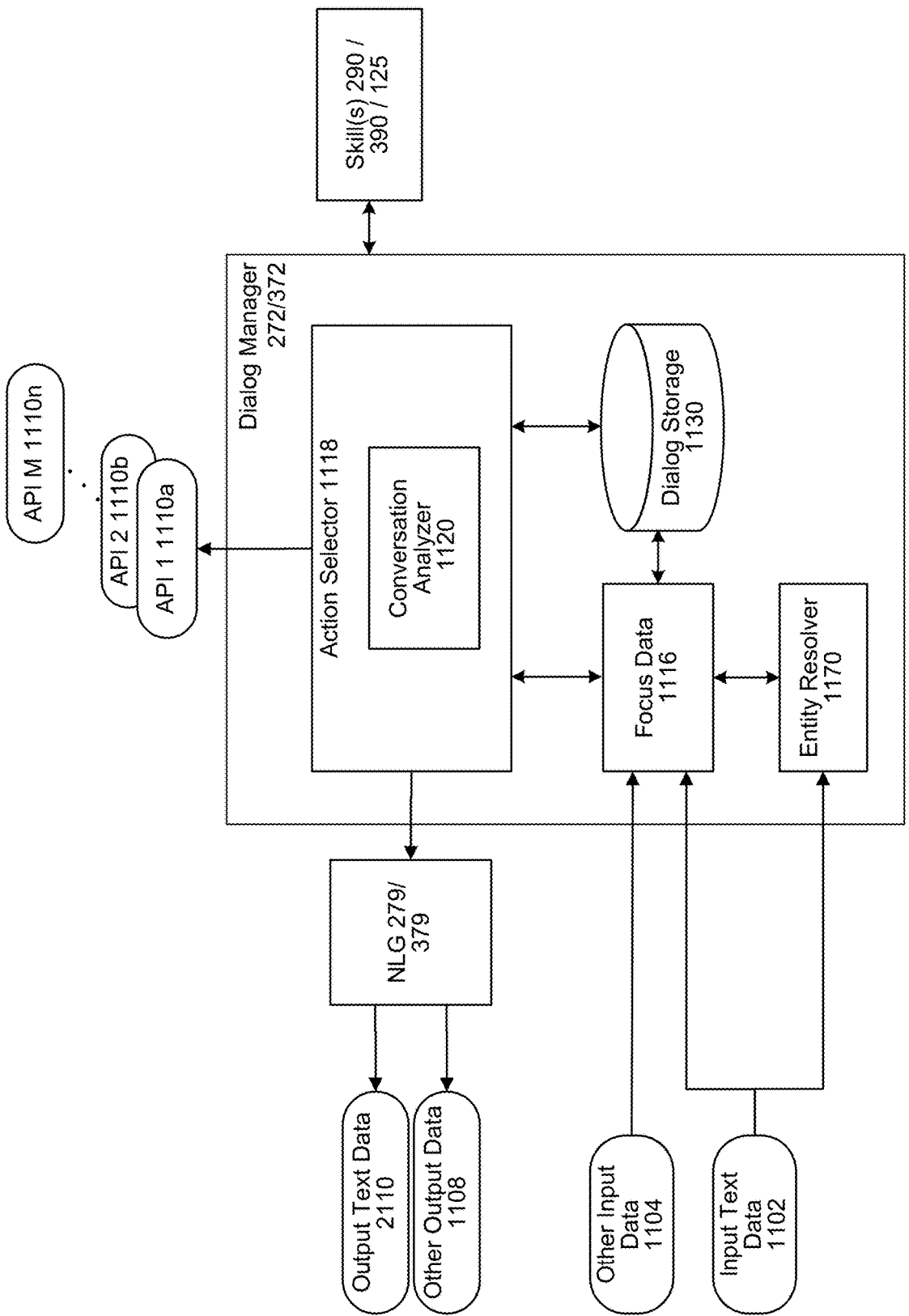
FIG. 11A is a conceptual diagram of components of a dialog manager component, according to embodiments of the present disclosure.

FIG. 11A illustrates operations to handle dialog management, according to embodiments of the present disclosure. One or more components shown in FIG. 11A may be part of the dialog manager 272372. For example, the dialog manager 272 may include the entity resolver 1170, the focus data component 1116 and the action selector 1118. The dialog manager 272 may work in concert with other language processing components, for example NLU 260, or may operate instead of such components in certain embodiments. Further, while illustrated as a separate component, dialog manager 272 may be included within another component such as language processing 292, NLU 260, or otherwise.

The system receives input text data 1102 which may be received, for example, by a device (e.g., 213) or from another component of the system (for example as ASR output data 910). The input text data 1102 may include text corresponding to a user input and metadata indicating further information about the text (such as an identity of the user for example determined by user recognition component 295), an emotional state of the user (for example determined by sentiment detection component 275, etc.). The input text data 1102 may be text representing words, instructions, markup language, speech, or gestures, or may be a vector or other representation of the same. The input text data 1102 may be generated by a user via a keyboard, touchscreen, microphone, camera, or other such input device. In other embodiments, the input text data 1102 is created using ASR, as described above, from audio data received from a user. For example, input text data 1102 may include ASR data 910. The system may further receive other input data 1104. For example, the other input data 1104 may correspond to a button press, visually detected gesture (for example detected by image processing component 240), or other input, such as image data as may interpreted by device 110, system 120, or other component (for example image processing component 240). Other input data 1104 may also include other data 920, context data 1008, NLU results data 985, user profile data 270, user recognition data 1895, or other data relative to the user's (or users') current or prior interactions with the system.

As described in greater detail below, using the input text data 1102 and/or other input data 1104, the system may determine and output text data 2110 and/or other output data 1108. The system may instead or in addition perform an action based on the input text data 1102 and/or other input data 1104, such as calling one or more APIs 1110.

An entity resolver 1170 may be used to determine that the input text data 1102 includes a representation of one or more entities, a process that may include named entity recognition (NER)—i.e., determining that the input text data 1102 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 1170 may operate similarly to NER component 862 and/or entity resolution component 970 discussed herein with regard to NLU operations.

In some embodiments, a single entity resolver 1170 is used for more than one domain (i.e., a "cross-domain" entity resolver 1170). Each domain may correspond to one or more dialog models. One or more candidate domains corresponding to the input text data 1102 may be determined; entity resolvers 1170 corresponding to the candidate domains may be used to process the input text data 1102. The dialog focus data component 1116 may store the output entities from each candidate domain and may remove unselected entities when an API 1110 is selected or an action to be performed is determined.

The dialog focus data component 1116 may store state data (for example in dialog storage 1130) corresponding to dialog history data (including an intent(s), an entity(ies), etc. corresponding to a prior turn in the dialog), action history data, and/or other data. In some embodiments, the other components (e.g., the action selector 1118) do not store state data and instead query the dialog focus data 1116/dialog storage 1130 for the state data. The system may send some or all of the dialog focus data 1116 to other systems and/or may receive additional dialog focus data from other systems. In some embodiments, the other components (e.g., the action selector 1118) include a feature-extractor component to extract features from the dialog focus data 1116.

The dialog focus data 1116 may be graph-based data including a plurality of graph nodes; each graph node may correspond to an item of state data, such as an entity type, entity value, prior API call, and/or user data. The other components, such as the action selector 1118, may access all of the graph nodes of the dialog focus data 1116 or may access only a subset of the graph nodes of the dialog focus data 1116. The dialog focus data component 1116 may be any type of storage mechanism and may serve as long-term and/or short term memory for the system, thus enabling tracking of entities, ASR output, TTS output, and other features) at each turn through a dialog. In some embodiments, the dialog focus data 1116 is updated after each turn of dialog with updated dialog focus data; in other embodiments, the dialog focus data 1116 is updated after an end of a dialog is determined.

The entity resolver 1170 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

The entity resolver 1170 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 1170.

The focus data 1116 may store data relevant to a dialog. In various embodiments, the dialog focus data 1116 stores the input text data 1102, other input data 1104, data from the entity resolver 1170 and/or action data and dialog data from an action selector 1118. The dialog focus data 1116 may further include additional information, such as location data, user preference data, and environment data. In various embodiments, the dialog focus data 1116 uses an encoder to encode some or all of the received data into one or more feature vectors and a decoder to determine, based on the feature vectors, intent data corresponding to an intent of a user. The dialog focus data 1116 may further include state data that represents prior dialog, actions, or other prior user information or data.

The dialog focus data 1116 may also include data related to multi-user dialog (MUD) mode. For example, the focus data may include information related to how many users are participating in the dialog, the identity of each user, which user participated in which parts of the dialog (e.g., which user provided which input of the dialog), which users may be present in the room during the dialog but may not be active participants.

The action selector 1118 determines an action to be performed in response to the user request, where the action may include calling an API to perform an action and/or presenting an output to the user. The action selector 1118 may include a trained model(s), and may process the dialog focus data 1116. If the action selector 1118 determines to invoke an API call, one or more APIs 1110 may be activated and a corresponding action carried out. If the action selector 1118 determines to present a prompt or other output data to the user, the NLG component 279 may be used to generate the output text data 2110 and/or other output data 1108. In either case, the action selection 1118 may update the dialog focus data 1116 based on the API call or the output presented to the user.

In some embodiments, the action selector 1118 may process data from the dialog storage 1130 to select one or more skills 290/skill system(s) 125 capable of responding to the user request, and present the selected skill to the user using the output text data 2110.

In some embodiments, the system(s) 120 may determine past interaction data, such as a satisfaction rating corresponding to skill(s) 290 and store it in the storage 1130. The satisfaction rating may be based on past interactions between users of the system(s) 120 and the skill. In some embodiments, the system(s) 120 may determine a user-specific satisfaction rating corresponding to the skill based on user-specific data, interaction-specific data and/or focus data 1116, such as, user profile data 270 associated with the specific user, location data, past user interactions with the system(s) 120, past user interactions with the skill 290, user preferences, device type for the device 110 that received the user request, device type for the device 110 that may output/respond to the user request, device capabilities, dialog state of previous turns in the dialog, and other data.

In some embodiments, users may provide feedback to the system(s) 120 or the skill system(s) 125 indicating the user's satisfaction in the service skill responding to the user request/performing an action in response to the user request. The feedback may be solicited by the system(s) 120 or the skill system(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 1118 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1118 may select a skill based on skill availability, for example, a reservations at a restaurant may indicate availability or no availability for a particular day. The system(s) 120/action selector 1118 may determine the number of diners at a restaurant or the number of takeout orders a restaurant is handling based on the number of user requests the system(s) 120 routed to the skill. In another example, the system(s) 120/action selector 1118 may determine that a number of user requests were routed to a first skill for a first location/geographic area (e.g., a city), and may determine to route the next/future user requests to another skill for that geographic area.

For a restaurant reservation, the action selector 1118 may select a skill based on a number of people in the user's party, since some restaurants may not make reservations for small parties less than a particular number. The action selector 1118 may select a skill based on person(s) other than the user that may be involved in the user request. For example, if the user says "Alexa, what should we do tomorrow?" the system(s) 120 may determine information relating to the other persons in the user's household to select a skill.

The action selector 1118 may select a skill based on the dialog state where the dialog state indicates multiple turns/attempts to recommend a skill/service provider, and the action selector 1118 may modify the search criteria (e.g., expand the zip code, expand the time frame, etc.) to select a skill.

The dialog manager 272 may be configured to operate in a mode where the system can act as a participant in a conversation. Such a mode may enable the system, with user permission, to process speech, gestures, facial expressions, or the like, from a user that may be directed to another user as part of a conversation (for example, a three-way conversation) with the participants being the system and multiple users. In this way the system may act more human-like as a natural participant in a conversation and may answer questions or interject information that may be helpful to the conversation, even if a user's statement/gesture, etc. as part of the conversation was directed at another user participant of the conversation rather than directly at the system. The conversation mode may be independent from or a part of a multi-user dialog mode as discussed herein.

The conversation mode may be activated in a variety of ways. This may include a spoken utterance with a standard wakeword such as "Alexa, enter conversation mode," (which the system may process using language processing component 292 to determine the command to enter the conversation mode) a spoken utterance with a custom wakeword such as "Conversation," which may invoke the conversation mode, pressing of a virtual or physical button the device 110, turning on the conversation mode in a companion application running on a phone/tablet of a user, or the like. The conversation mode may also be set to be always on by default (until turned off) by a particular user preference. The conversation mode may also be managed by a separate dialog manager 272 specifically configured for conversation mode. The conversation mode may also be managed by a dialog manager 272 that is capable of operating conversation mode in addition to other modes (e.g., a normal dialog mode). Other component(s) may also be configured to manage conversation mode.

Figure 11B:
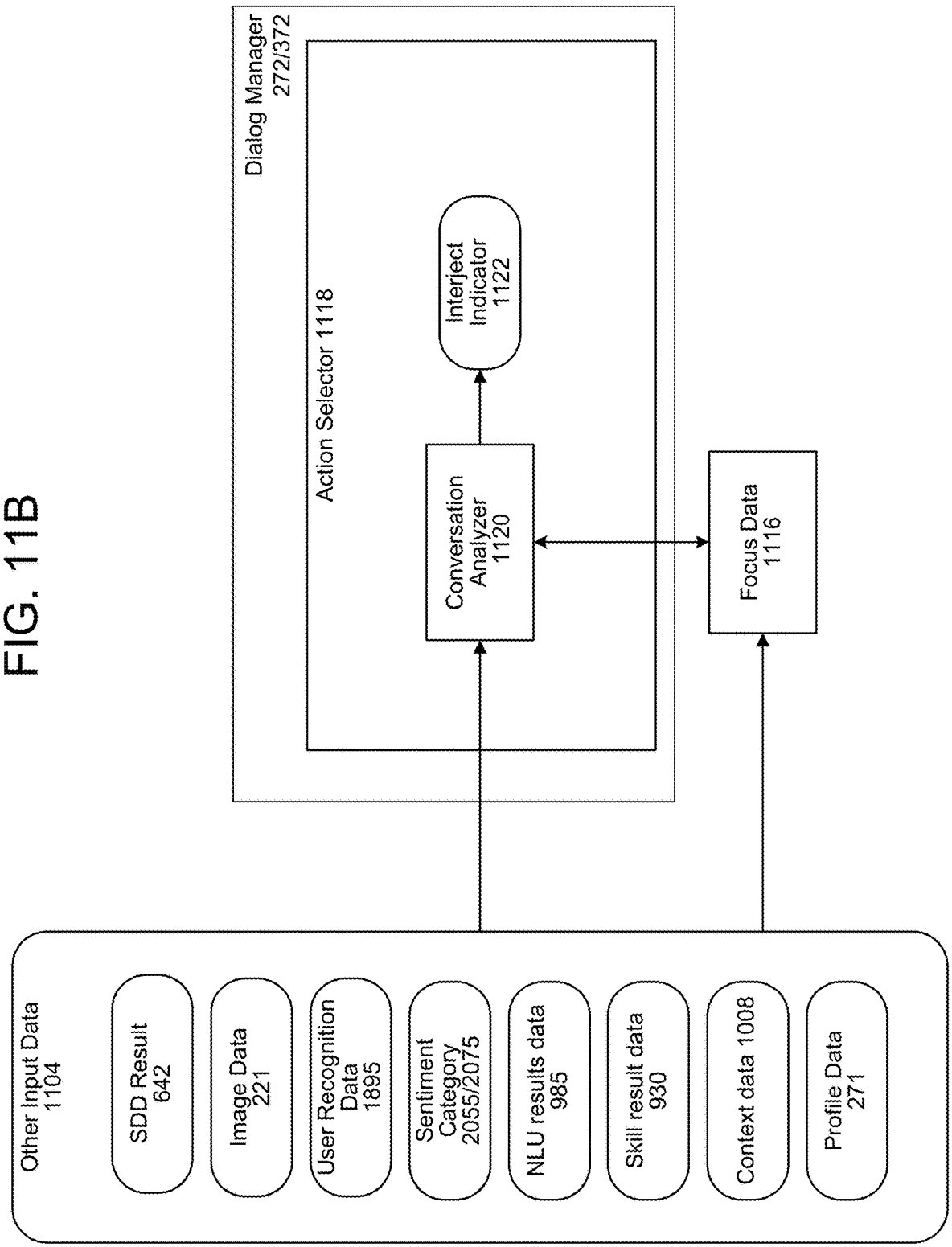
FIG. 11B is a conceptual diagram of components of a conversation analyzer according to embodiments of the present disclosure.

In particular, conversation mode may make user of a conversation analyzer 1120 as illustrated in FIG. 11A. The conversation analyzer 1120 may include a trained model such as a classifier or other component configured to process data relevant to a particular user expression (e.g., speech, a gesture, etc.) to determine if the expression is one that is appropriate for the system to respond to, even if that expression is directed to another user rather than to the system. As illustrated in FIG. 11B, the conversation analyzer 1120 may process many different types of data to make this determination. After processing the different data, the conversation analyzer 1120 may output an interject indicator 1122 which may indicate whether the system should interject a response to the particular input user expression. The interject indicator 1122 may be a binary indicator (e.g., 1 for yes or 0 for no) or may be a score corresponding to whether the system should interject a response. The interject indicator may be processed by the action selector 1118, dialog manager 272/372 or other component to determine timing and content of the response as part of the ongoing interactions between the system and the user(s). The system may interject if the score of the interject indicator 1122 satisfies a condition such as is above a threshold, below a threshold, within a certain range, etc. The condition may depend on various factors such as user profile data corresponding to one or more of the users speaking, the conversation rate, the dialog history, or the like.

As shown in FIG. 11B, a variety of data may be considered by the conversation analyzer 1120. Such data may be sent to the conversation analyzer 1120 in a number of ways. The data may be sent to the conversation analyzer 1120 directly (as shown in FIG. 11B), maybe sent through the focus data component 1116 (as shown in FIG. 11A), or may be encoded into a feature vector or other encoded form prior to being received by the conversation analyzer 1120. Such encoding may occur using one or more encoders (not shown) thus allowing a trained model of the conversation analyzer 1120 to more easily process the input data for purposes of determining appropriateness for the system to interject a response to a particular user expression.

The conversation analyzer 1120 may input data representing a conversation/dialog as represented by the focus data 1116 and/or the dialog storage 1130 (not shown in FIG. 11B). For example the conversation analyzer 1120 may process state data related to the conversation, data indicating previous turns/inputs to the conversation whether by a user(s) or by the system, previous entities that have been mentioned as part of the conversation, previous sentiment data indicating sentiment of the participant(s) of the conversation at various turns of the conversation, a location of the conversation (which correspond to a location of the device 110 that is acting as the system participant of the conversation), identity information related to the conversation participants, identity information related to other users in the environment of the device 110 that may not be participants to the conversation (e.g., whether children are present, etc.), history data relating to previous conversations (such as previous conversations between the participants in a present conversation), or other information.

The conversation analyzer 1120 may also input other types of input data 1104, for example data that may relate to the present user expression and/or data that may be otherwise relevant to the decision as to whether the system should interject a response to a user expression as part of a conversation. For example, the conversation analyzer 1120 may consider the SDD result 642 which may indicate that a particular user expression is or is not system directed. If an input is system directed, the system may respond to the expression without necessarily invoking the conversation analyzer 1120 or relying on the interject indicator 1122 since the input is system directed and the system may determine that it should respond regardless. If, however, an input corresponding to a user expression is not system directed the system may use the conversation analyzer 1120/interject indicator 1122 to determine whether the system should prepare a response.

The conversation analyzer 1120 may also consider image data 221, for example raw image data captured by one or more cameras or image data as processed by image processing component 240/340 or otherwise. Such image data may be associated with a particular user expression as represented by audio data 211 and/or corresponding NLU results data 985. The conversation analyzer 1120 may also consider gesture data (not shown) which may indicate user gestures such as eye rolls, facial expressions, hand gestures, or other movements which may communicate an expression or intent by the user that should be considered by the system as part of the conversation expressed by the user. Examples include, but are not limited to, a head nod, head shake, thumbs up, eye roll, eyebrow raise, etc. The system may process image data indicating the user expression and may convert that image data into an indication of a gesture (for example by image processing component 240/340 or otherwise). An indication of the gesture may be processed by the dialog manager 272/372 and stored as part of the focus data 1116 as part of the conversation. The conversation analyzer 1120 may also consider such gesture information (whether or not such a gesture is accompanied by audio data) to determine whether the system should respond. For example, if a user performs a gesture that indicates confusion the system may repeat or rephrase a statement (whether that statement originated from the system or another user).

The conversation analyzer 1120 may also consider user recognition data 1895 to identify the user(s) participating in the conversation and specifically the user associated with the particular expression the system is considering for interjection purposes. The conversation analyzer 1120 may also consider user profile data 271 corresponding to the user(s) which may indicate a user preference as to whether an interjection is preferred or not preferred, how often interjections should occur with regard to a user(s) in the conversation, how the user(s) prefers interjections to be phrased, or the like. The conversation analyzer 1120 may also consider sentiment category data 2055/2075 to identify a sentiment associated with user(s) participating in the conversation and specifically the sentiment associated with the particular expression the system is considering for interjection purposes.

The conversation analyzer 1120 may also consider NLU results data 985 and/or skill result data 930 for the expression under consideration (or for previous turns of the conversation) to determine whether the expression is appropriate for system interjection. For example, if the NLU results data 985/skill result data 930 indicates the expression involved an utterance that was understood by the system and resulted in clearly actionable information such as an intent, entity, question, and/or other information for which the system (for example through a skill 290) is able to determine an appropriate response (e.g., skill result data 930), the conversation analyzer 1120 may indicate through interject indicator 1122 that an interjection is appropriate (for example using all or a portion of the skill result data 930). The conversation analyzer 1120 may be trained to process the NLU results data 985 with respect to data indicating the ongoing conversation to determine whether a subject matter of the user expression relates to that of the ongoing (or a previous) conversation. And if so, the conversation analyzer 1120 may indicate that interjection is appropriate.

The conversation analyzer 1120 may also consider audio data 211 (either raw or processed/encoded) which may indicate tone, speech/conversation speed/tempo, pauses, or other audio characteristics that may be relevant to the conversation analyzer 1120. The conversation analyzer 1120 may also consider time data relating to information such as the conversation speed/tempo, pause timing/length, typical user timing in responding to another user, or the like. The system may thus use the time data to determine whether to interject. The system may also (or alternatively) use such time data to determine the timing of an interjection, for example how soon after a user has finished speaking should the system wait before beginning presentation of output in response to the user expression.

The conversation analyzer 1120 may also consider ASR results data 910 (either raw or processed/encoded) which may indicate certain words that may be relevant to the conversation analyzer 1120.

The conversation analyzer 1120 may also consider context data 1008 and/or other data that may assist the system in determining whether to interject a response to a user expression.

The above data allows the conversation analyzer 1120 to incorporate scene understanding in process data that describes the particular scene of a conversation to determine whether the system should interject as part of the conversation.

In certain embodiments the conversation mode may enable image data, audio data, etc. of a conversation to be sent from a local device 110 to a remote device 120 (such as a cloud server or home server or the like) without a wakeword for processing by the conversation analyzer 1120 to determine whether the system should interject a response to a user-to-user interaction. In other embodiments the conversation analyzer 1120 may reside on local device 110 or other home device to analyze data related to a user expression prior to such data leaving a user's home. In such configurations the conversation analyzer 1120 may reside within a dialog manager 372 operating as part of a local device 110. Such a conversation analyzer 1120 may operate with respect to data available to the local device 110 which may include all, or a subset of, or different data from, the data discussed above in regard to processing by the conversation analyzer 1120. If the conversation analyzer 1120 resides on a local device, the interject indicator data 1122 may be used to determine whether to send data related to the user expression (e.g., audio data, image data, or the like) to a downstream component for further processing, for example to remote server 120.

Using the conversation analyzer 1120 the system may proactively participate in a conversation, even when the system is not directly addressed. The system may determine when users are talking to each other, determine whether these are sidebar conversations not appropriate for system interjection or if they are appropriate for system interjection (e.g., whether they are relevant to a subject of an ongoing conversation with the system), and may proactively interject with helpful information that is personalized and directed to the user, and function as an equal participant in a multi-party conversation.

The conversation analyzer 1120 may be trained on training data representative of user conversations that may take place in the presence of a device. The training data may be annotated to indicate which user expressions of a conversation are appropriate for system interjection and which are not. The training data may include examples of all the different types of data the conversation analyzer 1120 may receive during runtime (for example, the types of data discussed above and/or illustrated in FIG. 11B). For example, the training may involve training on visual cues, dialog cues (such as pauses, gestures, tone of voice, speed of conversation, etc.), and/or other information that may impact a decision to interject into a conversation.

Training of the conversation analyzer 1120 may depend on the device(s) the conversation analyzer 1120 may ultimately be deployed with. For example, a conversation analyzer 1120 to be deployed in a device 110 that does not include a camera may be trained differently than a conversation analyzer 1120 to be deployed in a device 110 that does include a camera as one may be used with image data and another may not. Other such examples are also possible.

Training data may be taken from real or simulated conversations. For example the system may user a simulator that generates conversations between user(s) and the system.

Such conversations may be a combination of goal-oriented conversations or non-goal oriented conversations.

If the conversation analyzer 1120 outputs an interject indicator 1122 that indicates interjection is appropriate, the system (such as through action selector 1118 or some other component) may determine output data responsive to the user expression. Determining the output data may be done using various techniques described herein, for example determining output data using NLU results data 985, skill result data 930, user recognition data 2D95, user profile data 271, sentiment data 2055/2075, or other data to determine output text data 2110 or other output data 1108 that the system may output as an interjection into the conversation. For example, see the discussion with regard to FIGS. 15A-15H. The output may be customized to the particular user corresponding to the expression, to the user(s) of the conversation, to the sentiment of the conversation/expression, etc. The system may update data corresponding to the conversation (e.g., focus data 1116/dialog data) to indicate the output of the system as part of the conversation.

The conversation analyzer 1120 may use a user expression as a catalyst to determine whether to interject content, but other events may also trigger an interject indicator 1122 that indicates interjection is appropriate. For example, an interjection can be event drive (e.g., end of a timer, an incoming phone call, detection of a doorbell, etc.). The interjection may also be sensor driven, such as resulting from certain data received from one or more sensors. The interjection may also be driven by some external event. For example if users are having a conversation about a topic and new information is received by the system about that topic, the system may determine to interject based on receipt of that new information. (E.g., a sports score was just updated or new election returns were just made available.) Thus the conversation analyzer 1120 may ultimately determine an interjection is appropriate even if such interjection is not directly instigated by a user expression.

The system may also determine that an interjection is appropriate, even if such an interjection may interrupt a user. Though user profile and other settings may particularly govern such interjections. For example, if the system identifies information relevant to a statement of a first user and a second user has already begun talking about a different topic, the system may interject the information relevant to the first user even if such interjection may interrupt the second user. Although certain users may indicate that such interruptions are not desired, others may feel like such interruptions may be more human-like and thus may enhance the user's experience in a conversation mode. User preferences/permissions may be adjust to govern such interruptions.

Data from the conversation analyzer 1120 may be used to update the dialog data. For example, if an interject indicator 1122 for a particular turn of a dialog indicates that interruption is not appropriate, data for that interject indicator 1122/turn may be included in the dialog data so the system can track when it analyzed whether an interjection was appropriate and its results. If an interjection is made, that interject indicator 1122 as well as the timing, content, etc. related to the interjection may also be included in the dialog data. The system may track the number of interjections so it may determine whether another interjection is appropriate, which users' expressions are resulting in interjections, etc.

The dialog manager 272 may be configured to operate in a dialog mode configured for multi-user dialog. Such a mode may involve processing inputs that a user makes to a device but ignoring user speech or gestures, etc. that are not system directed, for example as determined by system directed input detector 385. The dialog manager 272 may also be configured to process user speech (or gesture, etc.) that may be directed to another user but may be related to an ongoing system dialog or other information that the system is capable of understanding and inserting meaningful information into a conversation between users.

The multi-user dialog mode may be activated in a variety of ways. This may include a spoken utterance with a standard wakeword such as "Alexa, enter multi-user dialog mode," (which the system may process using language processing component 292 to determine the command to enter the multi-user dialog mode) a spoken utterance with a custom wakeword such as "Group," which may invoke the multi-user dialog mode, pressing of a virtual or physical button the device 110, turning on the multi-user dialog mode in a companion application running on a phone/tablet of a user, or the like. The multi-user dialog mode may also be set to be always on by default (until turned off) by a particular user preference. The multi-user dialog mode may involve its own skill 290 which may manage interactions with the system until multi-dialog mode concludes. The multi-user dialog mode may also be managed by a separate dialog manager 272 specifically configured for multi-user dialog mode. The multi-user dialog mode may also be managed by a dialog manager 272 that is capable of operating multi-user dialog mode in addition to other modes (e.g., a normal dialog mode). Other component(s) may also be configured to manage multi-user dialog mode.

Activation of multi-user dialog mode may enable the system to process further user inputs without requiring the user to speak the wakeword before each spoken input to the system. With wakeword detection temporarily disabled, the system may then operate in a manner that can detect inputs from multiple users, identify a user that provided an input (for example identifying a user's face and/or voice using user recognition component 295 discussed below), and distinguish between audio intended from one user to another or spoken by one user and intended for the system as described herein. Such system directed detection may assist the system in ensuring that it only processes audio, gestures, etc. directed to the system, as opposed to those directed to other users (or other intended recipients such as pets, other objects, other device(s), etc.).

Figure 12:
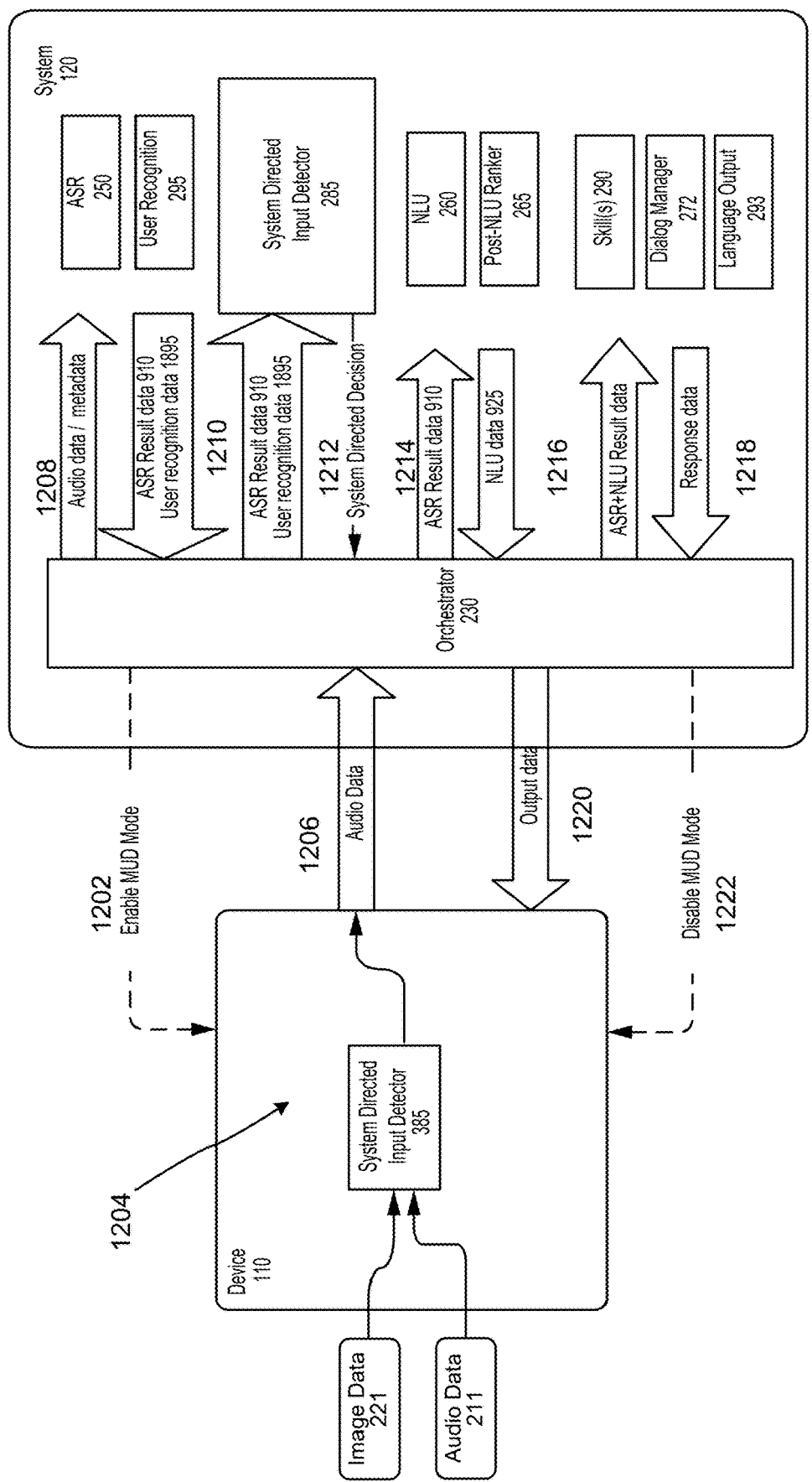
FIG. 12 is a schematic diagram of components for managing and coordinating a natural language dialog involving multiple users, according to embodiments of the present disclosure.

Operation of the multi-user dialog mode may proceed as illustrated in FIG. 12. After a command to initiate multi-user dialog mode is received the orchestrator 230 may 1202 send an indication to device 110 to enter multi-user dialog (MUD) mode. This may involve temporarily changing the operational mode of the wakeword detector 220, for example allowing the user to more easily speak to the system without having to speak the wakeword for each input to the system. The device 110 may then rely on output from the system directed input detector 385 to determine if an input is system directed. If the system determines an input is system directed (1204), the system may send (1206) audio data for speech processing. The audio data may be the same audio data 211 as determined by the microphone(s) of the device or may be processed audio data (for example by an acoustic front end (AFE) or other component of device 110. The further speech processing may involve language processing components of the system 120, 292, of the local device, 110, or a combination thereof. For illustration purposes, language processing using the system 120 is described.

Audio data and any multi-user dialog mode metadata (e.g., identifying a speaking face, gesture data, etc.) may be sent (1208) to ASR component 250 and/or the user recognition component 295 (which may use audio data/image data to identify a speaking user). The resulting ASR results data 910 and/or user recognition data 1895 may be sent (1210) to a system device directed detector 285. The system device directed detector 285 may confirm that the input is directed to the system and send (1212) an indication of such to the orchestrator 230. The ASR result data 910 may be sent (1214) to the NLU 260 for processing along with the post-NLU ranker 265. The NLU results data 925 and ASR result data 910 may be sent (1216) (through the orchestrator 230) to the dialog manager 272, appropriate skill(s) 290, etc. which may, along with language output 293, determine appropriate response data (which may include text for a TTS response or other output data) to be sent (1218) back to the orchestrator 230. Output data corresponding to the response may then be sent (1220) from the orchestrator 230 back to the device 110 for playback, for example in the form of a TTS playback directive.

At some point the system may determine that MUD mode has concluded. For example, a user may speak a command for the system to discontinue MUD mode, the dialog may end, MUD may timeout (for example after 30 seconds of silence), or the like. The system may then send (1222) a command from the system 120 to the device 110 a command to disable MUD mode. The device 110 may then instruct the wakeword component 220 and/or other components to resume normal operation.

As noted herein, the system may process various data to determine whether an input is system directed. The system may also process various data to consider turn taking in a dialog. For example, the system may consider prosody or other acoustic data (e.g., type of final intonation, final syllable duration, final drop in pitch, loudness, etc.), gesture, syntactic completeness (part of speech tag, clause end, etc.), pragmatic completeness (provided the value of all entities requested; if not, let's not rush them even if they pause), turn-maintaining signals (continuing gesture vs a gaze switch away), and user-to-user speech in both determining whether an input is system directed and for considering turn taking.

In certain configurations, the system 100 may be configured to participate in a conversation, and respond to a particular utterance, even if the utterance is not specifically directed to the system. The system, for example using dialog manager 272 and/or various other components of the system may be configured to interpret non-device directed dialog between users and incorporate it into response to device directed speech. Such processing and capability may be part of a conversation mode, which may operate on its own and/or in conjunction with other modes such as multi-user mode. Conversation mode may also be turned on and off by a user, thus giving the user control over when and whether the system attempts to process non-device directed speech, thus ensuring privacy and security for the user. During conversation mode the system may analyze received speech and proactively interject/provide output information even if a user utterance is not specifically directed at the system. The system may operate conversation mode for any utterances detected, or only for certain utterances, for example utterances related to a previously initiated system dialog, etc. For the latter, the system may perform language processing on an utterance that may not necessarily be system directed and determine a topic of the utterance before determining (for example using dialog manager 272 and/or other component(s)) whether to interject or otherwise respond to the utterance.

The dialog manager 272 may thus be configured to perform discourse understanding, particularly in a multi-party setting, to determine which user-to-user speech is relevant to the system and appropriate for the system to interject a response to, for example in the conversation mode. The system, for example using dialog manager 272, language processing 292, or other component(s) may process input data (e.g., audio data, gesture data, etc.) to parse an input into an intermediate logical form that models a user-to-user. The system may use data represent previous utterances, previous conversations, etc. The system may update information relevant to an ongoing user-to-user conversation by updating data for the conversation as the conversation is ongoing. Information related to the user-to-user conversation (which may also be referred to as a user-to-user dialog) in the dialog storage 1130. For example, the system may create, retrieve, update and/or delete data as information is exchanged during the conversation. The system may thus be configured to perform various operations with regard to data related to a user-to-user conversation. The system may be configured to remember relevant entities and infer new information from the user-to-user dialog even when the dialog has unspecified number of turns. The system may also be configured to carry over entity data appropriately to later turns and new dialog sessions. The system may also be configured to generalize across skills allowing the system to build and use a joint model using cross-skill data that can be applied to various scenarios which may involve fewer turns than a lengthy ongoing dialog.

The system may also be trained to recognize dialog cues as to when to interject information. The system may also be trained to properly configure interjections so they enhance, rather than detract, from a user-to-user conversation, allowing the conversation to continue as enhanced with the system provided information rather than being distracted by it, or interrupted/derailed by it. NLG component 279 may be configured to provide the interjection text in a natural form that allows the system to act as a conversation enhancer in this manner. Thus output text for a system interjection may refer specifically to a user and/or a previous user statement.

The system may be configured to support and handle various conversational actions such as pronominal anaphora, entity sharing across multiple turns, users changing their mind during conversations, proactive recommendations, cooperative versus uncooperative users and entity confirmation.

The system may be configured to model and understand a user-to-user dialog using a turn taking approach. The system may locally manage turn taking; that is, the information to decide who should take a next turn in the conversation is associated with a current turn. The system may focus on the various multi-modal inputs related to the conversation without necessarily relying on external information. The system may allow for individual turns to allow and potentially encourage for the turn to be overlapped, interjected, and passed over to other parties. The system may allow for turn taking to accommodate grossly observable facts. For a particular turn, the turn may include at least one transition-relevance place. At a transition relevance place, if the current speaker selects next, then the party selected has the right and obligation to speak and take the next turn at that place. Otherwise, whoever self-select themselves before others takes the next turn. If no one takes the next turn, the current speaker may continue or the conversation is discontinued (but can be continued again by any party).

Turns may be tailored to the recipients with regards to word selection, topic selection, admissibility and ordering of sequences, and rights and obligations for turn taking. Turn construction may be grounded to information learnt about the parties from conversational history. Each turn may have a three-part structure: a) association with previous turn (e.g., Affirmation/Denial, Continuation/Side Conversation/New Topic), b) occupying the turn, c) association with succeeding turn (e.g., huh?). For each of the conversational elements that appear in a turn, there may be at least one conversational element that can be used in the next turn. The interactional encounters (as opposed to simple requests for output, like playing songs) in a conversation may be optimized to be informative and brief, ideally through mutual grounding of information to minimize the extra collaboration needed to deal with time pressures, errors, and ignorance.

The inputs for the dialog manager, both for conversation mode and otherwise, may include not only text/audio related to the user-to-user utterances but also information related to image data or other inputs, such as an indication (from the image processing component 240 or other component) that detects a user gesture such as a head nod, hand wave, etc. Thus the turn-taking management may consider these types of data as well.

The system may be configured go handle breaks between and within turns. There are several kinds of breaks possible in conversations. One is transition relevance place (TRP) points. these are the points within the turn where there is no silence necessarily, but there are indications such as syntactic and pragmatic completeness. Other speakers may welcome to take over the turn at this point. Another is a pause, a period of silence within a speaker's turn. Another is a gap, a period of silence between turns. Another is a lapse, a period of silence when no sequence is in progress (visual or other forms of disengagement between speakers).

The system may be configured to distinguish a pause and a gap from a TRP and a lapse. At a pause, the system may output an interjection that allows the users to keep the floor by identifying one or more turn holding cues such as uh, hm, or utterances that are pragmatically and syntactically incomplete followed by a silence (e.g., "such as . . . ?"). Such output interjections allow the system to maintain the conversation without interrupting the user's flow of the thought and give the sufficient time to respond while acknowledging the system's ongoing participation in the conversation. This may be accomplished using a classifier or other model/component that takes into account the turn holding cues that are built on the top of the discourse understanding system. The model may also take into account, acoustic cues, prosody and other intonation classifications/acoustic data, and by extending the image processing features, such as those discussed herein with regard to image processing component 240.

If the system detects a silence that is classified as a pause, the system returns an empty TTS (e.g., does not output synthesized speech) and continues to listen. After an extended silence, The system outputs a backchannel response. For example, in an example of the customer adding elements to list, the system may output a backchannel response (sometimes referred to as "backchanneling") at the gap after an utterance (e.g., outputs a "ok") with the anticipation that more elements may be added. From the customer perspective, such an output identifies to the user that the system is continuing to pay attention and is waiting and thus gives the user more time, thus encouraging more participation from that user or other user(s) that may be parties in the conversation. In addition to specific use cases such as list handling, the system may be trained on simulated and model utterances which are syntactically and pragmatically incomplete. To train such a model the system may user simulated utterances with random pauses at the end of phrases within the utterance. Simulated pragmatic incompleteness may be accomplished by inserting pauses in utterances before entities that are requested to be updated are provided.

To allow more natural conversations between users and/or between one or more user(s) and the system, the system may be configured to allow for, and correctly handle and process, overlaps in speech. While existing conversational systems may operate as if there is no turn overlap and there is only one more party in the conversation, for multi-user conversations (for example in MUD mode), an improved ability to handle conversational overlap will lead to a better user experience. For example, if the system is outputting data corresponding to a turn in a conversation (e.g., paying back audio representing TTS synthesized speech), if a user interruption (sometimes referred to as a "barge-in") is detected, the system may discontinue or lower the volume of the TTS output to ensure processing (and outward recognition) of the user interruption. Discontinuing and/or lowering the volume of the TTS output signals to the user that the system recognizes the user is interrupting (for example with speech or a gesture), as well as decreases the likelihood that audio from the TTS response may impact the system's ability to capture/process data related to the user input. The system may also associate time data (such as a time stamp) of both output data (such as TTS data, images shown on a display) and input data (e.g., a user's interruption) so that the time data may be used for resolving anaphora and/or contextual references (e.g., "that one"), as described further below.

The system may also be able to handle variations of overlap in speeches including: a) barge-in by customer to change the topic, b) both the system (as decided by a turn allocation algorithm) and a user in a multi-user dialog self-decided to start the next turn for example in response to a question or a request by another user, resulting in TTS output overlapping with a user's speech, c) the system's turn/output being punctuated by a customer for pacing (ex: "I see," "Oh, boy," etc.) or cut short because the system's intent is clear, etc.

Barge-in support may include the system being able to process the user interrupting the system with a request, including anaphoric selection of a currently displayed or audibly indicated item (e.g., the user speaking "that one" in the middle of a list being output through TTS) or ordinal selection of any item (e.g., the user speaking "the second one" in response to a list being output through TTS or displayed on a screen), and the system being able to respond appropriately and in context. The system may also be able to recover from barge-in timing uncertainty through entity confirmation and other recovery actions. For example, if the system is unable to determine which item the user is referring to with sufficient confidence, it may ask a follow up question such as "did you mean the pepperoni pizza?" or the like.

The system may be configured to allow user barge-in at various points in a dialog, thus allowing the system to respond appropriately to the request while also appropriately maintaining context data, etc. for the dialog. The system may be configured to recover when a user barge-in is unclear. For example, using entity confirmation of the candidate barge-in entity ("you meant salmon, right?"). Alternatively, the system may perform an operation for general clarification ("I did not catch that, can you repeat the selection?"), for example if an NER score is low and the system is unable to confirm the entity, or if a skill does not have entity confirmation enabled.

The system may be configured to manage turn allocation by determining, for example as described above, whether certain inputs are directed to the system or directed to another user.

The system may also be configured to identify each speaker for a turn in the dialog (for example using user recognition component 295) and to store turn data as associated with the particular user. This may enable the system to personalize processing of dialog data as well as personalizing output for a particular speaker. Thus the system may respond to each user with personalized content by keeping track of what each user said in the dialog history. For example, if user A asks for an Italian restaurant and then user B asks for a Mexican restaurant and then user A asks "show me my restaurant list again," the system may show the Italian restaurant list because the request is by user A. The system may store and use relevant context data from the previous sessions on the same device or associated with a same user profile, to help personalize and speed up user interactions, such as enabling a user to continue the conversation across dialog sessions, picking up where they left off. For example, having one user having a dialog with the system and another user at one point in time (for example about restaurants) and later requesting the system to refer to that dialog, even if the other user is no longer present (e.g., "Alexa, what was that restaurant Jane recommended?"). The system may be able to store data related to customer selections, likes and dislikes, after the session is over and carry them over appropriately to new dialog sessions.

Figure 13:
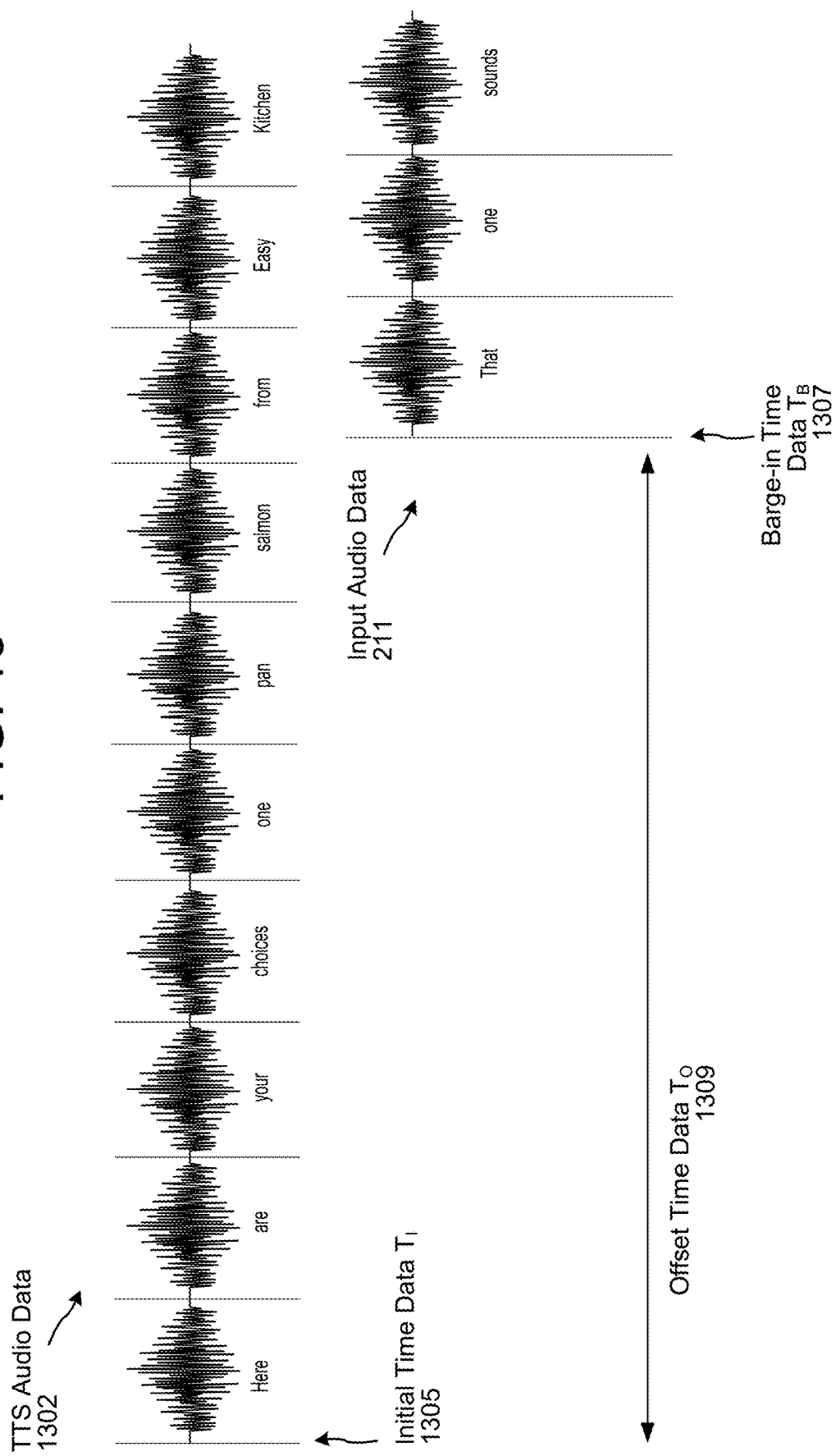
FIG. 13 illustrates determining timing information for a user input as part of a dialog, according to embodiments of the present disclosure.

As noted above, the system may use time data regarding various inputs and outputs, for example, to resolve anaphora/a contextual reference. FIG. 13 illustrates determining timing information for a user input as part of a dialog, according to embodiments of the present disclosure. As shown in FIG. 13, the system may be outputting TTS audio data 1302 in the form of a list of entries. For example, in response to a user command or otherwise, system 120 may send to device 110 a directive to output audio TTS audio data 1302 corresponding to a list of choices. The list may correspond to a variety of choices such as items to be selected, actions to be selected, or other examples. The system 120 may send the device 110 the TTS audio data 1302 to be output along with a text transcript of the words represented in the TTS audio data 1302. The device 110, may then determine initial time data, 1305, corresponding to the initial time $T_I$ at which the device begins outputting audio using the TTS audio data 1302. The initial time data 1305 may be determined using an internal clock of the device 110. For example, the initial time data 1305 may include a timestamp of the device 110 from when the device 110 started audio playback of the TTS output. Alternatively, the initial time data 1305 may reflect a time the device 110 started sending data to a different device (such as a wireless speaker) for playback by that device. Alternatively, the initial time data 1305 may reflect a time that alternate device began playback (which may be sent from that alternate device to device 110.) The time data determined by device 110 may be based on an internal clock of device 110, an internal clock of the alternate device, or some other clock.

When the device detects input audio data 211, for example corresponding to a user speaking an utterance to barge-in on the TTS output and select an item on the list, the device 110 may determine a time of the beginning of the utterance. That time may be $T_B$. The device 110 barge-in time data 1307 corresponding to the barge-in time $T_B$. The barge-in time data 1307 may be determined using an internal clock of the device 110. For example, the barge-in time data 1307 may include a timestamp of the device 110 from when the device 110 detected the input audio data 211. The barge-in time data 1307 may also reflect an adjusted timestamp. For example, the device 110 may detect a word barge-in detection at time $T_1$. But the word is L seconds long and it took the system $T_D$ to detect the word. Thus, the start of the word (e.g., start of the barge-in) may be reported as $T_1$–L–$T_D$.

The device 110 may then determine offset time data 1309 which may corresponding to an offset amount of time $T_O$ between when the device 110 began outputting the TTS audio and when the device 110 detected the input audio data 211. The offset time data 1309 may be determined, for example, by determining a difference between the barge-in time data 1307 and the initial time data 1305. For example, $T_O=|T_B-T_I|$. The device 110 may then send the offset time data 1309 representing $T_O$ to the remote system 120 and/or a speech processing component. The time data may be sent along with an indicator that the time data is associated with particular input audio data corresponding to the user's speech. The indicator may be the device ID of device 110, a speech session ID (e.g., dialog ID), user ID, communication ID, or other indicator. In such a situation the system 120 may associate the time data and the audio data by virtue of their being associated with the same indicator. The audio data may also be sent with the time data as part of a same communication. In such a situation the system 120 may associate the time data and the audio data by virtue of their being received together and/or as being associated with the same communication ID or other indicator.

The device 110 may also determine, for example using system directed input detector 385, that the input audio data 211 corresponds to system directed audio, thus confirming that the audio was intended as a barge-in for the system rather than background audio or other audio. The device 110 may make this determination prior to sending the offset time data 1309 to the remote system 120 and/or downstream speech processing component. The device 110 may stop its playback of TTS audio data upon detection of the input audio data 211 and thus may not output entities on the list that were to have been presented after the barge-in time $T_B$ 1307.

The system 120 may receive the input audio data 211 from device 110 and may perform speech processing (e.g., ASR and NLU) on the input audio data 211 to determine NLU results data or other speech processing results data. The system 120 may determine, using the NLU results data, that the input speech indicates or otherwise represents an unnamed entity, such as in an anaphoric reference like "that one" or the like. The system 120 may then determine that the input speech occurred while the device 110 was outputting audio corresponding to a TTS playback. For example, the device 110 may send an indicator/data to the system 120 that the input speech barged-in on a TTS output. The system 120 may then determine data representing the audio that was being played back. That data may include audio with corresponding timing markers or a transcript (e.g., text data 2110) with corresponding timing markers. The system 120 may then use that information to determine a time point of the TTS output transcript to determine when the user barged-in.

For example, the system 120 may process the offset time data 1309 to determine a point in the transcript (e.g., text data 2110) corresponding to when the user began speaking. The system may determine that the time the user began speaking corresponds to a range of time that corresponds to a mention of a particular entity within the transcript. The system may then select that particular entity for further processing, for example by determining that the anaphoric reference in the user's speech corresponds to the particular entity indicated in the transcript range. Thus the system may perform entity resolution for the anaphoric references (for example using techniques described herein) to select that entity for further processing according to the user's spoken command. The entity may then, for example, be added to dialog data for further operations.

Turning to the example illustrated in FIG. 13, a local device 110 may be outputting audio corresponding to a list of entries, for example recipe choices. The output audio may be the result of TTS processing performed by the system in response to a previous user request. The local device 110 may continue playback of the output audio until the user says "that one sounds good." The local device 110 may determine that the input audio data 211 corresponding to the user's speech was received at barge-in time $T_B$ 1307. The local device 110 may also determine that the TTS playback began at initial time $T_I$ 1305. The local device 110 may then determine the offset time data $T_O$ 1309 and may send that, along with audio data 211, to system 120. The local device 110 may also send the system 120 data indicating that the audio data 211 was received as part of a barge-in to a TTS output (e.g., the user started speaking over the device 110 while the device 110 was presenting audio output).

The system 120 may receive the offset time data $T_O$ 1309 and the audio data 211. The system may process the audio data 211 to determine the anaphoric reference "that one" represents an unnamed choice, such as an item in a list that was just output by the device 110. For example, an NLU component 260 may determine that "that one" comprises an anaphoric reference and may determine that the system was outputting (through TTS) a list of entries. The system 120 may then use the data indicating the audio data was received as part of a barge-in, along with a device identifier corresponding to the local device 110, a dialog ID, or other information such as user profile data, to determine that the local device 110 was outputting the particular TTS output corresponding to the list, e.g., the recipe list.

The system may use the transcript time information and the offset time data $T_O$ 1309 to determine that the user barged-in while the device 110 was outputting audio corresponding to a particular item on the list, e.g., the "one pan salmon from Easy Kitchen" illustrated in FIG. 13. For example, the system may determine that at time 1309 from the beginning of the TTS output, there is a reference to the entity "one pan salmon from Easy Kitchen." The system may then determine the entity item included at the appropriate output time aligned with the user's barge-in (e.g., "one pan salmon") and may thus identify and use that entity for further processing.

The transcript data used by the system to determine alignment of the barge-in time with an entity may include time ranges for particular words of the TTS output. For example, the system may store data corresponding to the output of FIG. 13 as:

[00:00:00]-[00:00:30]: here
[00:00:31]-[00:01:00]: are
[00:01:01]-[00:01:30]: your
[00:01:31]-[00:02:00]: choices
[00:02:01]-[00:03:00]: <pause>
[00:03:01]-[00:03:30]: one
[00:03:31]-[00:04:00]: pan
[00:04:01]-[00:04:30]: salmon
[00:04:31]-[00:05:00]: from
[00:05:01]-[00:05:30]: Easy
[00:05:31]-[00:06:00]: Kitchen The system may also indicate that certain words correspond to certain entities/intents/choices of the list. For example:

<entityID: salmon_recipe12345>: one pan salmon from Easy Kitchen

The system may also track what times of the transcript correspond to particular choices. For example:

[00:00:00]-[00:00:30]: <no entities>
[00:03:01]-[00:06:00]: <entityID: salmon_recipe12345>
[00:06:01]-[00:09:00]: <entityID: stew_recipe6789>
[00:09:01]-[00:12:00]: <entityID: pizza_recipeABCD>

The system may thus use the time data and stored data corresponding to the output audio to align the barge-in time with a choice in the list (e.g., an entity choice, action choice, etc.) and perform further action based on that choice.

In other examples, the system may use the timing data to determine that the user's barge-in did not relate to any choices of the list. For example, if the barge-in time is within a certain threshold of the audio playback time (e.g., the offset time is small) the system may determine that the barge-in relates to the overall playback/action taken by the system. For example, if the system starts outputting movie choices (e.g., "your movie choices are . . . ") and the system determines the user said "no" around the word "choices" the system may determine the word aligning with the barge-in (e.g., "choices"), determine that the user spoke before any of the choices were even offered and said the word "no" to determine that the choices being offered did not reflect a correct interpretation of the user's prior instruction and thus the system may discontinue the audio output and may attempt a different response to the user's prior utterance. Thus the timing data may be used by the system to interpret an utterance even if that interpretation may not necessarily involve selection of an item in a group of items.

In one example, the system may include the entity that matches the barge-in time 1307 (e.g., offset time 1309 from the initial time 1305) into the dialog data for further processing. Entries in a list that occur prior to the matched entity may also be included in the dialog data, as may be an entity that occurs just after the matched entity (particularly if the barge-in is close to a border between entities). Entries that occur later in the list may not be included in the dialog data as they may not have been presented to the user due to the user's barge-in.

In certain system configurations the system 120 may also send to the device 110 the TTS transcript (e.g., text data 2110) and corresponding timing data. The device 110 may then determine which entry was being played back or otherwise referenced by the user during the user's barge-in. The device 110 may then send an indicator of the entry (which may be associated with the TTS transcript) back to the system so the system may take further action regarding the selected entry.

In certain system configurations, the device 110 and/or system 120 may take into account user specific information to adjust the timing information (e.g., offset time data 1309). For example, if the system 120 is aware (for example, using user profile data) that the speaking user (e.g., the user identified based on user recognition data 1895) tends to interrupt slowly, the system may adjust the offset time data 1309 (e.g., by subtracting a certain time from the offset time data 1309) to account for the user's speed. Thus the system 120 may determine that a referenced entity is actually different from the entity that was being played back when the user barged-in.

Figure 14:
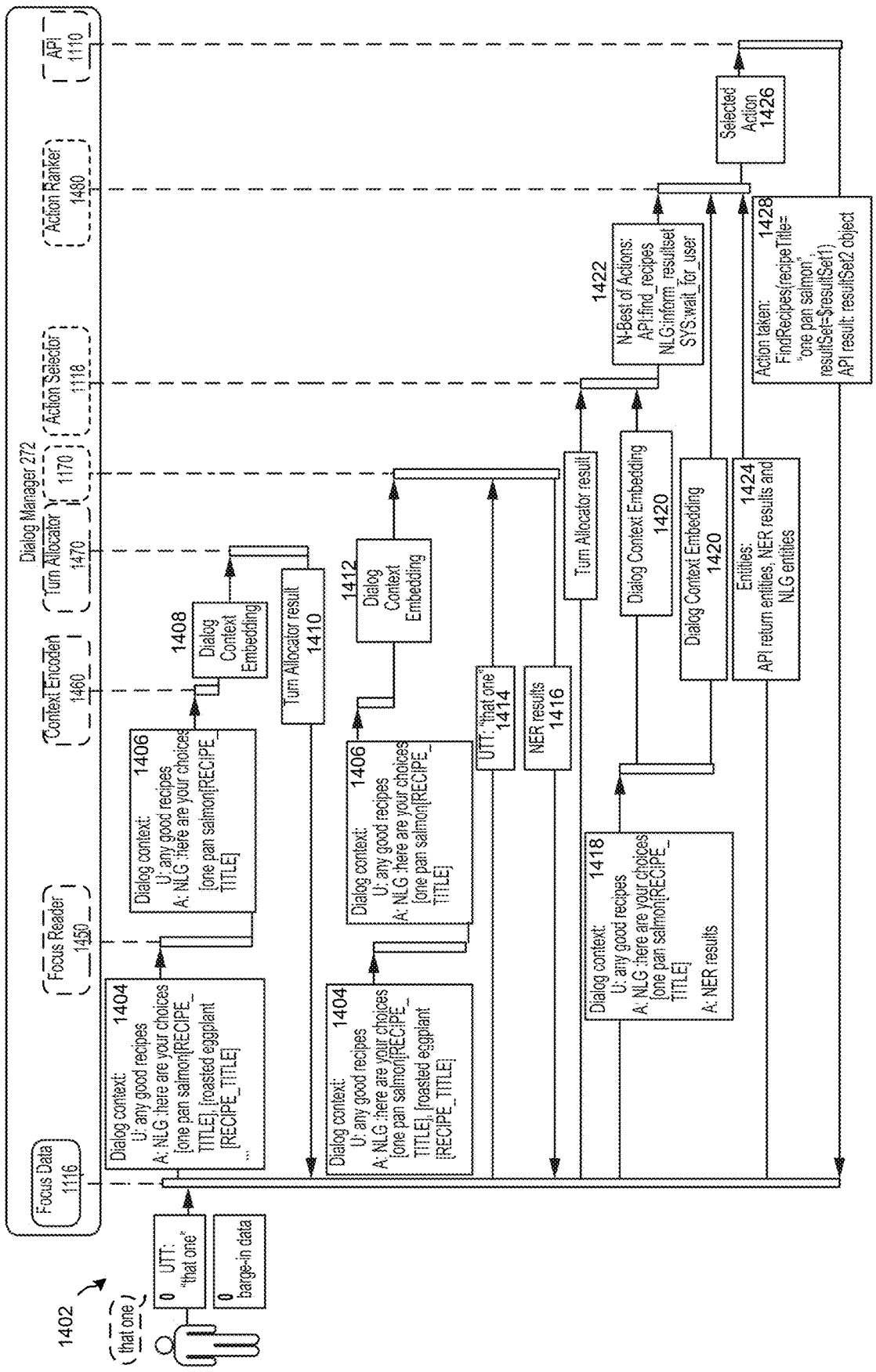
FIG. 14 illustrates an example exchange of data for detecting and resolving a contextual reference using timing information, according to embodiments of the present disclosure.

An example of the system using timing data for such entity/anaphora/a contextual reference resolution using different component(s) of the system is illustrated in FIG. 14. As shown in FIG. 14, an example exchange of data for detecting and resolving anaphora using timing information using the dialog manager 272, according to embodiments of the present disclosure. FIG. 14 illustrates a user speaking an utterance 1402 ("that one") as an example of the user selecting a recipe during a dialog requesting information about potential dinner recipes. The user's input is processed by language processing component 292 and the resulting data for the utterance (e.g., ASR result data 910, NLU result data 985/925, offset time data 1309, etc.) is sent to focus data component 1116 to supplement the existing dialog context 1404. The dialog context data 1404 is sent to the focus reader 1450, which is a component of the dialog manager 272 that is configured to determine which information of the dialog context may be relevant for further processing. The focus reader then sends the relevant dialog context data 1406 to the context encoder 1460. As the user's utterance 1402 occurred after the output of the first entry in the list (the recipe "one pan salmon"), the forwarded dialog context data may not necessarily include the other items in the list (e.g., the recipe "roasted eggplant" or later items in the list). The context encoder 1460 encodes the dialog context data 1406 into a form that may be processed by downstream components. The resulting dialog context embedding 1408 may then be sent to the turn allocator 1470 which determines that as a result of the user's barge-in, the turn of the dialog has now been passed to the system and thus a system response is appropriate. The result of the turn allocator is then sent 1410 to the focus data component 1116.

As system action is now required, the context encoder 1460 may then send dialog context embedding 1412 (which may reflect the previous context data 1406 as well as the turn allocator result 1410) to the entity resolver component 1170. The entity resolver component 1170 may also receive utterance data 1414 indicating the content/timing of the user's utterance. The entity resolver component 1170 may then use the utterance data (including the timing data) as well as the context embedding to determine that the user's utterance 1402 indicated selection of the first entry in the list (e.g., "one pan salmon"). This may be indicated in NER results 1416 sent to the focus data component 1116. The turn allocator result 1410 is sent to action selector 1118 along with an updated dialog context embedding 1420, which represents updated dialog context data 1418, which may include the NER results 1416.

The action selector 1118 determines an N-best list of actions 1422, corresponding API(s), NLG responses and system actions, etc. The N-best list 1422, dialog context embedding 1420, and entities 1424 (from the focus data 1116) are then sent to the action ranker 1480 which is a component that may determine the most likely action to be selected based on the available data. Although illustrated as a separate component, the action ranker 1480 may be incorporated within the action selector 1118 (similarly to how the post-NLU ranker 265 may be incorporated within NLU 260). The action ranker 1480 may then process the data and determine a top scoring action to be selected. In this example, the top action may be to obtain more information about the recipe "one pan salmon." The action ranker 1480 may then send data related to the selected action 1426 to the appropriate API 1110, which in this example may be an API related to a cooking skill. The API 1110 may then update the focus data with information 1428 about the action taken, so the system can update the dialog context data accordingly.

Although certain examples above discuss resolving barge-in using timing data for the example where a list of entities (e.g., recipe choices) is being output, similar techniques may be used for a list of action choices. Thus a list being output by a device may corresponding to a list of actions. For example if the user requested information about a particular movie, the list of actions may include selections such as "rent movie," "purchase movie," "play a trailer," "provide more information," or the like. At some point (e.g., at a second time) during the playback of the audio, the user may interrupt. The timing data of that interrupt and audio data may be processed as discussed above and the system may resolve the timing of the interrupt to align with one of the particular choices (such as "play a trailer"). In this situation the system may select "play a trailer" as the selected intent for the next command. E.g., the NLU component 260/dialog manager 272 may match intend data for the selected "play a trailer" action and may take further accordingly. For example, the dialog context may be updated to indicate that "play a trailer" was selected and the system 100 may take further action to play the requested trailer.

The system may perform processing to detect anaphora/a contextual reference prior to using the time data to resolve the user's command. For example, the system may perform speech processing using input audio data to determine an utterance refers to a selection/choice/entry that is not explicitly named in the user speech. The system may then use the time data to determine what selection the utterance is referring to.

FIGS. 15A-15H illustrate interactions with a virtual assistant system for managing and coordinating a natural language dialog involving multiple users in a MUD and/or conversation mode, according to embodiments of the present disclosure. These figures illustrate an example dialog using various techniques and components as described herein. Although the display of device 110 may be shown in these figures, the users may be within a field of view of the device 110 (e.g., detectable by one or more cameras of device 110), allowing the system to capture image data related to the users. In another example, the system may use audio data or image data available from one or more other devices to capture information regarding the users. For example, a user may appear at one point within a field of view of a camera of the system (either a camera of device 110 or of another connected device of the system). At another point the user may move outside the field of view. The system may, assuming user permissions, track the user using data from another camera, and/or use audio data (for example using a beamforming component of the system) to determine a position or other information about a user for purposes of operations discussed herein.

In FIG. 15A a user 5 looks at device 110 and speaks a first utterance. Due to a combination of the user's gaze (for example as determined by image processing component 340), the contents of the audio data (as determined, for example preliminarily, by language processing component 392), and other data, the system directed input detector 385 determines the utterance is system directed (even if the utterance did not include the wakeword) and processes the utterance accordingly. As part of the processing the system determines the identity of user 5 (for example using user recognition component 295) and is therefore able to address user 5 by name (e.g., "Lynn") when preparing the response.

The system may also update context/focus data 1116 to reflect the identity of user 5, the first utterance, and the first response using a dialog manager 272 or other component as part of the dialog exchange.

As shown in FIG. 15B, a new user 6 enters the dialog and speaks a second utterance for user 5. The system may determine that this second utterance is not directed to the system (for example using system directed input detector 385) however using the dialog manager 272/conversation analyzer 1120/other component(s), and assuming user permission, the system is able to determine that the second utterance is appropriate for the system to interject content in response to, for example the subject matter of the second utterance may correspond to a subject of the ongoing dialog started by the first utterance (e.g., a discussion about movies). The system may thus determine, using conversation analyzer 1120 or the like, that it is appropriate for the system to interject with information relevant to and/or responsive to the second utterance and so it does so, processing information related to the second utterance and outputting an answer to the question user 6 posed to user 5. The system may also update context/focus data 1116 to reflect the appearance of user 6, the second utterance, and the data describing the system's second response using a dialog manager 272 or other component as part of the dialog exchange.

As shown in FIG. 15C, user 5 then speaks a third utterance, intended for user 6. The system may determine that this third utterance is not directed to the system (for example using system directed input detector 385) however using the dialog manager 272/conversation analyzer 1120/ other component(s), and assuming user permission, the system is able to determine that the third utterance is appropriate for the system to interject content in response to, for example the subject matter of the third utterance also corresponds to the subject of the first utterance/ongoing dialog. The system may also determine, conversation analyzer 1120 or the like, that it is appropriate for the system to interject with information relevant to and/or responsive to the third utterance and so it does so, processing information related to the second utterance and outputting an answer to the question user 5 posed to user 6. The system may also perform scene understanding as a result of processing all the input data relevant to this third utterance spoken by user 5 in FIG. 15C to determine the identity of user 6, the context of the conversation (e.g., related to movies) and may know that user 5 and user 6 often rent a movie together. The system may thus suggest a movie based on the ongoing dialog data. The system may also update the context/focus data 1116 to reflect the interactions shown in FIG. 15C.

The system may also determine, using conversation analyzer 1120, that the user expression by user 6 in response to user 5 (e.g., when user 6 says "Haha. K.") is one that is not appropriate for system interjection and thus the system may not interject further content in response to user 6 saying "Haha. K." to user 5.

As shown in FIG. 15D, there is a further exchange between user 6 and user 5 inquiring about the movie. Even though the name of the movie is not mentioned in the exchange of FIG. 15D the system can use the context/focus data 1116 to resolve the anaphora and determine the subject matter of the user-to-user exchange. The system may determine, using conversation analyzer 1120, that it is appropriate to interject with information relevant to the movie under discussion and provides additional information. The system may also update context/focus data 1116 accordingly.

Figure 15E:
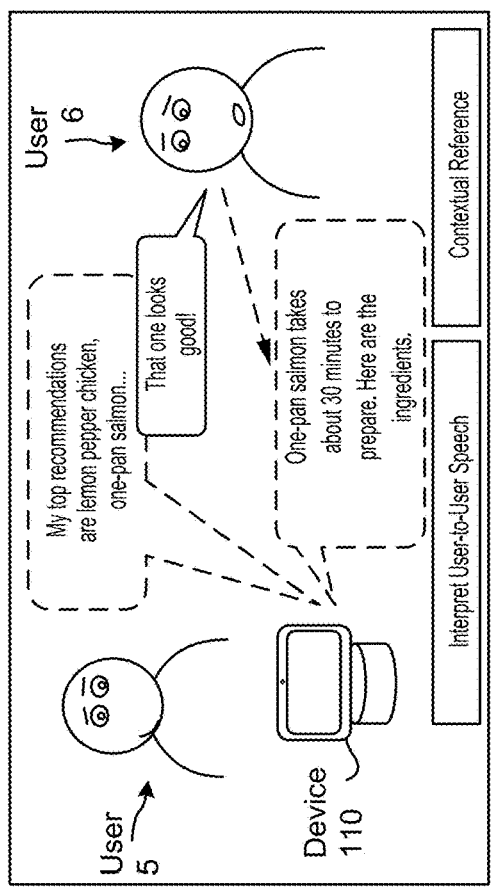
Figure 15F:
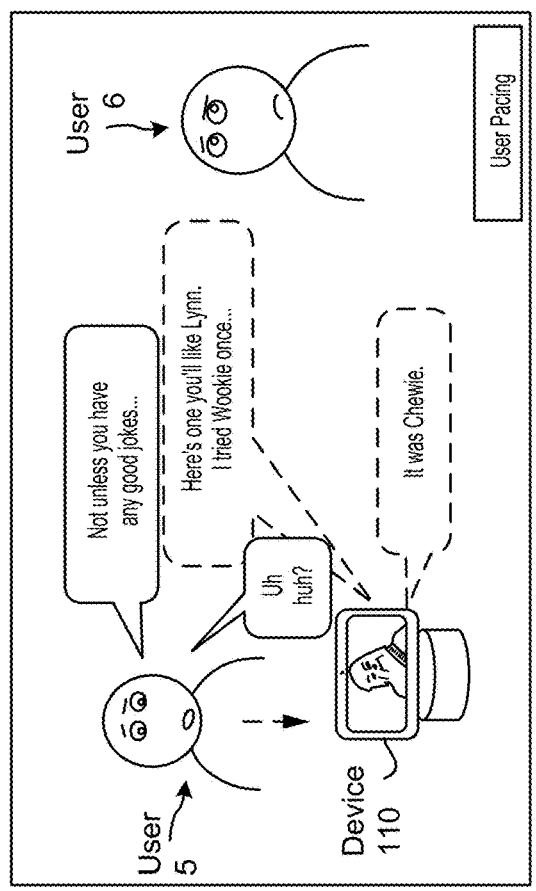

As shown in FIG. 15E, user 5 then speaks a command to the device 110 to rent the movie. The system determines this utterance is intended for the system and therefore executes the command and responds with a customized response to user 5. User 6 then speaks another utterance as part of the conversation that the system prepares a response to, as illustrated in FIG. 15F. The output is a list of potential meals and user 6 interjects with a selection with the system is able to match with the list using techniques described above. The system may also update context/focus data 1116 accordingly.

Figure 15G:
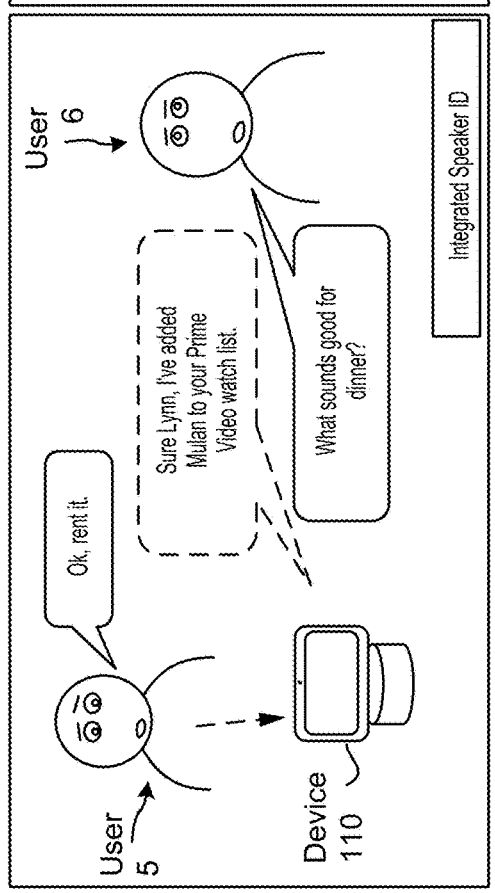
Figure 15H:
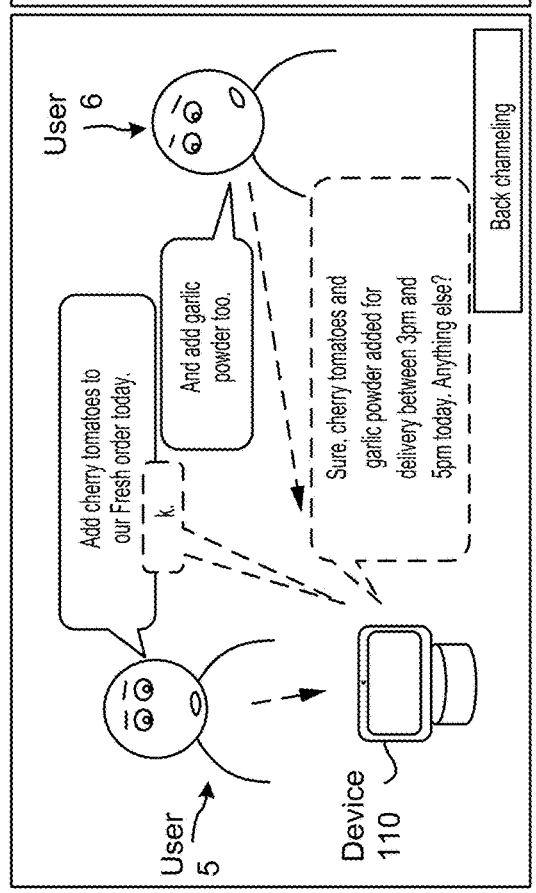

As shown in FIG. 15G user 5 then instructs the device 110 to add items to a shopping list, which the system does. The system, however, may provide a limited response in the form of a back channel response to allow the user 5 to continue to add items to the list if desired. Instead, user 6 speaks a command to add an item. The system determines the speech from user 6 is system directed and related to the Fresh order and thus incorporates both items and summarizes the order. The system may also update context/focus data 1116 accordingly. As shown in FIG. 15H user 5 indicates that the Fresh order is complete but also suggests a joke. The system uses information known about user 5 to pace the joke accordingly and may first output synthesized speech setting up the joke, but then insert a pause appropriate for user 5 before delivering the punchline in TTS form along with visual information punctuating the joke. The system may also determine that user 6 did not appreciate the joke (for example using sentiment detection 375) and thus may store information (for example profile data 271 with a user profile associated with user 6) indicating that user 6 did not like the joke.

Figure 16:
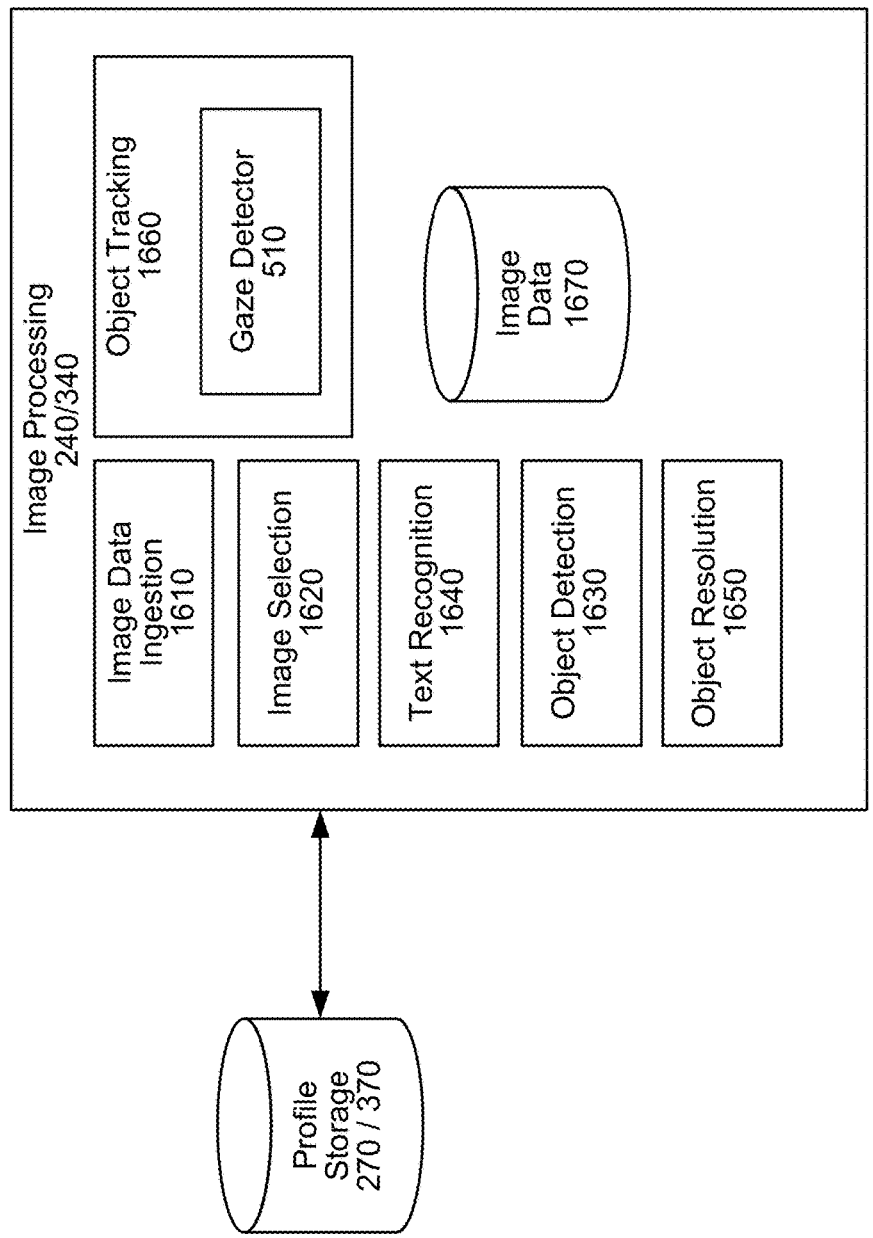
FIG. 16 is a conceptual diagram of components of an image processing component, according to embodiments of the present disclosure.

As shown in FIG. 16, the system(s) 120 may include image processing component 240. The image processing component 240 may located across different physical and/or virtual machines. The image processing component 240 may receive and analyze image data (which may include single images or a plurality of images such as in a video feed). The image processing component 240 may work with other components of the system 120 to perform various operations. For example the image processing component 240 may work with user recognition component 295 to assist with user recognition using image data. The image processing component 240 may also include or otherwise be associated with image data storage 1670 which may store aspects of image data used by image processing component 240. The image data may be of different formats such as JPEG, GIF, BMP, MPEG, video formats, and the like.

Image matching algorithms, such as those used by image processing component 240, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 1670, profile storage 270, or other storage component.

Image selection component 1620 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 240 may be configured to select or discard an image quickly so that the system can, in turn, quickly process the selected image and deliver results to a user. The image selection component 1620 may select an image for object recognition by computing a metric/feature for each frame in the video feed and selecting an image for processing if the metric exceeds a certain threshold. While FIG. 16 illustrates image selection component 1620 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1620 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 1620 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 1620 for sending to another component (e.g., from device to system 120) and/or for further processing, such as text recognition, object detection/resolution, etc.

The feature data calculated by image selection component 1620 may be sent to other components such as text recognition component 1640, objection detection component 1630, object resolution component 1650, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 1630 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1630 may process at least a portion of the image data to determine feature data. The feature data is indicative of one or more features that are depicted in the image data. For example, the features may be face data, or other objects, for example as represented by stored data in profile storage 270. Other examples of features may include shapes of body parts or other such features that identify the presence of a human. Other examples of features may include edges of doors, shadows on the wall, texture on the walls, portions of artwork in the environment, and so forth to identify a space. The object detection component 1630 may compare detected features to stored data (e.g., in profile storage 270, image data 1670, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1630 the system may determine which object is actually seen using object resolution component 1650. Thus one component, such as object detection component 1630, may detect if an object is represented in an image while another component, object resolution component 1650 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1630 may determine that a type of object is represented in image data and object resolution component 1650 may then determine which specific object is represented. The object resolution component 1650 may also make available specific data about a recognized object to further components so that further operations may be performed with regard to the resolved object.

Object detection component 1630 may be configured to process image data to detect a representation of an approximately two-dimensional (2D) object (such as a piece of paper) or a three-dimensional (3D) object (such as a face). Such recognition may be based on available stored data (e.g., 270, 1670, etc.) which in turn may have been provided through an image data ingestion process managed by image data ingestion component 1610. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component 1630 may be configured to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Man-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by backpropagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image} | \text{object})}{P(\text{image} | \text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

After at least a portion of a user has been detected in image data captured by a computing device, approaches in accordance with various embodiments track the detected portion of the user, for example using object tracking component 1660. The object tracking component 1660, gaze detector 510, or other component(s), may use user recognition data 1895 or other information related to the user recognition component to identify and/or track a user using image data. FIGS. 17A-F illustrate certain approaches that can be utilized for detecting and tracking a user's face in accordance with various embodiments. FIG. 17A illustrates an example wherein the approximate position and orientation of the head of a user 1702 has been determined and a virtual "box" 1720 is placed around the user's head using one or more of the various user detection processes discussed herein. A similar or different approach can also be used to determine an approximate location and area 1722 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device and that the user is looking at the device. Further, the relative movement of the user's eyes and mouth can be easier to detect than the overall movement of the user's face when the user is performing motions such as nodding or shaking the head back and forth.

Various other approaches can also be used to track the user. For example, FIG. 17B illustrates an example wherein various features on a user's face are identified and assigned a point 1724 in the image. The system thus can detect various aspects of user facial features and can determine changes such as movement or change in shape or expression. Such an approach can provide advantages over the general approach of FIG. 17A in certain situations, as various points along a facial feature can be determined, such as the end points and at least one center point of a user's mouth. Accordingly, expressions such as a smile or frown can be captured even though the overall position of the user's mouth or face did not move.

Once the facial features of a user are detected, relative motion or changes in facial expression can be tracked and utilized as input in accordance with various embodiments. For example, FIG. 17C illustrates an example where the user's head 1702 is moving up and down with respect to the viewable area of the imaging element. As discussed, this could be the result of the user shaking his or her head, or the user moving the device up and down, etc. FIG. 17D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 17E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

FIG. 17F illustrates another advantage of using an approach such as that described with respect to FIG. 17B to determine the position of various features on a user's face.

In this example, it can be seen that the features of a head of a second user 1704 have a different relative position and separation. Thus, a computing device also can not only determine positions and changes of facial features for a specific user, but can distinguish between different users. Also, the device can be configured to detect how close a user is to the device based on, for example, the amount and ratio of separation of various features 1725, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Object tracking component 1660 may also track other objects represented in image data. An object identified in image data (for example by object detection component 1630) may appear in different position(s) in image data captured by a camera of device 110. Object tracking component 1660 may track the object across image data and may (along with other component(s) of the system) attempt to determine a relative position of the object to the device 110 (or other reference point) over time using various techniques.

Object tracking component 1660 may also include a gaze detection component 510. The gaze detection component 510 may also be located elsewhere in the system design. The gaze detection component 510 may include a classifier or other component (for example including one or more trained model(s)) that is configured to track the gaze of a user using image data and/or feature data corresponding to image data. The gaze detection component 510 may output data indicating that a user is looking at a device or looking elsewhere (for example at another user). If operated on device 110, the gaze detection component 510 may process image data (which may including raw image data captured by a camera or may include feature data representing raw image data) to determine that the user is gazing at a camera of the device. If operated on another device, the gaze detection component 510 may process image data to determine a user is looking at device 110, for example looking at device 110 while speaking an utterance. In this manner processing by a second device may be used to determine that a user is looking at a first device while speaking to the first device. Thus, for example, in a smart-home situation image data from a camera removed from a speech-capture device (e.g., device 110) may be used to determine a user was looking at the speech-capture device when speaking. Data from the gaze detector 510 may be used, for example, by system directed input detector 385.

The device 110 and/or the system(s) 120 may include a user recognition component 295 that recognizes one or more users using a variety of data. As illustrated in FIG. 18, the user recognition component 295 may include one or more subcomponents including a vision component 1808, an audio component 1810, a biometric component 1812, a radio frequency (RF) component 1814, a machine learning (ML) component 1816, and a recognition confidence component 1818. In some instances, the user recognition component 295 may monitor data and determinations from one or more subcomponents to determine an identity of one or more users associated with data input to the device 110 and/or the system(s) 120. The user recognition component 295 may output user recognition data 1895, which may include a user identifier associated with a user the user recognition component 295 determines originated data input to the device 110 and/or the system(s) 120. The user recognition data 1895 may be used to inform processes performed by various components of the device 110 and/or the system(s) 120.

The vision component 1808 may receive data from one or more sensors capable of providing images (e.g., cameras) or sensors indicating motion (e.g., motion sensors). The vision component 1808 can perform facial recognition or image analysis to determine an identity of a user and to associate that identity with a user profile associated with the user. In some instances, when a user is facing a camera, the vision component 1808 may perform facial recognition and identify the user with a high degree of confidence. In other instances, the vision component 1808 may have a low degree of confidence of an identity of a user, and the user recognition component 295 may utilize determinations from additional components to determine an identity of a user. The vision component 1808 can be used in conjunction with other components to determine an identity of a user. For example, the user recognition component 295 may use data from the vision component 1808 with data from the audio component 1810 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1812. For example, the biometric component 1812 may receive data corresponding to fingerprints, iris or retina scans, thermal scans, weights of users, a size of a user, pressure (e.g., within floor sensors), etc., and may determine a biometric profile corresponding to a user. The biometric component 1812 may distinguish between a user and sound from a television, for example. Thus, the biometric component 1812 may incorporate biometric information into a confidence level for determining an identity of a user. Biometric information output by the biometric component 1812 can be associated with specific user profile data such that the biometric information uniquely identifies a user profile of a user.

The radio frequency (RF) component 1814 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1814 the strength of the signal (e.g., as a received signal strength indication (RSSI)). The RF component 1814 may use the RSSI to determine an identity of a user (with an associated confidence level). In some instances, the RF component 1814 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1816 may track the behavior of various users as a factor in determining a confidence level of the identity of the user. By way of example, a user may adhere to a regular schedule such that the user is at a first location during the day (e.g., at work or at school). In this example, the ML component 1816 would factor in past behavior and/or trends in determining the identity of the user that provided input to the device 110 and/or the system(s) 120. Thus, the ML component 1816 may use historical data and/or usage patterns over time to increase or decrease a confidence level of an identity of a user.

In at least some instances, the recognition confidence component 1818 receives determinations from the various components 1808, 1810, 1812, 1814, and 1816, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1895.

The audio component 1810 may receive data from one or more sensors capable of providing an audio signal (e.g., one or more microphones) to facilitate recognition of a user. The audio component 1810 may perform audio recognition on an audio signal to determine an identity of the user and associated user identifier. In some instances, aspects of device 110 and/or the system(s) 120 may be configured at a computing device (e.g., a local server). Thus, in some instances, the audio component 1810 operating on a computing device may analyze all sound to facilitate recognition of a user. In some instances, the audio component 1810 may perform voice recognition to determine an identity of a user.

The audio component 1810 may also perform user identification based on audio data 211 input into the device 110 and/or the system(s) 120 for speech processing. The audio component 1810 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1810 may perform user recognition by comparing speech characteristics represented in the audio data 211 to stored speech characteristics of users (e.g., stored voice profiles associated with the device 110 that captured the spoken user input).

Figure 19:
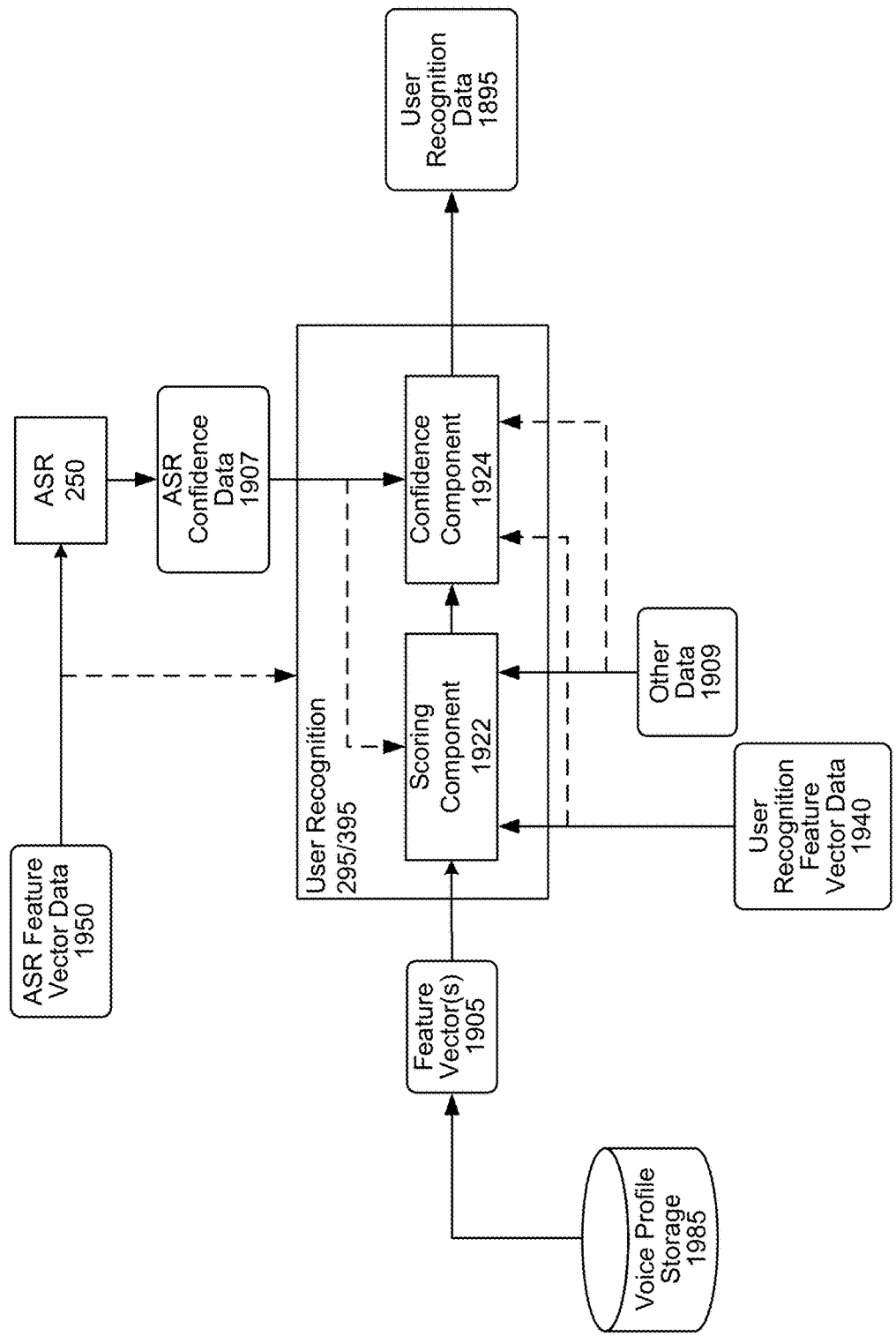
FIG. 19 is a system flow diagram illustrating user recognition according to embodiments of the present disclosure.

FIG. 19 illustrates user recognition processing as may be performed by the user recognition component 295. The ASR component 250 performs ASR processing on ASR feature vector data 1950. ASR confidence data 1907 may be passed to the user recognition component 295.

The user recognition component 295 performs user recognition using various data including the user recognition feature vector data 1940, feature vectors 1905 representing voice profiles of users of the system 100, the ASR confidence data 1907, and other data 1909. The user recognition component 295 may output the user recognition data 1895, which reflects a certain confidence that the user input was spoken by one or more particular users. The user recognition data 1895 may include one or more user identifiers (e.g., corresponding to one or more voice profiles). Each user identifier in the user recognition data 1895 may be associated with a respective confidence value, representing a likelihood that the user input corresponds to the user identifier. A confidence value may be a numeric or binned value.

The feature vector(s) 1905 input to the user recognition component 295 may correspond to one or more voice profiles. The user recognition component 295 may use the feature vector(s) 1905 to compare against the user recognition feature vector 1940, representing the present user input, to determine whether the user recognition feature vector 1940 corresponds to one or more of the feature vectors 1905 of the voice profiles. Each feature vector 1905 may be the same size as the user recognition feature vector 1940.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1940 produced from the audio data 211. The user recognition component 295 may send a signal to voice profile storage 1985, with the signal requesting only audio data and/or feature vectors 1905 (depending on whether audio data and/or corresponding feature vectors are stored) associated with the device identifier, the group profile identifier, and/or the user identifiers represented in the metadata. This limits the universe of possible feature vectors 1905 the user recognition component 295 considers at runtime and thus decreases the amount of time to perform user recognition processing by decreasing the amount of feature vectors 1905 needed to be processed. Alternatively, the user recognition component 295 may access all (or some other subset of) the audio data and/or feature vectors 1905 available to the user recognition component 295. However, accessing all audio data and/or feature vectors 1905 will likely increase the amount of time needed to perform user recognition processing based on the magnitude of audio data and/or feature vectors 1905 to be processed.

If the user recognition component 295 receives audio data from the voice profile storage 1985, the user recognition component 295 may generate one or more feature vectors 1905 corresponding to the received audio data.

The user recognition component 295 may attempt to identify the user that spoke the speech represented in the audio data 211 by comparing the user recognition feature vector 1940 to the feature vector(s) 1905. The user recognition component 295 may include a scoring component 1922 that determines respective scores indicating whether the user input (represented by the user recognition feature vector 1940) was spoken by one or more particular users (represented by the feature vector(s) 1905). The user recognition component 295 may also include a confidence component 1924 that determines an overall accuracy of user recognition processing (such as those of the scoring component 1922) and/or an individual confidence value with respect to each user potentially identified by the scoring component 1922. The output from the scoring component 1922 may include a different confidence value for each received feature vector 1905. For example, the output may include a first confidence value for a first feature vector 1905a (representing a first voice profile), a second confidence value for a second feature vector 1905b (representing a second voice profile), etc. Although illustrated as two separate components, the scoring component 1922 and the confidence component 1924 may be combined into a single component or may be separated into more than two components.

The scoring component 1922 and the confidence component 1924 may implement one or more trained machine learning models (such as neural networks, classifiers, etc.) as known in the art. For example, the scoring component 1922 may use probabilistic linear discriminant analysis (PLDA) techniques. PLDA scoring determines how likely it is that the user recognition feature vector 1940 corresponds to a particular feature vector 1905. The PLDA scoring may generate a confidence value for each feature vector 1905 considered and may output a list of confidence values associated with respective user identifiers. The scoring component 1922 may also use other techniques, such as GMMs, generative Bayesian models, or the like, to determine confidence values.

The confidence component 1924 may input various data including information about the ASR confidence 1907, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 1924 may also consider the confidence values and associated identifiers output by the scoring component 1922. For example, the confidence component 1924 may determine that a lower ASR confidence 1907, or poor audio quality, or other factors, may result in a lower confidence of the user recognition component 295. Whereas a higher ASR confidence 1907, or better audio quality, or other factors, may result in a higher confidence of the user recognition component 295. Precise determination of the confidence may depend on configuration and training of the confidence component 1924 and the model(s) implemented thereby. The confidence component 1924 may operate using a number of different machine learning models/techniques such as GMM, neural networks, etc. For example, the confidence component 1924 may be a classifier configured to map a score output by the scoring component 1922 to a confidence value.

The user recognition component 295 may output user recognition data 1895 specific to a one or more user identifiers. For example, the user recognition component 295 may output user recognition data 1895 with respect to each received feature vector 1905. The user recognition data 1895 may include numeric confidence values (e.g., 0.0-1.0, 0-1000, or whatever scale the system is configured to operate). Thus, the user recognition data 1895 may output an n-best list of potential users with numeric confidence values (e.g., user identifier 123—0.2, user identifier 234—0.8). Alternatively or in addition, the user recognition data 1895 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1895 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 1924 may determine the overall confidence value.

The confidence component 1924 may determine differences between individual confidence values when determining the user recognition data 1895. For example, if a difference between a first confidence value and a second confidence value is large, and the first confidence value is above a threshold confidence value, then the user recognition component 295 is able to recognize a first user (associated with the feature vector 1905 associated with the first confidence value) as the user that spoke the user input with a higher confidence than if the difference between the confidence values were smaller.

The user recognition component 295 may perform thresholding to avoid incorrect user recognition data 1895 being output. For example, the user recognition component 295 may compare a confidence value output by the confidence component 1924 to a threshold confidence value. If the confidence value does not satisfy (e.g., does not meet or exceed) the threshold confidence value, the user recognition component 295 may not output user recognition data 1895, or may only include in that data 1895 an indicator that a user that spoke the user input could not be recognized. Further, the user recognition component 295 may not output user recognition data 1895 until enough user recognition feature vector data 1940 is accumulated and processed to verify a user above a threshold confidence value. Thus, the user recognition component 295 may wait until a sufficient threshold quantity of audio data of the user input has been processed before outputting user recognition data 1895. The quantity of received audio data may also be considered by the confidence component 1924.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1905, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 1909 to inform user recognition processing. A trained model(s) or other component of the user recognition component 295 may be trained to take other data 1909 as an input feature when performing user recognition processing. Other data 1909 may include a variety of data types depending on system configuration and may be made available from other sensors, devices, or storage. The other data 1909 may include a time of day at which the audio data 211 was generated by the device 110 or received from the device 110, a day of a week in which the audio data audio data 211 was generated by the device 110 or received from the device 110, etc.

The other data 1909 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 1940 and one or more feature vectors 1905 to perform more accurate user recognition processing.

The other data 1909 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1909 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1909 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1909 may include data representing activity of a particular user that may be useful in performing user recognition processing. For example, a user may have recently entered a code to disable a home security alarm. A device 110, represented in a group profile associated with the home, may have generated the audio data 211. The other data 1909 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 1909 and considered by the user recognition component 295.

Depending on system configuration, the other data 1909 may be configured to be included in the user recognition feature vector data 1940 so that all the data relating to the user input to be processed by the scoring component 1922 may be included in a single feature vector. Alternatively, the other data 1909 may be reflected in one or more different data structures to be processed by the scoring component 1922.

Figure 20:
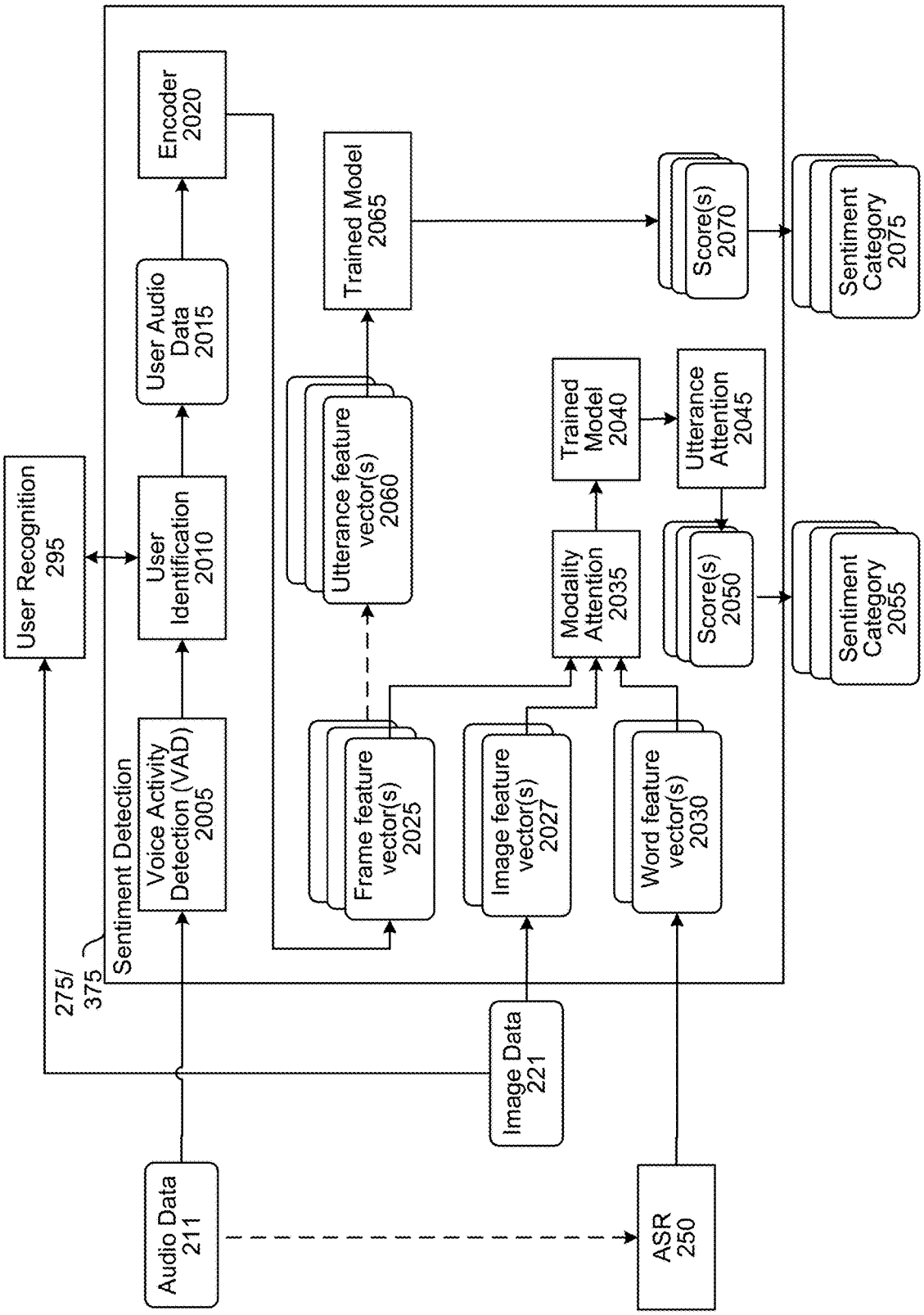
FIG. 20 is a conceptual diagram illustrating a sentiment detection component according to embodiments of the present disclosure.

FIG. 20 is a conceptual diagram illustrating sentiment detection component 275 according to embodiments of the present disclosure. The sentiment detection component 275 may determine a user sentiment based on audio data 211, image data 211, and other data. Although certain configurations/operations of the sentiment detection component 275 are illustrated in FIG. 20 and described herein, other techniques/configurations of sentiment detection may be used depending on system configuration.

The sentiment detection component 275 may include a voice activity detection (VAD) component 2005, a user identification component 2010, an encoder component 2020, a modality attention layer 2035, a trained model component 2040, an utterance attention layer 2045, and a trained model component 2065. The audio data 211 captured by a device 110 may be inputted into the VAD component 2005. The VAD component 2005 may determine if the audio data 211 includes speech spoken by a human or voice activity by a human, and may determine a portion of the audio data 211 that includes speech or voice activity. The VAD component 2005 may send the portion of the audio data 211 including speech or voice activity to the user identification component 2010. The VAD component 2005 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 2005 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 2010 may communicate with the user recognition component 295 to determine user audio data 2015 that corresponds to a particular user profile. The user recognition component 295 may recognize one or more users as described in connection with FIGS. 18 and 19. The user audio data 2015 may be a portion of the audio data 211 that includes speech or one or more utterances from a particular user associated with the user profile. In other words, audio data representing a particular user's speech may be isolated and stored as the user audio data 2015 for further analysis. In an example embodiment, the user may be associated with or using the device 110, and may have provided permission to the system 100 to record and analyze his or her voice/conversations to determine a sentiment category corresponding to the conversation.

The user audio data 2015 may be input into the encoder component 2020 to determine frame feature vector(s) 2025. The encoder component 2020 may be a bidirectional LSTM. The frame feature vector(s) 2025 may represent audio frame level features extracted from the user audio data 2015. One frame feature vector 2025 may represent audio frame level features for an audio frame of 20 ms of the user audio data 2015. The frame feature vector(s) 2025 may be derived by spectral analysis of the user audio data 2015. The sentiment detection component 275 may determine the portions of user audio data 2015 that correspond to individual words and may extract acoustic features from the respective portions of audio using the encoder component 2020.

In some embodiments, the frame feature vector(s) 2025 may be used to determine utterance feature vector(s) 2060 representing utterance-level features of one or more utterances represented in the user audio data 2015. The utterance feature vector(s) 2060 may be determined by performing statistics calculations, delta calculation and other processing on the frame feature vector(s) 2025 for the audio frames corresponding to an utterance of interest. As such, the utterance feature vector(s) 2060 may be a feature matrix whose dimensions are based on the number of audio frames corresponding to the utterance of interest and the dimension of the corresponding frame feature vector 2025. The utterance feature vector(s) 2060 may be a high-level function or other mathematical functions representing the utterance-level features.

The ASR component 250, as described above, may generate ASR output data, for example including text data representative of one or more utterances represented in the audio data 211. In some examples, the system sends audio data 211 to the ASR component 250 for processing. In other examples, the system sends user audio data 2015 to the ASR component 250 for processing. The ASR output may be represented as word feature vector(s) 2030, where each word feature vector 2030 may correspond to a word in the text data determined by the ASR component 250 and may represent lexical information of the utterance. The word feature vector 2030 may be a word embedding.

In an example embodiment, the sentiment detection component 275 determines that the user audio data 2015 includes an entire utterance. That is, the sentiment detection component 275 may determine that a beginpoint of the user audio data 2015 corresponds to a beginpoint of an utterance, and an endpoint of the user audio data 2015 corresponds to an endpoint of the utterance. In this case, the frame feature vector(s) 2025 and the word feature vector(s) 2030 may represent all the words in one utterance.

The sentiment detection component 275 may also input image data 211 which may come from still images, an image feed of video data, or the like for example from one or more cameras of device 110 or otherwise. The image data 211 may include a representation of a user which the system may analyze to determine the user's sentiment. Image data 211 may be processed by an encoder (not illustrated) to determine image feature vector(s) 2027. Such an encoder may be included as part of sentiment detection component 275 or may be located separately, in which case image feature vector(s) 2027 may be input into sentiment detection component 275 in addition to or instead of image data 211. The image data/feature vectors may be analyzed separately by sentiment detection component 275 if audio data/ASR data is unavailable. The image data/feature vectors may also be analyzed in conjunction with the audio data/ASR output data.

The sentiment detection component 275 may align a frame feature vector 2025 with a corresponding word feature vector 2030 such that the pair represents acoustic information and lexical information, respectively, for an individual word in the utterance represented in user audio data 2015. The sentiment detection component 275 may similarly align one or more image feature vector(s) 2027 with one or more frame feature vector(s) 2025 and/or corresponding word feature vector(s) 2030 so the appropriate image(s) are matched with the frames/ASR output data thus allowing the system to consider the audio, content and image of the user talking when performing sentiment analysis. The frame feature vectors 2025, image feature vector(s) 2027, and the word feature vectors 2030 may be processed by the trained model 2040 simultaneously.

The trained model 2040 may process the frame feature vector(s) 2025 and corresponding word feature vector(s) 2030 using a machine learning model. In some embodiments, the sentiment detection component 275 includes a modality attention component 2035 configured to determine how much acoustic information versus how much lexical information versus how much image information from the respective feature vectors 2025/2027/2030 should be used by the trained model 2040. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 2035 may assign a weight or percentage to the data represented by the acoustic feature vectors, the data represented by the image feature vectors, and the data represented by the lexical feature vectors to indicate the importance of each to the trained model 2040.

The trained model 2040 may be a neural network, for example a bi-directional LSTM. The output of the trained model 2040 may be fed into an utterance attention component 2045. The utterance attention component 2045 may employ a neural network, for example a recurrent neural network, although the disclosure is not limited thereto. The utterance attention component 2045 may be configured to emphasize relevant portions of an input utterance. The utterance attention component 2045 may be configured to take in output data from the trained model 2040 and produce an output for every time step (e.g., a 10 ms audio frame). The utterance attention component 2045 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 2045 is configured to realize that the first word corresponds to an anger sentiment and that that should affect the processing of the other words in the utterance to ultimately determine a sentiment category corresponding to the utterance.

The utterance attention component 2045 may output score(s) 2050 indicating a sentiment category 2055 for the user audio data 2015. The sentiment detection component 275 may predict from multiple sentiment categories, including but not limited to, happiness, sadness, anger and neutral. In an example embodiment, the sentiment category 2055 may be determined after score(s) 2050 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 2075 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 20, the trained model component 2065 may process the utterance feature vector(s) 2060 using a fully-connected neural network trained using techniques known to one of skill in the art. The trained model component 2065 may output score(s) 2070 indicating a sentiment category 2075 for the user audio data 2015.

The sentiment detection component 275 may predict one of three sentiment categories 2055/2075. In some examples, the sentiment categories 2055/2075 may be positive, neutral, and negative. However, the disclosure is not limited thereto, and in other examples the sentiment categories 2055/2075 may be angry, neutral (e.g., neutral/sad), and happy without departing from the disclosure. Additionally or alternatively, the sentiment detection component 275 may predict any number of sentiment categories 2055/2075 without departing from the disclosure. For example, the sentiment detection component 275 may predict one of four sentiment categories 2055/2075, such as angry, sad, neutral, and happy, although the disclosure is not limited thereto.

The machine learning model for the trained model component 2040/2065 may take many forms, including a neural network. The trained model component 2040/2065 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 21:
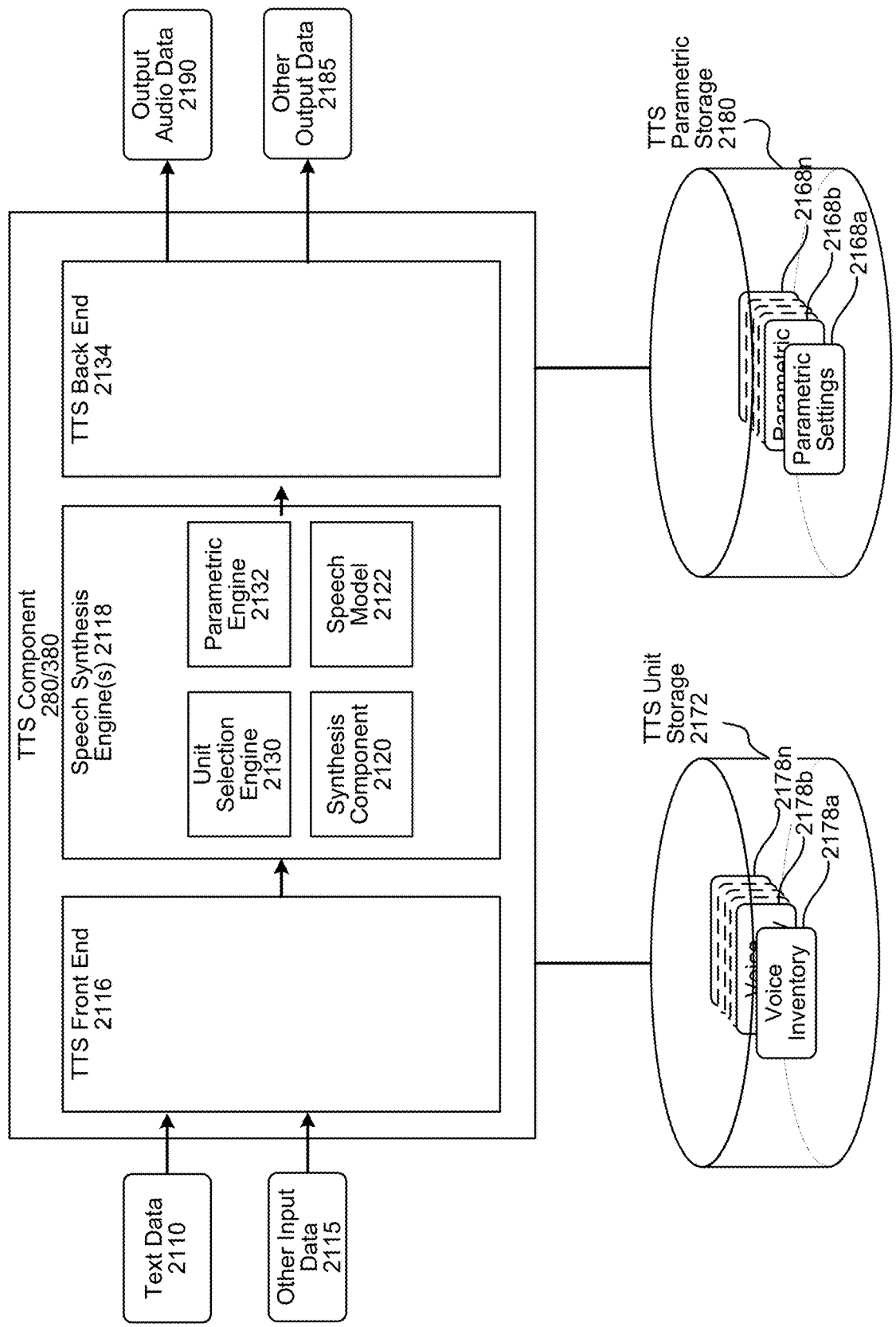
FIG. 21 is a conceptual diagram of text-to-speech components according to embodiments of the present disclosure.

Components of a system that may be used to perform unit selection, parametric TTS processing, and/or model-based audio synthesis are shown in FIG. 21. As shown in FIG. 21, the TTS component/processor 280 may include a TTS front end 2116, a speech synthesis engine 2118, TTS unit storage 2172, TTS parametric storage 2180, and a TTS back end 2134. The TTS unit storage 2172 may include, among other things, voice inventories 2178a-2178n that may include pre-recorded audio segments (called units) to be used by the unit selection engine 2130 when performing unit selection synthesis as described below. The TTS parametric storage 2180 may include, among other things, parametric settings 2168a-21n that may be used by the parametric synthesis engine 2132 when performing parametric synthesis as described below. A particular set of parametric settings 2168 may correspond to a particular voice profile (e.g., whispered speech, excited speech, etc.).

In various embodiments of the present disclosure, model-based synthesis of audio data may be performed using by a speech model 2122 and a TTS front end 2116. The TTS front end 2116 may be the same as front ends used in traditional unit selection or parametric systems. In other embodiments, some or all of the components of the TTS front end 2116 are based on other trained models. The present disclosure is not, however, limited to any particular type of TTS front end 2116. The speech model 2122 may be used to synthesize speech without requiring the TTS unit storage 2172 or the TTS parametric storage 2180, as described in greater detail below.

TTS component receives text data 2110. Although the text data 2110 in FIG. 21 is input into the TTS component 280, it may be output by other component(s) (such as a skill 290, NLU component 260, NLG component 279 or other component) and may be intended for output by the system. Thus in certain instances text data 2110 may be referred to as "output text data." Further, the data 2110 may not necessarily be text, but may include other data (such as symbols, code, other data, etc.) that may reference text (such as an indicator of a word) that is to be synthesized. Thus data 2110 may come in a variety of forms. The TTS front end 2116 transforms the data 2110 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 2118. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 2110, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 2116 may also process other input data 2115, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 2110 and/or the text for a TTS request may be accompanied by separate metadata indicating what text should be whispered (or have some other indicated audio characteristic). The speech synthesis engine 2118 may compare the annotated phonetic units models and information stored in the TTS unit storage 2172 and/or TTS parametric storage 2180 for converting the input text into speech. The TTS front end 2116 and speech synthesis engine 2118 may include their own controller(s)/processor(s) and memory or they may use the controller/processor and memory of the server 120, device 110, or other device, for example. Similarly, the instructions for operating the TTS front end 2116 and speech synthesis engine 2118 may be located within the TTS component 280, within the memory and/or storage of the server 120, device 110, or within an external device.

Text data 2110 input into the TTS component 280 may be sent to the TTS front end 2116 for processing. The front end 2116 may include components for performing text normalization, linguistic analysis, linguistic prosody generation, or other such components. During text normalization, the TTS front end 2116 may first process the text input and generate standard text, converting such things as numbers, abbreviations (such as Apt., St., etc.), symbols ($, %, etc.) into the equivalent of written out words.

During linguistic analysis, the TTS front end 2116 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 2172. The linguistic analysis performed by the TTS front end 2116 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 2116 may then perform linguistic prosody generation where the phonetic units are annotated with desired prosodic characteristics, also called acoustic features, which indicate how the desired phonetic units are to be pronounced in the eventual output speech. During this stage the TTS front end 2116 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 2116, which may be referred to as a symbolic linguistic representation, may include a sequence of phonetic units annotated with prosodic characteristics. This symbolic linguistic representation may be sent to the speech synthesis engine 2118, which may also be known as a synthesizer, for conversion into an audio waveform of speech for output to an audio output device and eventually to a user. The speech synthesis engine 2118 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 2118 may perform speech synthesis using one or more different methods. In one method of synthesis called unit selection, described further below, a unit selection engine 2130 matches the symbolic linguistic representation created by the TTS front end 2116 against a database of recorded speech, such as a database (e.g., TTS unit storage 2172) storing information regarding one or more voice corpuses (e.g., voice inventories 2178a-n). Each voice inventory may correspond to various segments of audio that was recorded by a speaking human, such as a voice actor, where the segments are stored in an individual inventory 2178 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 2130 may then use the information about each unit to select units to be joined together to form the speech output.

The unit selection engine 2130 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 2120) to form output audio data 2190 representing synthesized speech. Using all the information in the unit database, a unit selection engine 2130 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 2132, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 2120) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 2172 based on feedback of the results of TTS processing, thus enabling the TTS component 280 to improve speech synthesis.

The TTS unit storage 2172 may be customized for an individual user based on his/her individualized desired speech output. In particular, the speech unit stored in a unit database may be taken from input audio data of the user speaking. For example, to create the customized speech output of the system, the system may be configured with multiple voice inventories 2178a-2178n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 2178 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 2168) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 2130 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 2130. As part of unit selection, the unit selection engine 2130 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 2172 or in another storage component. For example, different unit selection databases may be stored in TTS unit storage 2172. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 2118 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 2132 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 2116.

The parametric synthesis engine 2132 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 2118, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 2132 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 2132 may lead to a number of potential audio output sequences. Based on the acoustic model and other potential models, the potential audio output sequences may be scored according to a confidence level of the parametric synthesis engine 2132. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 2168, which may represent acoustic settings matching a particular parametric "voice", may be used by the synthesis component 2120 to ultimately create the output audio data 2190.

When performing unit selection, after a unit is selected by the unit selection engine 2130, the audio data corresponding to the unit may be passed to the synthesis component 2120. The synthesis component 2120 may then process the audio data of the unit to create modified audio data where the modified audio data reflects a desired audio quality. The synthesis component 2120 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 2120 may process the audio data for that unit to create a modified unit audio data. The modified unit audio data may then be concatenated to form the output audio data 2190. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 2185 may be output along with the output audio data 2190 so that an ultimate playback device (e.g., device 110) receives instructions for playback that can assist in creating the desired output audio. Thus, the other output data 2185 may include instructions or other data indicating playback device settings (such as volume, playback rate, etc.) or other data indicating how output audio data including synthesized speech should be output. For example, for whispered speech, the output audio data 2190 may include other output data 2185 that may include a prosody tag or other indicator that instructs the device 110 to slow down the playback of the output audio data 2190, thus making the ultimate audio sound more like whispered speech, which is typically slower than normal speech. In another example, the other output data 2185 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 22:
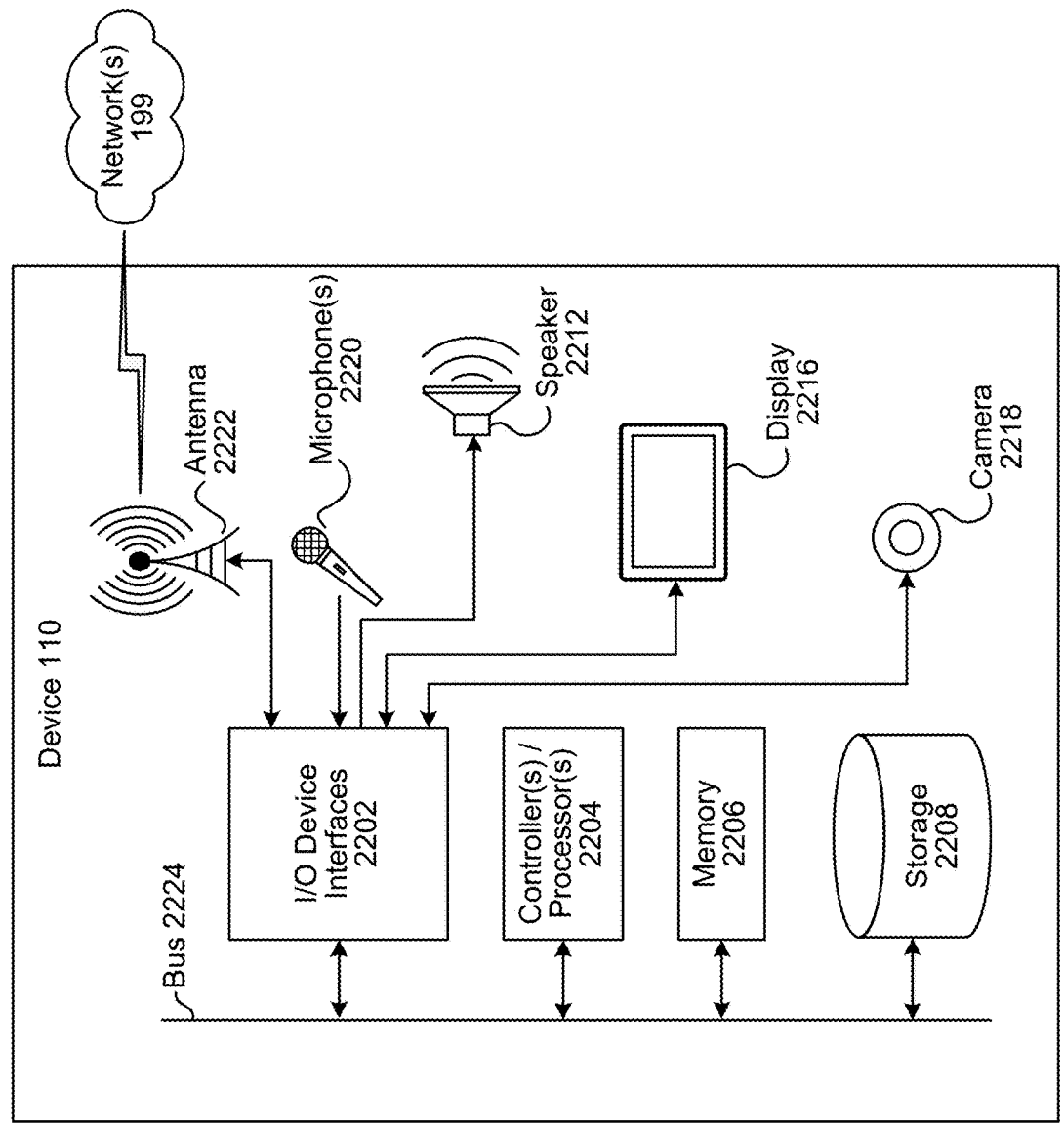
FIG. 22 is a block diagram conceptually illustrating example components of a device, according to embodiments of the present disclosure.
Figure 23:
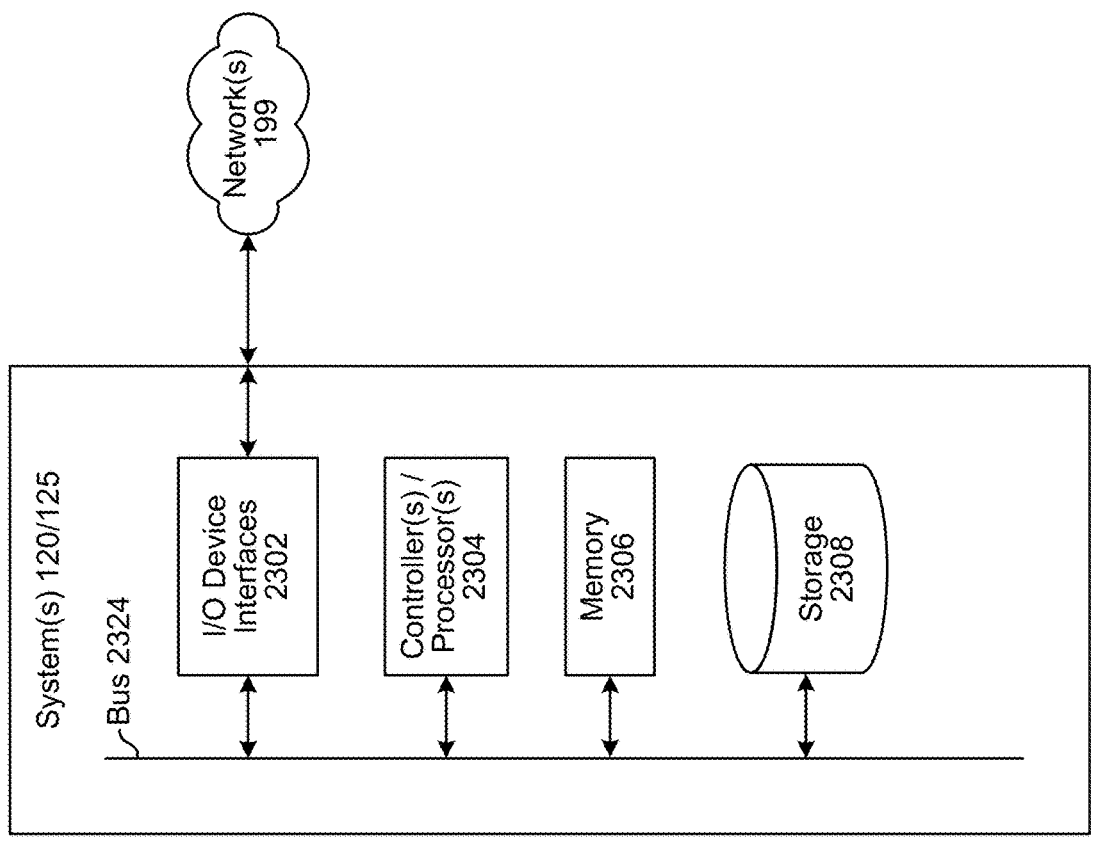
FIG. 23 is a block diagram conceptually illustrating example components of a system, according to embodiments of the present disclosure.

FIG. 22 is a block diagram conceptually illustrating a device 110 that may be used with the system. FIG. 23 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

System 120 may be a remote system such as a cloud system that operates at a location not proximate to device 110. System 120 may also be a system that operates at a similar location to device 110, though perhaps in a different physical device such as a home server, edge server, or the like. System 120 may also be a distributed system where certain components/operations occur using device(s) at one location and other components/operations occur using device(s) at another location.

Each of these devices (110/120/125) may include one or more controllers/processors (2204/2304), which may each include a central processing unit (CPU) for processing data and computer-readable instructions, and a memory (2206/2306) for storing data and instructions of the respective device. The memories (2206/2306) may individually include volatile random access memory (RAM), non-volatile read only memory (ROM), non-volatile magnetoresistive memory (MRAM), and/or other types of memory. Each device (110/120/125) may also include a data storage component (2208/2308) for storing data and controller/processor-executable instructions. Each data storage component (2208/2308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2202/2302).

Computer instructions for operating each device (110/120/125) and its various components may be executed by the respective device's controller(s)/processor(s) (2204/2304), using the memory (2206/2306) as temporary "working" storage at runtime. A device's computer instructions may be stored in a non-transitory manner in non-volatile memory (2206/2306), storage (2208/2308), or an external device(s). Alternatively, some or all of the executable instructions may be embedded in hardware or firmware on the respective device in addition to or instead of software.

Each device (110/120/125) includes input/output device interfaces (2202/2302). A variety of components may be connected through the input/output device interfaces (2202/2302), as will be discussed further below. Additionally, each device (110/120/125) may include an address/data bus (2224/2324) for conveying data among components of the respective device. Each component within a device (110/120/125) may also be directly connected to other components in addition to (or instead of) being connected to other components across the bus (2224/2324).

Referring to FIG. 22, the device 110 may include input/output device interfaces 2202 that connect to a variety of components such as an audio output component such as a speaker 2212, a wired headset or a wireless headset (not illustrated), or other component capable of outputting audio. The device 110 may also include an audio capture component. The audio capture component may be, for example, a microphone 2220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. An array of microphones may also be used to perform beamforming/other techniques to determine a direction of a sound's point of origin relative to the device 110. Data from the array of microphones as well as other components may be used to track a sound's source as it moves around an environment of a device 110. The device 110 may additionally include a display 2216 for displaying content. The device 110 may further include a camera 2218.

Via antenna(s) 2222, the input/output device interfaces 2202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2202/2302) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (2202/2302), processor(s) (2204/2304), memory (2206/2306), and/or storage (2208/2308) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 24:
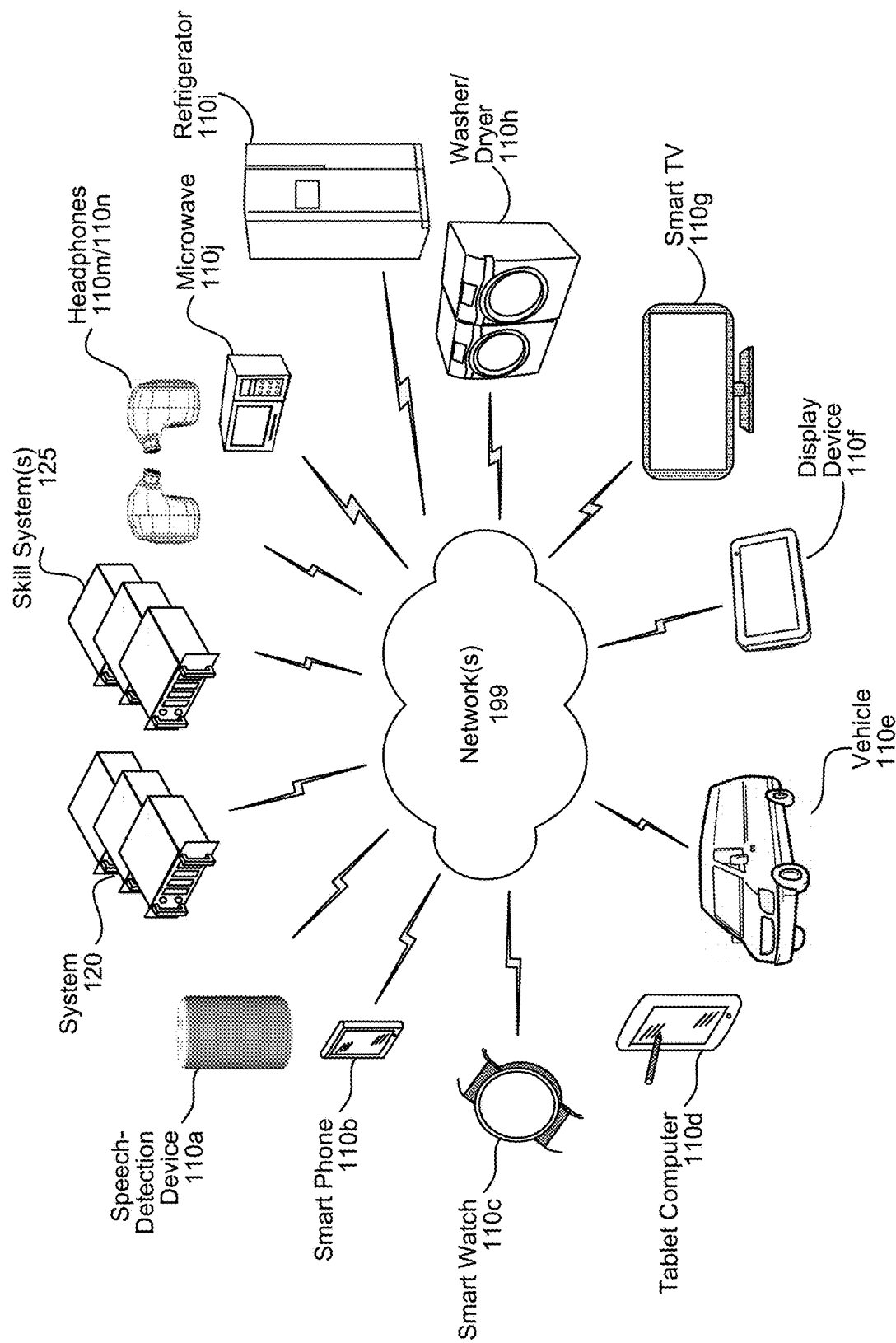
FIG. 24 illustrates an example of a computer network for use with the overall system, according to embodiments of the present disclosure.

As illustrated in FIG. 24, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a user device comprising at least one microphone and at least one speaker, output audio data representing synthesized speech of a list of entries;
   using the at least one speaker, beginning playback of audio corresponding to the output audio data;
   during the playback of the audio, detecting, by the at least one microphone, user speech;
   determining input audio data representing the user speech;
   determining a first time corresponding to the beginning of the playback;
   determining a second time corresponding to detection of the user speech;
   determining, by the user device, offset time data representing a difference between the first time and the second time;
   using a first trained machine learning (ML) model, processing the input audio data to determine that the user speech is system directed;
   based at least in part on determining that the user speech is system directed, sending, to at least one remote device, the input audio data and the offset time data;
   performing automatic speech recognition (ASR) processing on the input audio data to determine ASR output data representing a transcript of the input audio data;
   using a second trained ML model, performing natural language understanding (NLU) processing on the ASR output data to determine NLU output data representing at least an intent corresponding to the user speech;
   based at least in part on the NLU output data, determining that the user speech refers to an entry that is absent from the user speech;
   based at least in part on the entry being absent from the user speech, processing the offset time data to determine the entry is a first entry in the list of entries; and
   causing an action to be performed based at least in part on the first entry.

2. The computer-implemented method of claim 1, further comprising:
   determining stored data corresponding to the output audio data;
   determining a start point of the output audio data;
   determining, using the offset time data and the start point, a first portion of the output audio data;
   determining the first portion of the output audio data corresponds to a portion of the list of entries representing the first entry; and
   sending an indication of the first entry to a speech processing component.

3. The computer-implemented method of claim 1, further comprising, prior to performing the ASR processing:
   receiving input image data corresponding to the input audio data; and
   processing the input image data using a third trained ML model to determine that the user speech is system directed.

4. The computer-implemented method of claim 1, further comprising:
using the offset time data to determine the user speech began after output began of audio representing the first entry in the list of entries but prior to beginning output of audio representing a second entry in the list of entries; and
causing dialog data to be stored representing the first entry but not the second entry.

5. A computer-implemented method comprising:
causing playback of output audio;
detecting, by at least one microphone of at least one user device, input audio representing user speech;
determining input audio data representing the user speech;
determining, by the at least one user device, time data representing a difference between a beginning of the playback of the output audio and the user speech;
using a first trained machine learning (ML) model, processing the input audio data to determine that the user speech is system directed; and
based at least in part on determining that the user speech is system directed, sending, to at least one remote device, the input audio data and the time data to determine, using the input audio data and the time data, that the user speech refers to a portion of the output audio.

6. The computer-implemented method of claim 5, wherein determining the time data comprises:
determining a first timestamp corresponding to a beginning of the playback;
determining a second timestamp corresponding to the input audio; and
determining an offset representing a difference between the first timestamp and the second timestamp,
wherein the time data represents the offset.

7. The computer-implemented method of claim 5, wherein the output audio corresponds to synthesized speech representing a list of entries.

8. The computer-implemented method of claim 7, further comprising, prior to causing the playback:
receiving second input audio corresponding to previous user speech;
determining second input audio data representing the previous user speech;
sending, to the at least one remote device, the second input audio data; and
receiving, from the at least one remote device, output audio data representing the list of entries in response to the second input audio data.

9. The computer-implemented method of claim 5, wherein the output audio corresponds to synthesized speech representing a list of entries and wherein the method further comprises, after sending the input audio data to the at least one remote device:
receiving, from the at least one remote device, output audio data representing further information regarding a first entry in the list of entries; and
causing playback of second output audio corresponding to the output audio data.

10. The computer-implemented method of claim 5, further comprising:
sending, to the at least one remote device, data indicating the input audio data is associated with the time data.

11. The computer-implemented method of claim 5, wherein:
the at least one user device comprises a first user device and a second user device;

detecting the input audio comprises using the at least one microphone of the first user device; and
the time data is determined by the second user device.

12. A computing system comprising:
at least one processor; and
at least one memory comprising instructions that, when executed by the at least one processor, cause the computing system to:
receive, from a user device, input audio data representing an utterance;
receive, from the user device, time data representing a difference between detecting, by the user device, of the utterance and a beginning of playback, by the user device, of audio being output;
performing automatic speech recognition (ASR) processing on the input audio data to determine ASR output data representing a transcript of the input audio data;
using a first trained machine learning (ML) model, performing natural language understanding (NLU) processing on the ASR output data to determine NLU output data representing at least an intent corresponding to the utterance;
based at least in part on the NLU output data, the input audio data, and the time data, determine a first selection referred to in the utterance; and
cause an action to be performed based at least in part on the first selection.

13. The computing system of claim 12, wherein the at least one memory further comprises instructions that, when executed by the at least one processor, further cause the computing system to:
based at least in part on the NLU output data, determine the utterance refers to a selection that is not named in the utterance.

14. The computing system of claim 12, wherein the at least one memory further comprises instructions that, when executed by the at least one processor, further cause the computing system to:
determine the user device is associated with stored data corresponding to the audio and corresponding to a list of entries; and
use the stored data and the time data to determine a first entry from the list of entries, the first entry corresponding to the first selection.

15. The computing system of claim 14, wherein the time data corresponds to offset time data, and wherein the at least one memory further comprises instructions that, when executed by the at least one processor, further cause the computing system to:
use the stored data to determine a start time corresponding to the audio;
use the start time and the offset time data to determine a first portion of the list of entries;
determine the first portion of the list of entries corresponds to the first selection; and
perform speech processing using the input audio data based at least in part on the first selection.

16. The computing system of claim 12, wherein the at least one memory further comprises instructions that, when executed by the at least one processor, further cause the computing system to:
use the time data to determine the utterance began after output began of audio representing a first entry in a list of entries but prior to beginning output of audio representing a second entry in the list of entries; and causing dialog data to be stored representing the first entry but not the second entry.

17. The computing system of claim 16, wherein the at least one memory further comprises instructions that, when executed by the at least one processor, further cause the computing system to:
   determine the action to be performed based at least in part on the dialog data.

18. The computing system of claim 12, wherein the at least one memory further comprises instructions that, when executed by the at least one processor, further cause the computing system to, prior to receipt of the input audio data:
   receive, from the user device, second input audio data representing a second utterance;
   perform speech processing on the second input audio data to determine output data representing a list of entries;
   perform text-to-speech (TTS) processing using the output data to determine output audio data; and
   send the output audio data to the user device to cause the user device to output the audio using the output audio data.

19. The computing system of claim 12, wherein the at least one memory further comprises instructions that, when executed by the at least one processor, further cause the computing system to:
   determine user profile data corresponding to the utterance;
   determine, using the user profile data, second time data corresponding to a speech speed; and
   further use the second time data to determine the first selection.

20. The computing system of claim 12, wherein the at least one memory further comprises instructions that, when executed by the at least one processor, further cause the computing system to:
   receive, from the user device, indicator data associating the input audio data with the time data.

* * * * *